US012701508B2

(12) United States Patent
Gutman et al.

(10) Patent No.: US 12,701,508 B2
(45) Date of Patent: Aug. 4, 2026

(54) WAKE-UP SIGNAL ENHANCEMENTS

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 18/315,985

(22) Filed: May 11, 2023

(65) Prior Publication Data

US 2024/0381255 A1    Nov. 14, 2024

(51) Int. Cl.
*H04W 52/02*        (2009.01)

(52) U.S. Cl.
CPC ............................... *H04W 52/0229* (2013.01)

(58) Field of Classification Search
CPC ................................................ H04W 52/0229
USPC ........................................................ 370/311
See application file for complete search history.

(56) References Cited

U.S. PATENT DOCUMENTS

2019/0159127 A1    5/2019  Son et al.
2019/0313337 A1*  10/2019  Wilhelmsson ........ H04L 5/0048

2019/0349856 A1*  11/2019  Liu .................... H04W 52/0219
2021/0068055 A1*   3/2021  Nam ...................... H04L 5/0091
2024/0015655 A1*   1/2024  Cheng ................. H04L 27/2602

OTHER PUBLICATIONS

International Search Report and Written Opinion—PCT/US2024/027674—ISA/EPO—Sep. 27, 2024.

* cited by examiner

*Primary Examiner* — Intekhaab A Siddiquee
(74) *Attorney, Agent, or Firm* — QUALCOMM Incorporated

(57)                ABSTRACT

Methods, systems, and devices for wireless communications are described. A user equipment (UE) may implement techniques for receiving multiple bits of information via a single wake-up signal (WUS). For example, the UE may receive a configuration indicating a quantity of sequences associated with multiple sequences of a WUS. The UE may receive, while operating in a sleep mode, the WUS that includes multiple sequences, where each sequence is associated with a single bit and the multiple sequences indicate one or more operations. The UE may perform, while operating in the sleep mode, the one or more operations that are indicated by the multiple sequences of the WUS. In some other examples, the UE may implement multiple wake-up radios (WURs), such that the UE may receive multiple WUSs simultaneously. In some aspects, the UE may use the simultaneous WUSs received via the WURs for beam tracking or other operations.

30 Claims, 26 Drawing Sheets

305

320

115-b

315

310

105-b

WUTs 305

Beam Failure Recovery Request 310

Capability Message 315

Control Signaling 320

300

810          820          815

805

800

130          105          115

Network
Entity

Transceiver          Antenna 1510          1515

Memory

Communications
Manager          Code

1530

1520          1525

1540          Processor

1535

1505

1500

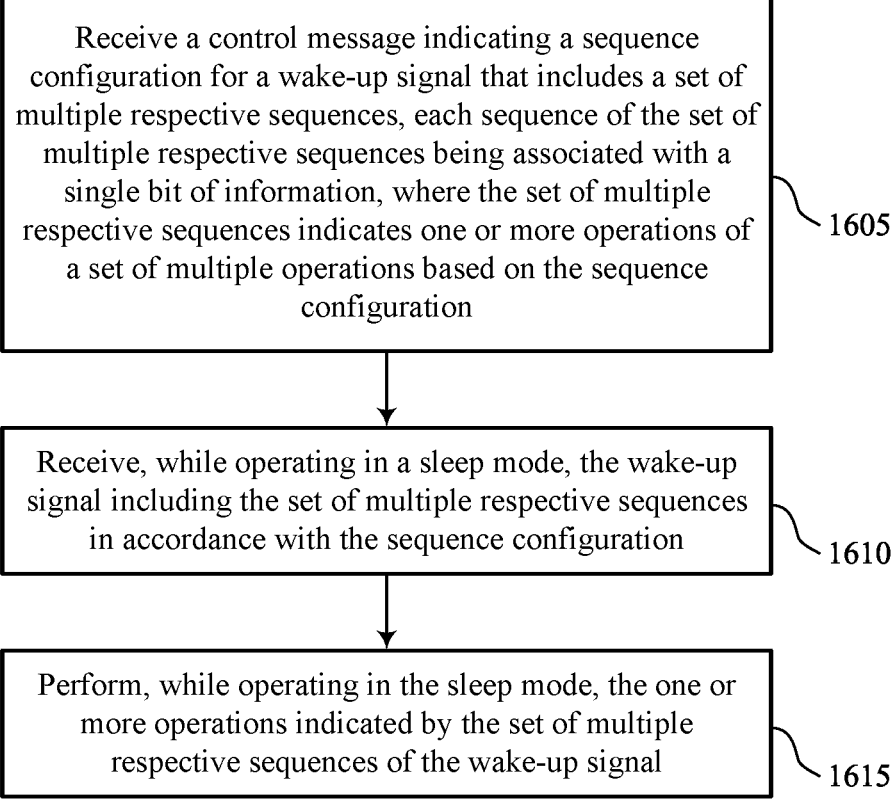

Receive a control message indicating a sequence configuration for a wake-up signal that includes a set of multiple respective sequences, each sequence of the set of multiple respective sequences being associated with a single bit of information, where the set of multiple respective sequences indicates one or more operations of a set of multiple operations based on the sequence configuration ⟩ 1605

↓

Receive, while operating in a sleep mode, the wake-up signal including the set of multiple respective sequences in accordance with the sequence configuration ⟩ 1610

↓

Perform, while operating in the sleep mode, the one or more operations indicated by the set of multiple respective sequences of the wake-up signal ⟩ 1615

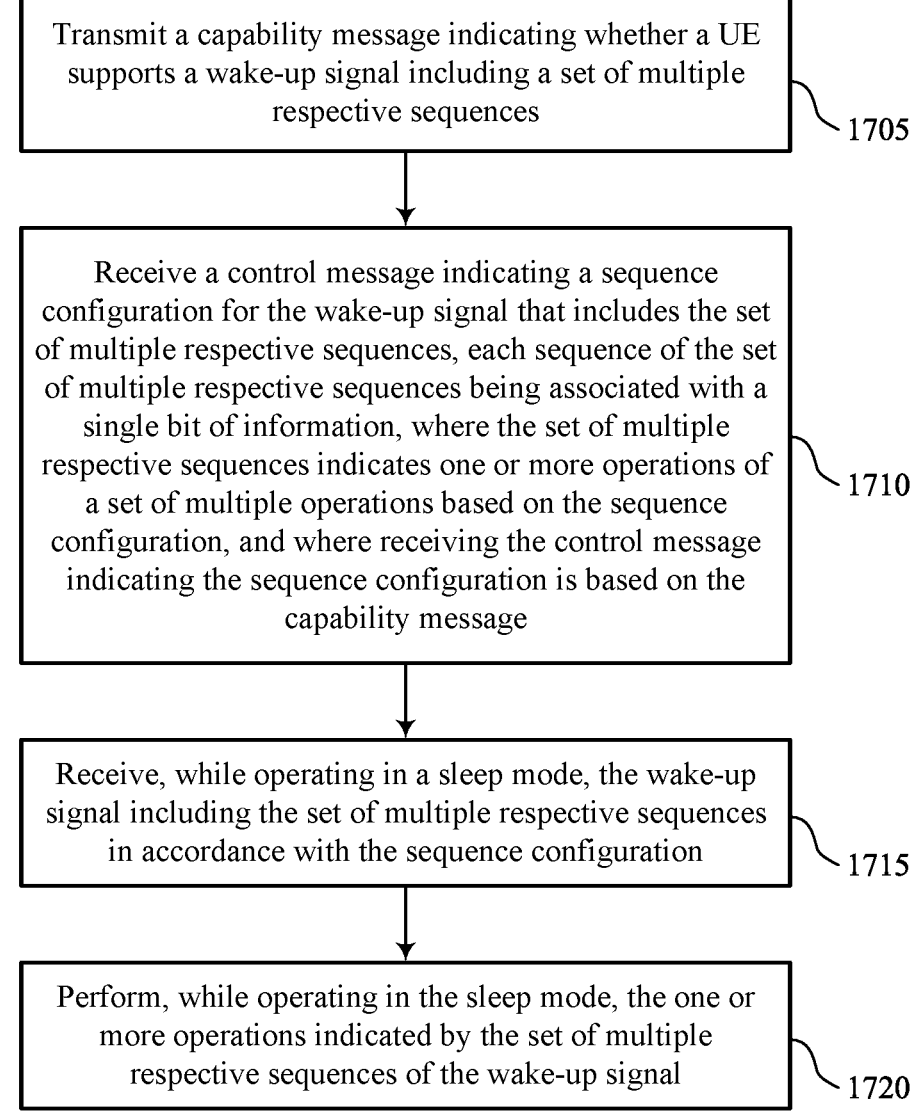

Transmit a capability message indicating whether a UE supports a wake-up signal including a set of multiple respective sequences ∼ 1705

Receive a control message indicating a sequence configuration for the wake-up signal that includes the set of multiple respective sequences, each sequence of the set of multiple respective sequences being associated with a single bit of information, where the set of multiple respective sequences indicates one or more operations of a set of multiple operations based on the sequence configuration, and where receiving the control message indicating the sequence configuration is based on the capability message ∼ 1710

Receive, while operating in a sleep mode, the wake-up signal including the set of multiple respective sequences in accordance with the sequence configuration ∼ 1715

Perform, while operating in the sleep mode, the one or more operations indicated by the set of multiple respective sequences of the wake-up signal ∼ 1720

Figure 18:
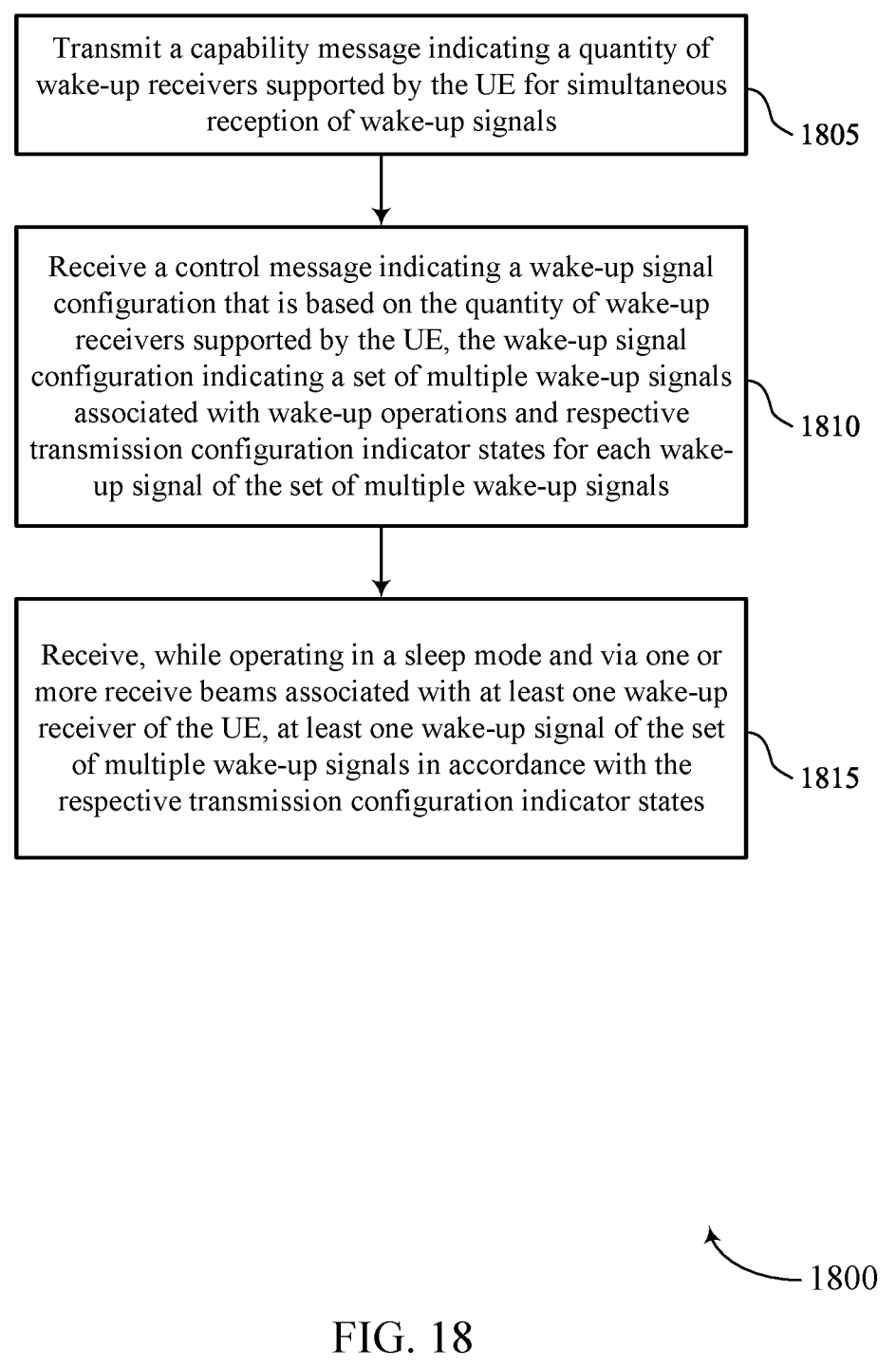

Transmit a capability message indicating a quantity of wake-up receivers supported by the UE for simultaneous reception of wake-up signals

1805

Receive a control message indicating a wake-up signal configuration that is based on the quantity of wake-up receivers supported by the UE, the wake-up signal configuration indicating a set of multiple wake-up signals associated with wake-up operations and respective transmission configuration indicator states for each wake-up signal of the set of multiple wake-up signals

1810

Receive, while operating in a sleep mode and via one or more receive beams associated with at least one wake-up receiver of the UE, at least one wake-up signal of the set of multiple wake-up signals in accordance with the respective transmission configuration indicator states

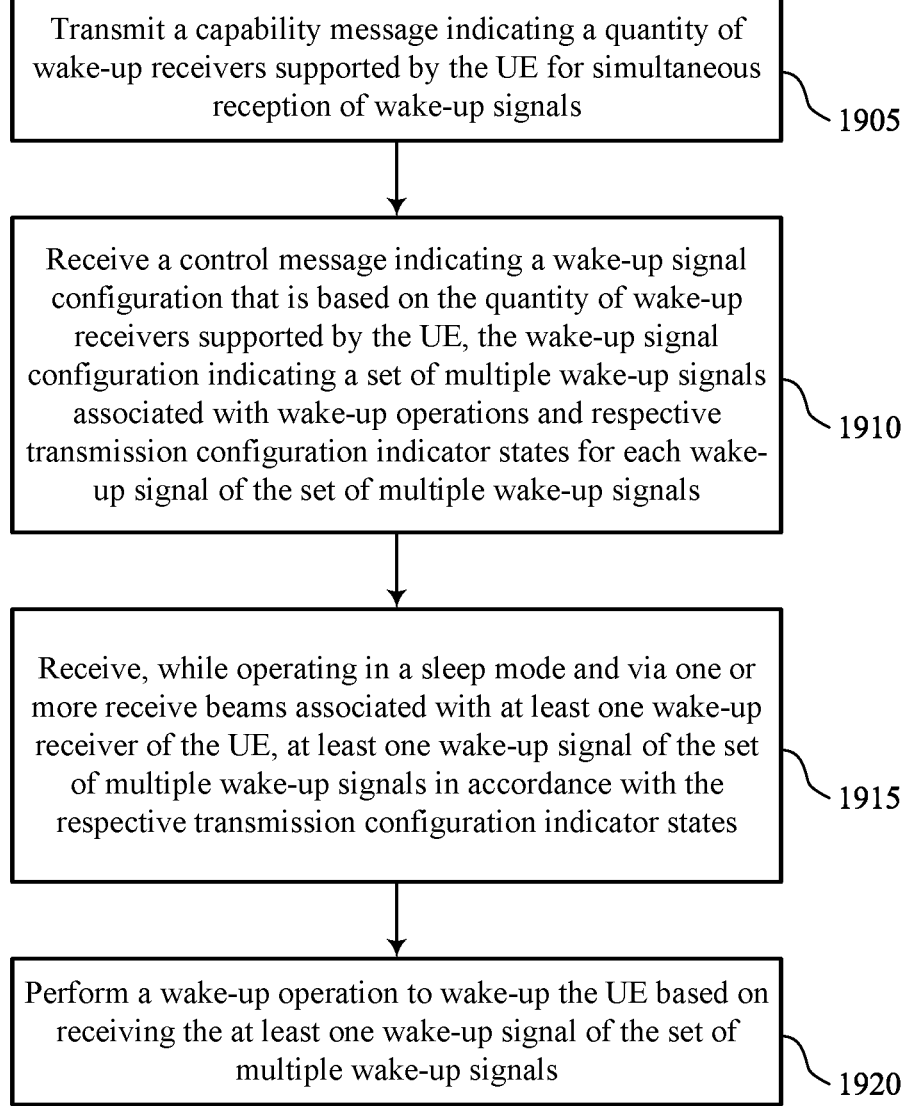

Transmit a capability message indicating a quantity of wake-up receivers supported by the UE for simultaneous reception of wake-up signals ⟩ 1905

Receive a control message indicating a wake-up signal configuration that is based on the quantity of wake-up receivers supported by the UE, the wake-up signal configuration indicating a set of multiple wake-up signals associated with wake-up operations and respective transmission configuration indicator states for each wake-up signal of the set of multiple wake-up signals ⟩ 1910

Receive, while operating in a sleep mode and via one or more receive beams associated with at least one wake-up receiver of the UE, at least one wake-up signal of the set of multiple wake-up signals in accordance with the respective transmission configuration indicator states ⟩ 1915

Perform a wake-up operation to wake-up the UE based on receiving the at least one wake-up signal of the set of multiple wake-up signals ⟩ 1920

Figure 20:
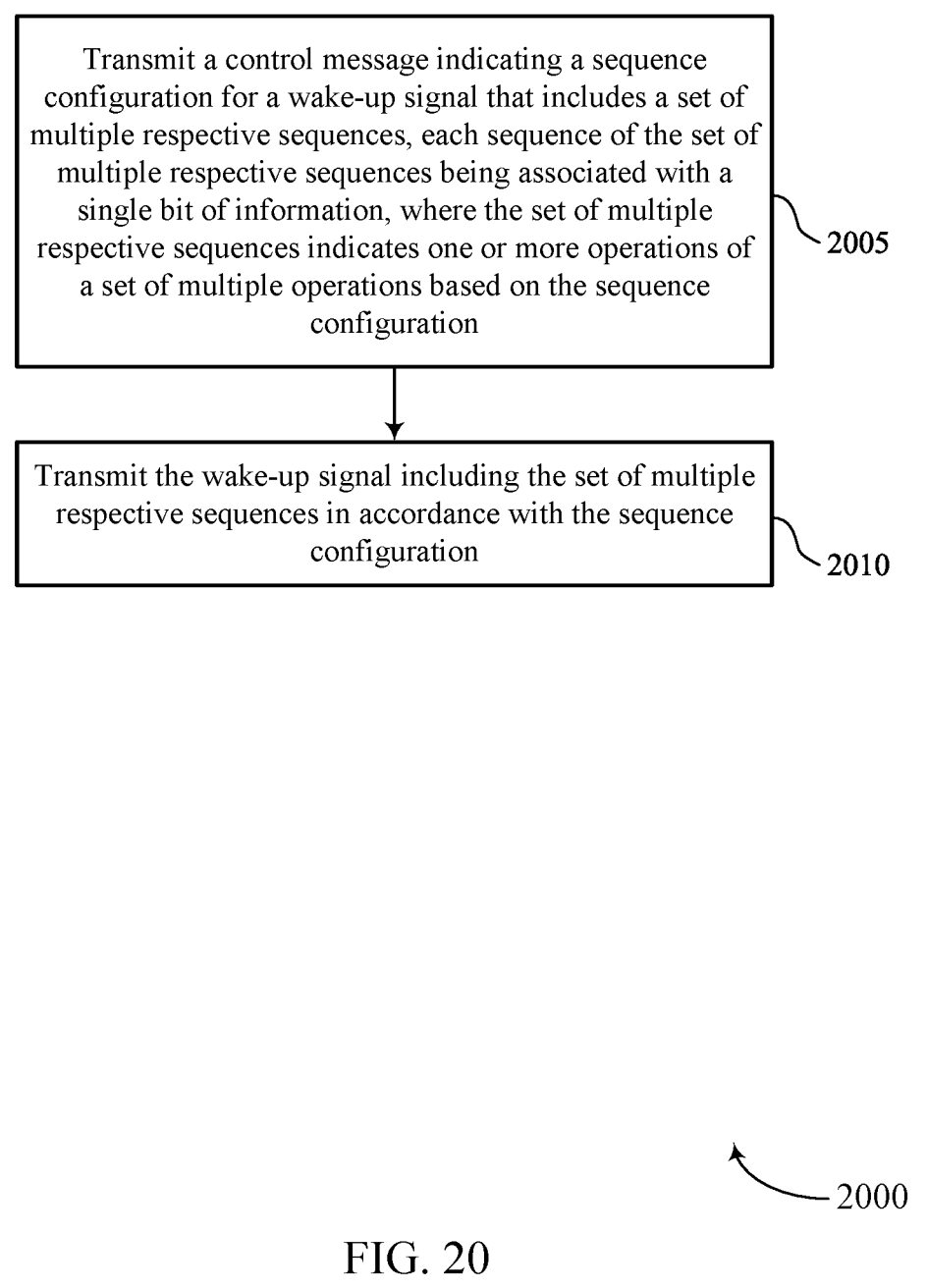

Transmit a control message indicating a sequence configuration for a wake-up signal that includes a set of multiple respective sequences, each sequence of the set of multiple respective sequences being associated with a single bit of information, where the set of multiple respective sequences indicates one or more operations of a set of multiple operations based on the sequence configuration

~ 2005

Transmit the wake-up signal including the set of multiple respective sequences in accordance with the sequence configuration

Figure 21:
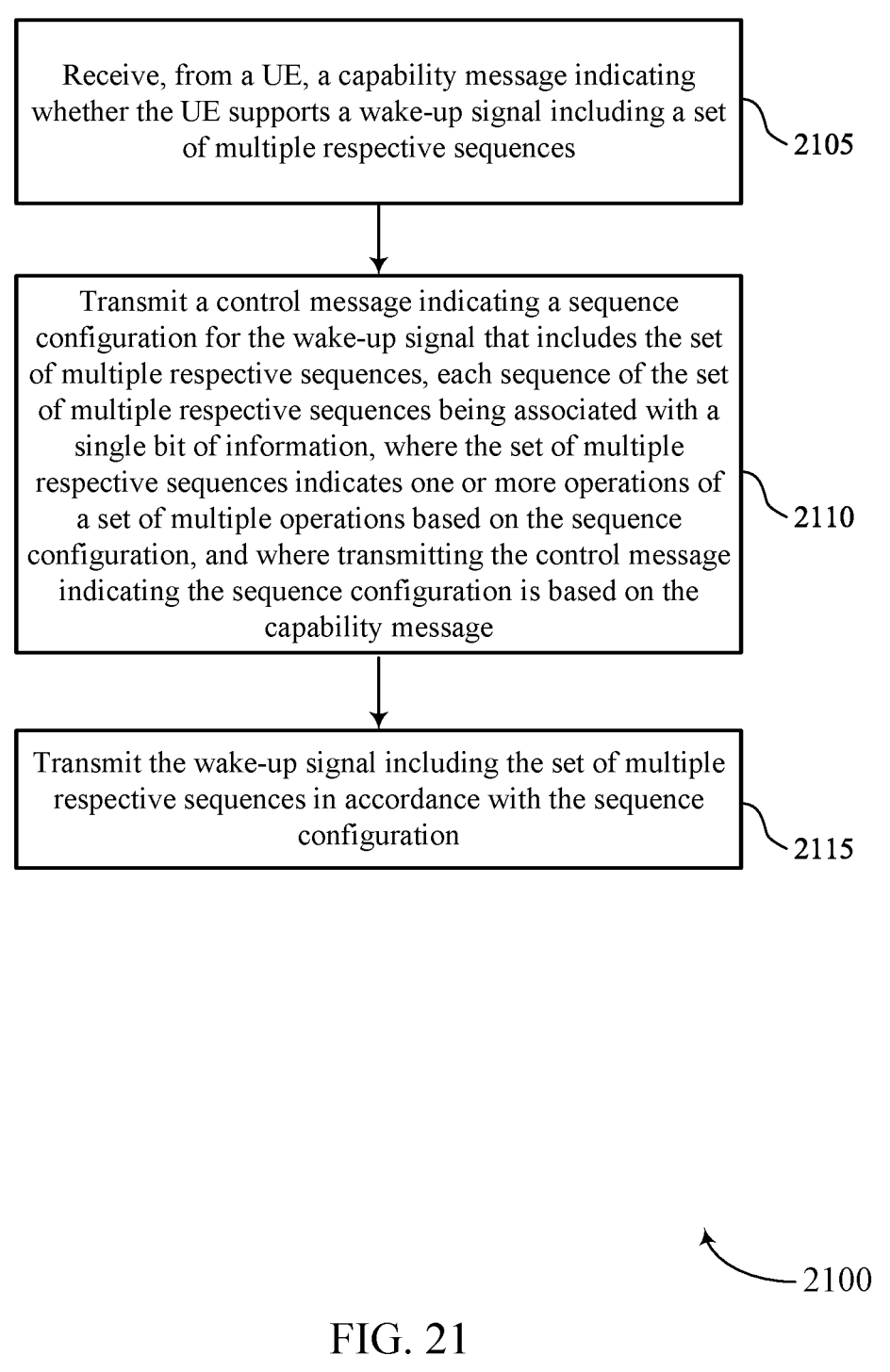

Receive, from a UE, a capability message indicating whether the UE supports a wake-up signal including a set of multiple respective sequences

2105

Transmit a control message indicating a sequence configuration for the wake-up signal that includes the set of multiple respective sequences, each sequence of the set of multiple respective sequences being associated with a single bit of information, where the set of multiple respective sequences indicates one or more operations of a set of multiple operations based on the sequence configuration, and where transmitting the control message indicating the sequence configuration is based on the capability message

2110

Transmit the wake-up signal including the set of multiple respective sequences in accordance with the sequence configuration

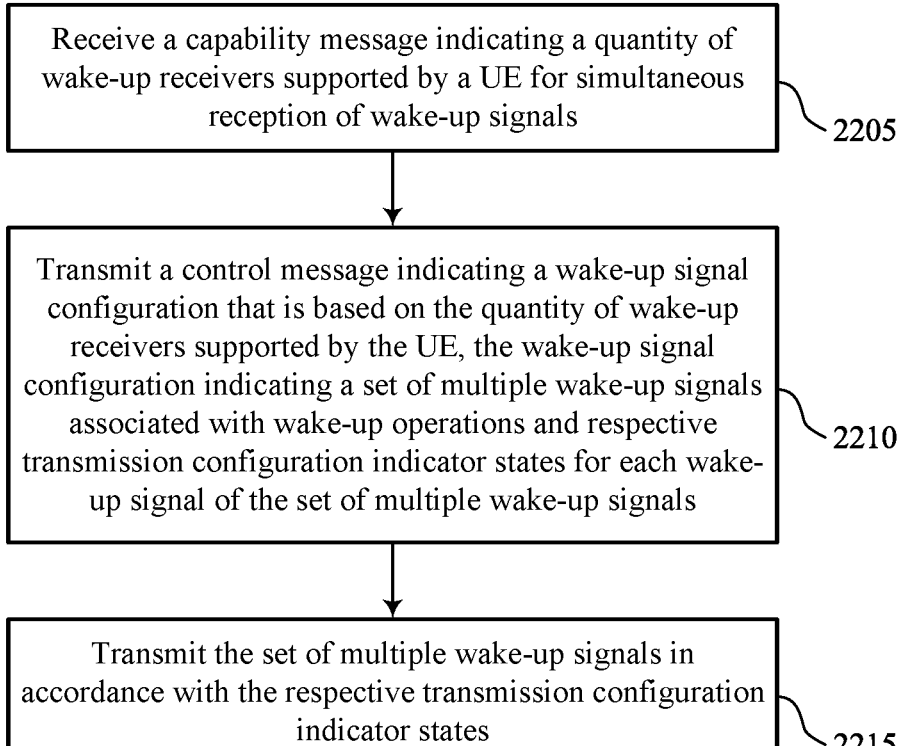

Receive a capability message indicating a quantity of wake-up receivers supported by a UE for simultaneous reception of wake-up signals

2205

Transmit a control message indicating a wake-up signal configuration that is based on the quantity of wake-up receivers supported by the UE, the wake-up signal configuration indicating a set of multiple wake-up signals associated with wake-up operations and respective transmission configuration indicator states for each wake-up signal of the set of multiple wake-up signals

2210

Transmit the set of multiple wake-up signals in accordance with the respective transmission configuration indicator states

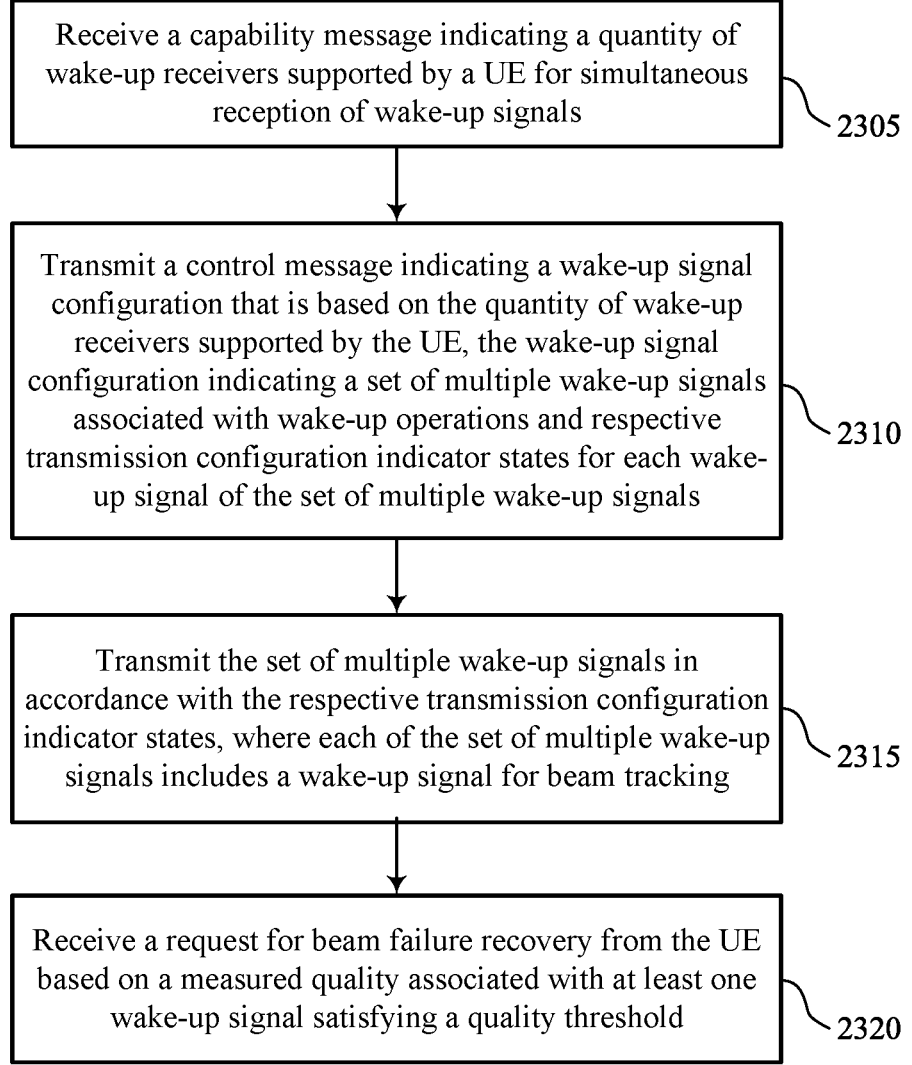

Receive a capability message indicating a quantity of wake-up receivers supported by a UE for simultaneous reception of wake-up signals

2305

Transmit a control message indicating a wake-up signal configuration that is based on the quantity of wake-up receivers supported by the UE, the wake-up signal configuration indicating a set of multiple wake-up signals associated with wake-up operations and respective transmission configuration indicator states for each wake-up signal of the set of multiple wake-up signals

2310

Transmit the set of multiple wake-up signals in accordance with the respective transmission configuration indicator states, where each of the set of multiple wake-up signals includes a wake-up signal for beam tracking

2315

Receive a request for beam failure recovery from the UE based on a measured quality associated with at least one wake-up signal satisfying a quality threshold

WAKE-UP SIGNAL ENHANCEMENTS

FIELD OF TECHNOLOGY

The following relates to wireless communications, including wake-up signal enhancements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support wake-up signal (WUS) enhancements. In some examples, a user equipment (UE) may implement techniques for receiving multiple bits of information via a single WUS. For example, the UE may receive, while operating in an awake mode, a configuration indicating a quantity of sequences associated with multiple sequences of a WUS. Here, a WUS may include multiple sequences transmitted in the time domain or the frequency domain, which may enable a transmitter to covey additional information bits to a UE (e.g., using an index modulation scheme) via the WUS. The UE may receive, while operating in a sleep mode, the WUS that includes the multiple sequences, where each sequence is associated with a single bit of information, and the multiple sequences may indicate one or more operations of multiple wake-up operations for the UE. For example, the operations indicated by the sequences of the WUS may include an indication to continue operating in the sleep mode, modify a WUS periodicity, wake up from the sleep mode in accordance with some speed (e.g., wake up relatively quickly, wake up relatively slowly), wake up from the sleep mode to perform a beam search, among other examples. In such cases, the UE may perform, while operating in the sleep mode, the one or more operations that are identified from the multiple sequences of the WUS.

In some other examples, the UE may implement multiple wake-up radios (WURs), such that the UE may receive multiple WUSs simultaneously, thereby decreasing signaling overhead in wireless communications. For instance, the UE may use the WUSs received simultaneously at different WURs for performing beam tracking or other operations. Such WUSs may be referred to as WUSs for beam tracking (WUTs). In some examples, the simultaneous WUSs may be received in accordance with different transmission configuration indicator (TCI) states, and respective directional beams associated with different WURs may determine some directional beam(s) (e.g., a best beam) for communications between the UE and another device (e.g., a network entity, another UE, or the like).

A method for wireless communication at a UE is described. The method may include receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration, receiving, while operating in a sleep mode, the WUS including the set of multiple respective sequences in accordance with the sequence configuration, and performing, while operating in the sleep mode, the one or more operations indicated by the set of multiple respective sequences of the WUS.

An apparatus for wireless communication at a UE is described. The apparatus may include at least one processor, at least one memory coupled with the at least one processor, and instructions stored in the at least one memory. The instructions may be executable by the at least one processor to cause the apparatus to receive a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration, receive, while operating in a sleep mode, the WUS including the set of multiple respective sequences in accordance with the sequence configuration, and perform, while operating in the sleep mode, the one or more operations indicated by the set of multiple respective sequences of the WUS.

Another apparatus for wireless communication at a UE is described. The apparatus may include means for receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration, means for receiving, while operating in a sleep mode, the WUS including the set of multiple respective sequences in accordance with the sequence configuration, and means for performing, while operating in the sleep mode, the one or more operations indicated by the set of multiple respective sequences of the WUS.

A non-transitory computer-readable medium storing code for wireless communication at a UE is described. The code may include instructions executable by at least one processor to receive a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration, receive, while operating in a sleep mode, the WUS including the set of multiple respective sequences in accordance with the sequence configuration, and perform, while operating in the sleep mode, the one or more operations indicated by the set of multiple respective sequences of the WUS.

Some examples of the method, apparatuses, and non-transitory computer-readable medium described herein may further include operations, features, means, or instructions for transmitting a capability message indicating whether the UE supports the WUS including the set of multiple respective sequences, where receiving the control message indicating the sequence configuration may be based on the capability message.

In some examples of the method, apparatuses, and non-transitory computer-readable medium described herein, the capability message indicates a capability of the UE to receive the WUS including the set of multiple respective sequences using FDM (FDM), a capability of the UE to receive the WUS including the set of multiple respective sequences using TDM (TDM), a quantity of bits supported by the UE for receiving the WUS including the set of multiple respective sequences, or a combination thereof.

Some examples of the method, apparatuses, and non-transitory computer-readable medium described herein may further include operations, features, means, or instructions for receiving, via the sequence configuration, an indication that the set of multiple respective sequences is to be multi-plexed in accordance with TDM or FDM, where the wake up signal may be received in accordance with the TDM or the FDM.

Some examples of the method, apparatuses, and non-transitory computer-readable medium described herein may further include operations, features, means, or instructions for receiving, via the sequence configuration, an indication of a quantity of bits associated with the set of multiple respective sequences, where the one or more operations may be indicated by the set of multiple respective sequences based on the quantity of bits.

Some examples of the method, apparatuses, and non-transitory computer-readable medium described herein may further include operations, features, means, or instructions for receiving, via the sequence configuration, an indication of a set of multiple codewords associated with the set of multiple respective sequences and a mapping between the set of multiple codewords and the set of multiple operations, the mapping indicating an association between each of the set of multiple operations and respective codewords of the set of multiple codewords.

Some examples of the method, apparatuses, and non-transitory computer-readable medium described herein may further include operations, features, means, or instructions for receiving, via the sequence configuration, an indication of a set of multiple frequency carriers associated with the WUS including the set of multiple respective sequences, where each sequence of the set of multiple respective sequences may be received via a respective frequency carrier of the set of multiple frequency carriers and moni-toring, while in the sleep mode, the set of multiple frequency carriers for the WUS, where receiving the WUS may be based on monitoring the set of multiple frequency carriers.

In some examples of the method, apparatuses, and non-transitory computer-readable medium described herein, the sequence configuration further indicates that a first sequence of the set of multiple respective sequences may be different from a second sequence of the set of multiple respective sequences, the first sequence being associated with a first frequency carrier of the set of multiple frequency carriers and the second sequence being associated with a second frequency carrier different from the first frequency carrier.

Some examples of the method, apparatuses, and non-transitory computer-readable medium described herein may further include operations, features, means, or instructions for determining whether a first sequence associated with the WUS is to be repeated in each frequency carrier of a set of multiple frequency carriers, where receiving the WUS including the set of multiple respective sequences includes receiving the first sequence across each frequency carrier of the set of multiple frequency carriers based on a determination that the first sequence is to be repeated in each frequency carrier and waking from the sleep mode based on an aggregation of the first sequence received across each frequency carrier.

In some examples of the method, apparatuses, and non-transitory computer-readable medium described herein, the sequence configuration further indicates that the first sequence includes a same bit across the set of multiple frequency carriers and that a quantity of frequency carriers of the set of multiple frequency carriers may be greater than one and determining whether the first sequence associated with the WUS is to be repeated in each frequency carrier of the set of multiple frequency carriers may be based on the sequence configuration.

Some examples of the method, apparatuses, and non-transitory computer-readable medium described herein may further include operations, features, means, or instructions for receiving, via the sequence configuration, an indication of a set of multiple time intervals associated with the set of multiple respective sequences, each sequence of the set of multiple respective sequences being received via a respec-tive time interval of the set of multiple time intervals and monitoring, while in the sleep mode, the set of multiple time intervals for the WUS, where receiving the WUS may be based on monitoring the set of multiple time intervals.

In some examples of the method, apparatuses, and non-transitory computer-readable medium described herein, the sequence configuration further indicates that a first sequence of the set of multiple respective sequences may be different from a second sequence of the set of multiple respective sequences, the first sequence being associated with a first time interval of the set of multiple time intervals and the second sequence being associated with a second time inter-val different from the first time interval.

Some examples of the method, apparatuses, and non-transitory computer-readable medium described herein may further include operations, features, means, or instructions for determining whether a first sequence associated with the WUS is to be repeated in each time interval of a set of multiple time intervals, where receiving the WUS including the set of multiple respective sequences includes receiving the first sequence via each time interval of the set of multiple time intervals based on a determination that the first sequence is to be repeated in each time interval and waking from the sleep mode based on an aggregation of the first sequence received via each time interval.

In some examples of the method, apparatuses, and non-transitory computer-readable medium described herein, the sequence configuration further indicates that the first sequence includes a same bit in each of the set of multiple time intervals and that a quantity of time intervals of the set of multiple time intervals may be greater than one and determining whether the first sequence associated with the WUS is to be repeated in each time interval of the set of multiple time intervals may be based on the sequence configuration.

Some examples of the method, apparatuses, and non-transitory computer-readable medium described herein may further include operations, features, means, or instructions for storing, in a memory buffer of the UE, each repetition of the first sequence in each of the set of multiple time intervals, where the aggregation of the first sequence may be based on storing each of the set of multiple respective sequences in the memory buffer of the UE.

In some examples of the method, apparatuses, and non-transitory computer-readable medium described herein, a length of each sequence of the set of multiple respective sequences may be based on a quantity of UEs in communication with a network entity and a processing gain associated with the UE.

In some examples of the method, apparatuses, and non-transitory computer-readable medium described herein, the set of multiple operations includes at least an operation to continue operating in the sleep mode, an operation to update a periodicity associated with monitoring for the WUS, an operation to wake up for beam management, an operation to wake up at a first time period, an operation to wake up within a time threshold, an operation to wake up using a power mode associated with a threshold power.

A method for wireless communication at a UE is described. The method may include transmitting a capability message indicating a quantity of WURs supported by the UE for simultaneous reception of WUSs, receiving a control message indicating a WUS configuration that is based on the quantity of WURs supported by the UE, the WUS configuration indicating a set of multiple WUSs associated with wake-up operations and respective TCI states for each WUS of the set of multiple WUSs, and receiving, while operating in a sleep mode and via one or more receive beams associated with at least one WUR of the UE, at least one WUS of the set of multiple WUSs in accordance with the respective TCI states.

An apparatus for wireless communication at a UE is described. The apparatus may include at least one processor, at least one memory coupled with the at least one processor, and instructions stored in the at least one memory. The instructions may be executable by the at least one processor to cause the apparatus to transmit a capability message indicating a quantity of WURs supported by the UE for simultaneous reception of WUSs, receive a control message indicating a WUS configuration that is based on the quantity of WURs supported by the UE, the WUS configuration indicating a set of multiple WUSs associated with wake-up operations and respective TCI states for each WUS of the set of multiple WUSs, and receive, while operating in a sleep mode and via one or more receive beams associated with at least one WUR of the UE, at least one WUS of the set of multiple WUSs in accordance with the respective TCI states.

Another apparatus for wireless communication at a UE is described. The apparatus may include means for transmitting a capability message indicating a quantity of WURs supported by the UE for simultaneous reception of WUSs, means for receiving a control message indicating a WUS configuration that is based on the quantity of WURs supported by the UE, the WUS configuration indicating a set of multiple WUSs associated with wake-up operations and respective TCI states for each WUS of the set of multiple WUSs, and means for receiving, while operating in a sleep mode and via one or more receive beams associated with at least one WUR of the UE, at least one WUS of the set of multiple WUSs in accordance with the respective TCI states.

A non-transitory computer-readable medium storing code for wireless communication at a UE is described. The code may include instructions executable by at least one processor to transmit a capability message indicating a quantity of WURs supported by the UE for simultaneous reception of WUSs, receive a control message indicating a WUS configuration that is based on the quantity of WURs supported by the UE, the WUS configuration indicating a set of multiple WUSs associated with wake-up operations and respective TCI states for each WUS of the set of multiple WUSs, and receive, while operating in a sleep mode and via one or more receive beams associated with at least one WUR of the UE, at least one WUS of the set of multiple WUSs in accordance with the respective TCI states.

Some examples of the method, apparatuses, and non-transitory computer-readable medium described herein may further include operations, features, means, or instructions for measuring, while operating in the sleep mode, a quality of the at least one WUS based on receiving the at least one WUS, where each of the set of multiple WUSs includes a WUT, performing a wake-up operation to wake-up the UE based on a quality associated with the at least one WUS satisfying a quality threshold, and transmitting a request for beam failure recovery based on the quality associated with the at least one WUS satisfying the quality of threshold.

Some examples of the method, apparatuses, and non-transitory computer-readable medium described herein may further include operations, features, means, or instructions for performing a wake-up operation to wake-up the UE based on receiving the at least one WUS of the set of multiple WUSs.

In some examples of the method, apparatuses, and non-transitory computer-readable medium described herein, each WUS of the set of multiple WUSs may be received via respective WURs of the UE in a same time interval and each WUS of the set of multiple WUSs may be associated with a same TCI state.

In some examples of the method, apparatuses, and non-transitory computer-readable medium described herein, a first set of the set of multiple WUSs may be received via a first set of WURs of the UE in a first time interval and a second set of the set of multiple WUSs may be received via a second set of WURs of the UE in a second time interval different from the first time interval, the first set of the set of multiple WUSs being associated with a first TCI state and the second set of the set of multiple WUSs being associated with a second TCI state.

In some examples of the method, apparatuses, and non-transitory computer-readable medium described herein, each WUS of the set of multiple WUSs may be received via respective WURs of the UE in a first time interval, a first set of the set of multiple WUSs being associated with a first TCI state and a second set of the set of multiple WUSs being associated with a second TCI state.

A method for wireless communication at a network entity is described. The method may include transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration and transmitting the WUS including the set of multiple respective sequences in accordance with the sequence configuration.

An apparatus for wireless communication at a network entity is described. The apparatus may include at least one processor, at least one memory coupled with the at least one processor, and instructions stored in the at least one memory. The instructions may be executable by the at least one processor to cause the apparatus to transmit a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration and transmit the WUS including the set of multiple respective sequences in accordance with the sequence configuration.

Another apparatus for wireless communication at a network entity is described. The apparatus may include means for transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration and means for transmitting the WUS including the set of multiple respective sequences in accordance with the sequence configuration.

A non-transitory computer-readable medium storing code for wireless communication at a network entity is described. The code may include instructions executable by at least one processor to transmit a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration and transmit the WUS including the set of multiple respective sequences in accordance with the sequence configuration.

Some examples of the method, apparatuses, and non-transitory computer-readable medium described herein may further include operations, features, means, or instructions for receiving, from a UE, a capability message indicating whether the UE supports the WUS including the set of multiple respective sequences, where transmitting the control message indicating the sequence configuration may be based on the capability message.

In some examples of the method, apparatuses, and non-transitory computer-readable medium described herein, the capability message indicates a capability of the UE to receive the WUS including the set of multiple respective sequences using FDM, a capability of the UE to receive the WUS including the set of multiple respective sequences using TDM, a quantity of bits supported by the UE for receiving the WUS including set of multiple respective sequences, or a combination thereof.

Some examples of the method, apparatuses, and non-transitory computer-readable medium described herein may further include operations, features, means, or instructions for transmitting, via the sequence configuration, an indication that the set of multiple respective sequences is to be multiplexed in accordance with TDM or FDM, where the wake up signal may be transmitted in accordance with the TDM or the FDM.

Some examples of the method, apparatuses, and non-transitory computer-readable medium described herein may further include operations, features, means, or instructions for transmitting, via the sequence configuration, an indication of a quantity of bits associated with the set of multiple respective sequences, where the one or more operations may be indicated by the set of multiple respective sequences based on the quantity of bits.

Some examples of the method, apparatuses, and non-transitory computer-readable medium described herein may further include operations, features, means, or instructions for transmitting, via the sequence configuration, an indication of a set of multiple codewords associated with the set of multiple respective sequences and a mapping between the set of multiple codewords and the set of multiple operations, the mapping indicating an association between each of the set of multiple operations and respective codewords of the set of multiple codewords.

Some examples of the method, apparatuses, and non-transitory computer-readable medium described herein may further include operations, features, means, or instructions for transmitting, via the sequence configuration, an indication of a set of multiple frequency carriers associated with the WUS including the set of multiple respective sequences, where each sequence of the set of multiple respective sequences may be transmitted via a respective frequency carrier of the set of multiple frequency carriers.

In some examples of the method, apparatuses, and non-transitory computer-readable medium described herein, the sequence configuration further indicates that a first sequence of the set of multiple respective sequences may be different from a second sequence of the set of multiple respective sequences, the first sequence being associated with a first frequency carrier of the set of multiple frequency carriers and the second sequence being associated with a second frequency carrier different from the first frequency carrier.

Some examples of the method, apparatuses, and non-transitory computer-readable medium described herein may further include operations, features, means, or instructions for transmitting, via the sequence configuration, an indication that a first sequence associated with the WUS is to be repeated in each frequency carrier of a set of multiple frequency carriers, where transmitting the WUS including the set of multiple respective sequences includes transmitting the first sequence via each frequency carrier of the set of multiple frequency carriers in accordance with the sequence configuration.

In some examples of the method, apparatuses, and non-transitory computer-readable medium described herein, the sequence configuration further indicates that the first sequence includes a same bit across the set of multiple frequency carriers and that a quantity of frequency carriers of a set of multiple frequency carriers may be greater than one.

Some examples of the method, apparatuses, and non-transitory computer-readable medium described herein may further include operations, features, means, or instructions for transmitting, via the sequence configuration, an indication of a set of multiple time intervals associated with the set of multiple respective sequences, each sequence of the set of multiple respective sequences being transmitted via a respective time interval of the set of multiple time intervals.

In some examples of the method, apparatuses, and non-transitory computer-readable medium described herein, the sequence configuration further indicates that a first sequence of the set of multiple respective sequences may be different from a second sequence of the set of multiple respective sequences, the first sequence being associated with a first time interval of the set of multiple time intervals and the second sequence being associated with a second time interval different from the first time interval.

Some examples of the method, apparatuses, and non-transitory computer-readable medium described herein may further include operations, features, means, or instructions for transmitting, via the sequence configuration, an indication that a first sequence associated with the WUS is to be repeated in each time interval of a set of multiple time intervals, where transmitting the WUS including the set of multiple respective sequences includes transmitting the first sequence via each time interval of the set of multiple time intervals in accordance with the sequence configuration.

In some examples of the method, apparatuses, and non-transitory computer-readable medium described herein, the sequence configuration further indicates that the first sequence includes a same bit across the set of multiple time intervals and that a quantity of time intervals of a set of multiple time intervals may be greater than one.

In some examples of the method, apparatuses, and non-transitory computer-readable medium described herein, a length of each of the set of multiple respective sequences may be based on a quantity of UEs in communication with the network entity and a processing gain associated with a UE.

In some examples of the method, apparatuses, and non-transitory computer-readable medium described herein, the set of multiple operations includes at least an operation to continue operating in a sleep mode, an operation to update a periodicity associated with monitoring for the WUS, an operation to wake up for beam management, an operation to wake up at a first time period, an operation to wake up within a time threshold, an operation to wake up using a power mode associated with a threshold power.

A method for wireless communication at network entity is described. The method may include receiving a capability message indicating a quantity of WURs supported by a UE for simultaneous reception of WUSs, transmitting a control message indicating a WUS configuration that is based on the quantity of WURs supported by the UE, the WUS configuration indicating a set of multiple WUSs associated with wake-up operations and respective TCI states for each WUS of the set of multiple WUSs, and transmitting the set of multiple WUSs in accordance with the respective TCI states.

An apparatus for wireless communication at network entity is described. The apparatus may include at least one processor, at least one memory coupled with the at least one processor, and instructions stored in the at least one memory. The instructions may be executable by the at least one processor to cause the apparatus to receive a capability message indicating a quantity of WURs supported by a UE for simultaneous reception of WUSs, transmit a control message indicating a WUS configuration that is based on the quantity of WURs supported by the UE, the WUS configuration indicating a set of multiple WUSs associated with wake-up operations and respective TCI states for each WUS of the set of multiple WUSs, and transmit the set of multiple WUSs in accordance with the respective TCI states.

Another apparatus for wireless communication at network entity is described. The apparatus may include means for receiving a capability message indicating a quantity of WURs supported by a UE for simultaneous reception of WUSs, means for transmitting a control message indicating a WUS configuration that is based on the quantity of WURs supported by the UE, the WUS configuration indicating a set of multiple WUSs associated with wake-up operations and respective TCI states for each WUS of the set of multiple WUSs, and means for transmitting the set of multiple WUSs in accordance with the respective TCI states.

A non-transitory computer-readable medium storing code for wireless communication at network entity is described. The code may include instructions executable by at least one processor to receive a capability message indicating a quantity of WURs supported by a UE for simultaneous reception of WUSs, transmit a control message indicating a WUS configuration that is based on the quantity of WURs supported by the UE, the WUS configuration indicating a set of multiple WUSs associated with wake-up operations and respective TCI states for each WUS of the set of multiple WUSs, and transmit the set of multiple WUSs in accordance with the respective TCI states.

Some examples of the method, apparatuses, and non-transitory computer-readable medium described herein may further include operations, features, means, or instructions for receiving a request for beam failure recovery from the UE based on a measured quality associated with at least one WUS satisfying a quality threshold, where each of the set of multiple WUSs includes a WUT.

In some examples of the method, apparatuses, and non-transitory computer-readable medium described herein, each of the set of multiple WUSs may be transmitted in a first time interval, each of the set of multiple WUSs associated with a same TCI state.

In some examples of the method, apparatuses, and non-transitory computer-readable medium described herein, a first set of the set of multiple WUSs may be transmitted in a first time interval and a second set of the set of multiple WUSs may be transmitted in a second time interval different from the first time interval, the first set of the set of multiple WUSs being associated with a first TCI state and the second set of the set of multiple WUSs being associated with a second TCI state.

In some examples of the method, apparatuses, and non-transitory computer-readable medium described herein, each of the set of multiple WUSs may be transmitted in a first time interval, a first set of the set of multiple WUSs being associated with a first TCI state and a second set of the set of multiple WUSs being associated with a second TCI state.

BRIEF DESCRIPTION OF THE DRAWINGS

FIGS. 16 through 23 show flowcharts illustrating methods that support WUS enhancements in accordance with one or more aspects of the present disclosure.

DETAILED DESCRIPTION

Figure 1:
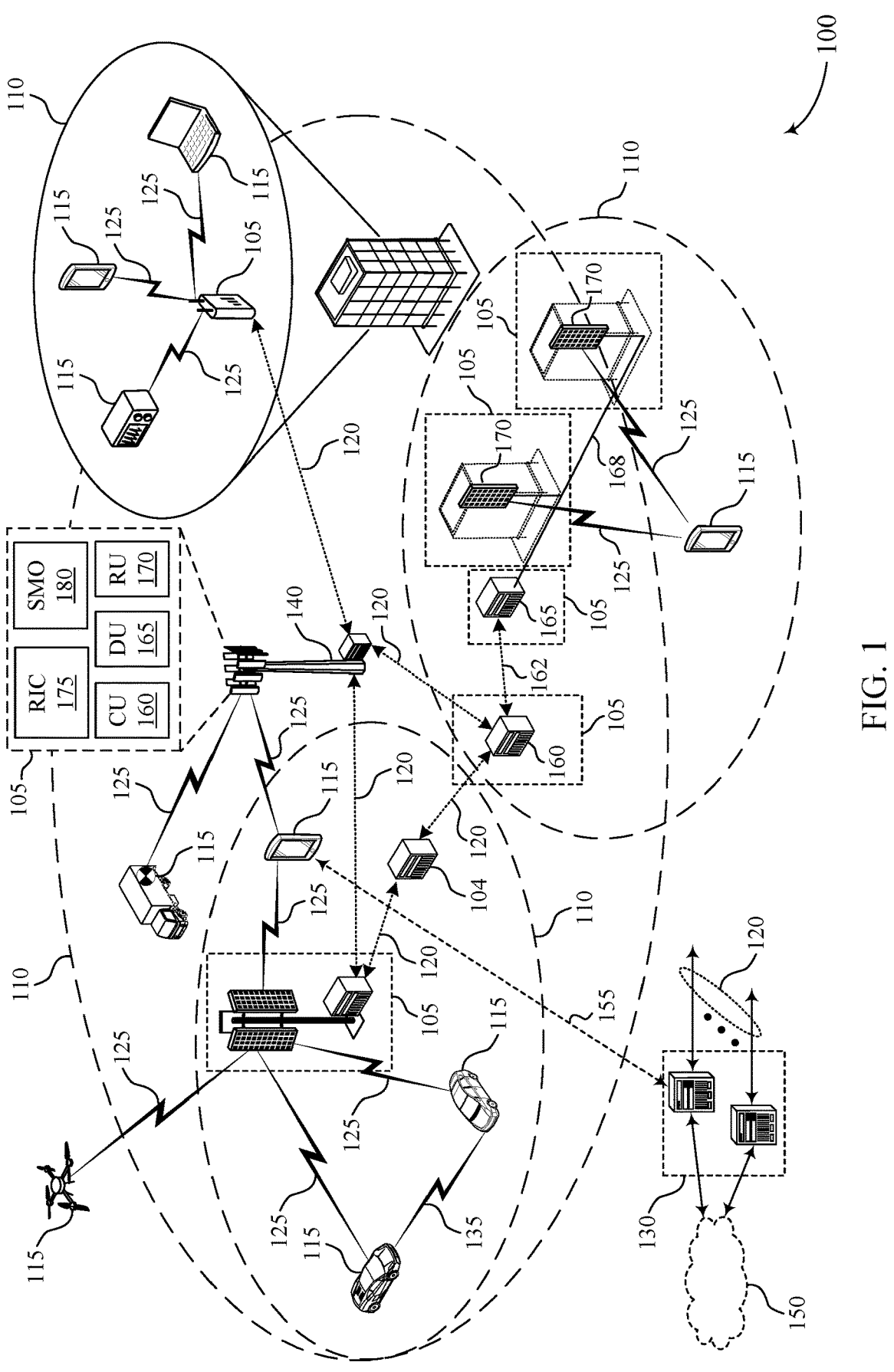
FIGS. 1 through 3 show examples of wireless communications systems that support wake-up signal (WUS) enhancements in accordance with one or more aspects of the present disclosure.

In some wireless communications system, a user equipment (UE) may operate in a sleep mode (e.g., such as a radio resource control (RRC) inactive mode) during periods when the UE is not receiving, nor transmitting, data. In such cases, the UE may periodically wake up a low-power wake-up radio (WUR) of the UE to monitor for a wake-up signal (WUS) transmitted from a network entity, where the WUS may provide an indication for the UE to wake up from the operating in the sleep mode (e.g., activate a main radio of the UE). As such, the WUS may be or include a single bit indicating whether the UE is to operate in an active mode (e.g., such as a '1' indicating to wake up and a '0' or lack of WUS indicating for the UE to continue operating in the sleep mode). In some cases, it may be desirable for the network entity to include additional commands (e.g., more than one bit of information) in the WUS, thereby improving coordination between the UE and the network entity. However, using some signaling techniques, the network entity may not be able to include such additional commands in a WUS, leading to relatively less efficient coordination between devices.

Further, the UE may periodically wake up the low-power WUR to receive one or more multiple WUSs and perform quality measurements on beams used to receive the one or more multiple WUSs. Such WUSs may be referred to as WUSs for beam tracking (WUTs). As such, if the quality measurements associated with the beams is below a threshold, then the UE may wake up and transmit a beam failure recovery request to the network entity. However, in order for the UE to measure the quality of various beams, the network entity may allocate a quantity of repeated resources for the multiple WUTs, leading to reduction in resources in the wireless communications system and a reduction in the capacity of the network entity.

The techniques, methods, and devices described herein may enable the network entity to transmit multiple bits of data as part of a WUS via index modulation. For example, the network entity may transmit, to the UE operating in an awake mode (e.g., such as an RRC active mode), a sequence configuration indicating a quantity of sequences (e.g., on-off keying (OOF) sequences) associated with a WUS and an indication of whether the sequences are transmitted via frequency-division multiplexing (FDM) (e.g., via various frequency carriers) or via time-division multiplexing (TDM) (e.g., via various time intervals). In such examples, each sequence may be indicative of a single bit of information. As such, based on the sequence configuration, the UE may receive the WUS that includes multiple respective sequences, where the respective bits associated with the multiple respective sequences indicate one or more operations for the UE to perform while operating in the sleep mode. For example, the network entity may transmit, via the sequences in the WUS, an indication for the UE to perform a beam management operation, change a periodicity associated with WUS monitoring, wake up at different rates (e.g., slow or fast), or the like. Thus, based on the respective bits indicated by the multiple sequences in the WUS, the UE may receive indications of, and perform, additional operations thereby improving coordination between devices.

Further, the techniques, methods, and devices described herein may provide hardware and signaling enhancements for the UE to implement multiple WURs in parallel, such that the UE may receive various multiple WUSs (e.g., WUTs) simultaneously via the multiple WURs. For example, the UE, while operating in an awake mode, may transmit a capability message indicating a quantity of WURs at the UE. Based on the capability message, the network entity may transmit control signaling including a WUS configuration, where the configuration indicates a quantity of multiple WUSs to be signaled and an indication of respective transmission configuration indicator (TCI) states associated with each of the multiple WUSs. As such, the UE, while operating in the sleep mode, may periodically wake up each of the WURs and simultaneously receive the multiple WUSs via one or more time intervals (e.g., time slots). In such examples, the UE may implement a controller coupled with each of the WURs, where the controller may perform the beam quality measurements and indicate to the main processor of the UE the beam quality measurements. The main processor of the UE may then determine whether to wake up and transmit the beam failure recovery request. In this way, the network entity may simultaneously transmit each the multiple WUSs via relatively less time resources, thereby reducing channel capacity.

Aspects of the disclosure are initially described in the context of wireless communications systems. Aspects of the disclosure are further described in the context of a hardware diagram, timing diagrams, and process flows. Aspects of the disclosure are further illustrated by and described with reference to apparatus diagrams, system diagrams, and flowcharts that relate to WUS enhancements.

FIG. 1 shows an example of a wireless communications system 100 that supports WUS enhancements in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support WUS enhancements as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A quasi co-location (QCL) relationship between one or more transmissions or signals may refer to a relationship between the antenna ports (and the corresponding signaling beams) of the respective transmissions. For example, one or more antenna ports may be implemented by a network entity 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power) transmitted via a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relationship between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relationship between two or more directional beams used to communicate signals. Here, the spatial parameters may indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large quantity of beams to identify a beam (e.g., the beam having a highest signal quality)). In addition, QCL relationships may exist for both uplink and downlink transmissions and, in some cases, a QCL relationship may also be referred to as spatial relationship information.

In some examples, TCI states may include one or more parameters associated with a QCL relationship between transmitted signals. For example, each TCI state includes parameters for configuring a QCL relationship between one or two downlink reference signals and the DMRS ports of PDSCH, the DMRS port of PDCCH or the CSI-RS port(s) of a CSI-RS resource. The QCL relationship is configured by a first higher layer parameter for the first downlink reference signal, and by a second higher layer parameter for the second downlink reference signal (if configured). That is, a network entity 105 may configure a QCL relationship that provides a mapping between a reference signal and antenna ports of another signal, and the TCI state may be indicated to the UE 115 by the network entity 105. In some cases, a set of TCI states (e.g., a list of TCI states) may be indicated to a UE 115 via RRC signaling, where some quantity of TCI states may be configured via RRC and one or more TCI states may be indicated (e.g., activated) via a medium access control (MAC)-control element (MAC-CE), and further indicated via downlink control information (DCI) (e.g., within a CORESET). The QCL relationship associated with the TCI state (and further established through higher-layer parameters) may provide the UE 115 with the QCL relationship for respective antenna ports and reference signals transmitted by the network entity 105.

The UE 115 may operate in an active mode (e.g., awake mode) of operation in order to communicate with the network entity 105. For example, while operating in the active mode, the UE 115-*a* may receive one or more downlink messages from the network entity 105 and transmit one or more uplink messages to the network entity 105. However, in some examples, the UE 115 may enter a sleep mode in times when there may not be data to be sent from, or received at, the UE 115. In such examples, the UE 115-*a* may operate in the sleep mode to reduce power consumption. In order to monitor for data traffic, the UE 115-*a* may periodically wake up a WUR of the UE 115-*a* to monitor for a WUS. Such WUSs may indicate that the UE 115-*a* is to wake up and resume active communications with the network entity 105 (e.g., operate in the active mode). However, while operating in the sleep mode, the UE 115 may experience one or more challenges.

That is, the UE 115 may experience one or more challenges during the reception of the WUS using a WUR. In one example, the UE 115 may experience an increase in power consumption. As such, for each WUS occasion, it may be desirable for the UE 115 to consume the least amount of power as possible, while maintaining one or more performance requirements (e.g., such as those implemented in RAN4, which may be defined for physical downlink control channel (PDCCH) reception) and blocker robustness. To reduce power consumption, the UE 115 may implement a low-power (e.g., and low performance) analog or digital WUR. Further, the UE 115 may implement power-optimized false alarm (FA) and/or miss detection (MD) performance metrics.

In another example, the UE 115 may experience challenges in the wake-up time of the main radio and baseband chip of the UE 115. For example, the UE 115 may have a capability to wake up the main radio and baseband chip within three milliseconds of receiving the WUS. However, if the network entity 105 transmits a grant indicating one or more resources for active communications within those three milliseconds, the UE 115 may not receive the grant thereby delaying active communications. As such, the network entity 105 may schedule the grant within a 15 millisecond window, in order to give the UE 115 time to wake up the main radio and baseband chip and receive such grants. In such examples, the UE 115 may implement an opportunistic or conditional WUR strategy.

In another example, the UE 115 may experience challenges in the frequency tracking loop (FTL) and time tracking loop (TTL) warm up time. That is, while the UE 115 is operating in the sleep mode, the oscillator of the UE 115 (e.g., the time tracking component of the UE 115) may diverge. As such, an automatic gain control (AGC) loop, the FTL, and the TTL of the UE 115 may be inoperable (e.g., down) to avoid power consumption. To overcome such challenges, the UE 115 may implement a machine learning approach for frequency offsets. Further, the UE 115 may receive various aperiodic-tracking reference signals (A-TRL) in order to maintain the oscillator at the UE 115.

In another example, the UE 115 may experience challenges in beam tracking while operating in the sleep mode. For example, while operating in the sleep mode, one or more beam pairs, modules, or the like, may change for the UE 115.

As such, when the UE 115 resumes active operations, the UE 115 may not have a beam pair to use for communications with the network entity 105, leading to beam failure and an increase in latency in the system. As such, the UE 115 may perform beam sweeping per beam using multiple WUSs. By receiving such repetitions of WUSs, the UE 115 may experience less power consumption for beam tracking (e.g., multiple WUSs may solve the so-called "power hungry" wakeup experienced at the UE 115). However, the UE 115 may continue to periodically wake up, to monitor one or more reference signals (e.g., such as SSBs) for beam tracking, which may also result in increased power consumption. To solve this, the network entity 105 may transmit the WUSs with various waveforms and approaches (e.g., otherwise referred to as WUTs), which may be suitable for WUR detection and quality estimation. However, such waveforms may be associated with additional transmissions of reference signals, which may increase overhead and power consumption for the UE 115.

In another example, the UE 115 may experience challenges with the amount of data signaled via the WUS. For example, the WUS may exist or not exist, meaning a single bit of data is transmitted per message. For example, the UE 115 may wake up the WUR once per discontinuous reception (DRX) cycle and monitor for a WUS from the network entity 105. If the UE 115 detects the WUS, then the UE 115 may wake up and resume active communications. However, if the UE 115 does not detect the WUS, then the UE 115 may continue to operate in the sleep mode. In this way, the network entity 105 either transmits the WUS (e.g., meaning a '1' is implicitly indicated) or refrains from transmitting the WUS (e.g., meaning a '0' is implicitly indicated).

As such, the UE 115 may implement an index modulation approach, in order to indicate multiple bits of data via the WUS. That is, the network entity 105 may use an index modulation approach in order to indicate more than a single bit of information or control bit via a WUS. Such specification, architecture modifications, and link budget related simulations may be further described herein with reference to FIGS. 2 and 6.

For example, the network entity 105 may transmit, to the UE 115 operating in an active mode, a configuration indicating a quantity of sequences (e.g., OOF sequences) associated with a WUS and an indication of whether the sequences are transmitted via FDM (e.g., via various frequency carriers) or via TDM (e.g., via various time intervals). In such examples, each sequence may be indicative of a single bit of information. As such, based on the configuration, the UE 115 may receive the WUS that includes multiple respective sequences, where the respective bits associated with the multiple respective sequences indicate one or more operations for the UE 115 to perform while operating in the sleep mode. For example, the network entity 105 may transmit, via the sequences in the WUS, an indication for the UE 115 to perform a beam management operation, change a periodicity associated with WUS monitoring, or the like. Thus, based on the respective bits indicated by the multiple sequences in the WUS, the UE 115 may receive indications of, and perform, additional operations thereby improving coordination between devices.

Further, the techniques, methods, and devices described herein may provide hardware and signaling enhancements for the UE 115 to implement multiple WURs in parallel, such that the UE 115 may receive various multiple WUSs (e.g., WUTs) simultaneously via the multiple WURs. For example, the UE 115, while operating in an awake mode, may transmit a capability message indicating a quantity of WURs at the UE 115. Based on the capability message, the network entity 105 may transmit control signaling including a WUS configuration, where the WUS configuration indicates a quantity of multiple WUSs to be signaled and an indication of respective TCI states associated with each of the multiple WUSs. As such, the UE 115, while operating in the sleep mode, may wake up each of the WURs (e.g., periodically wake up the WURs) and receive the multiple WUSs. In such examples, the UE 115 may implement a controller coupled with each of the WURs, where the controller may perform the beam quality measurements and indicate to a main processor of the UE the beam quality measurements. The main processor of the UE 115 may then determine whether to wake up and transmit the beam failure recovery request. In this way, the network entity 105 may simultaneously transmit each WUS repetition in via a single time resource, thereby reducing channel capacity. Such simultaneous reception using multiple WURs may be further described herein with reference to FIGS. 3 through 5D and 7.

Figure 2:
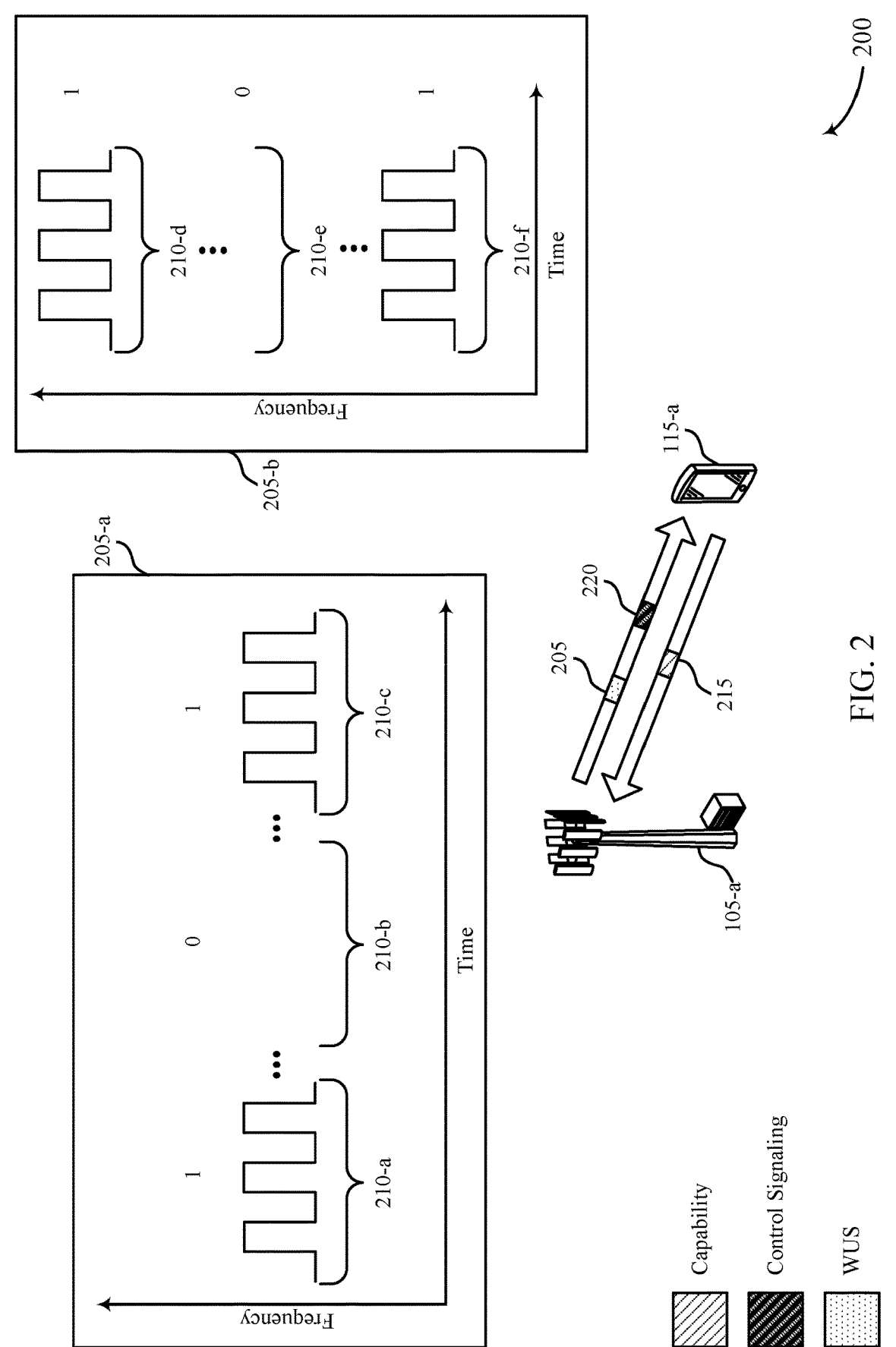

FIG. 2 shows an example of a wireless communications system 200 that supports WUS enhancements in accordance with one or more aspects of the present disclosure. The wireless communications system 200 may implement or be implemented by aspects of wireless communications system 100 with reference to FIG. 1. For example, the wireless communications system 200 may include a network entity 105-a and a UE 115-a, which may be examples of corresponding devices as described herein. The wireless communications system 200 may implement one or more techniques for signaling multiple bits of information via a WUS 205.

In some cases, the UE 115-a, while operating in an awake mode (e.g., RRC active mode) may transmit one or more uplink messages to the network entity 105-a and receive one or more downlink messages from the network entity 105-a. However, in cases when there may be a lack of signaling or data traffic between the UE 115-a and the network entity 105-a, the UE 115-a may enter a sleep mode (e.g., RRC inactive or sleep mode) in order to conserve power. As such, the UE 115-a may periodically wake up each DRX cycle, to monitor for a potential WUS 205 using a low-power WUR. If the UE 115-a detects, via the WUR, the presence of the WUS 205 (e.g., which the network entity 105 would transmit at a threshold time period before the main traffic), then the UE 115-a may trigger the wake up of the main radio and the baseband chip of the UE 115-a in order to resume active communications with the network entity 105-a. Using some techniques, however, the WUS 205 may be transmitted via a physical downlink control channel (PDCCH), which may lead the UE 115-a to use a power receiver that consumes relatively more power. As such, the UE 115-a may experience power savings by implementing various WUS formats or WURs.

For example, using conventional techniques, the network entity 105-a may transmit a single bit of information via the WUS 205 (e.g., to either continue sleeping or to wake up). As such, it may be desirable to include more information in the WUS 205. For example, it may be desirable for the network entity 105-a to indicate one or more wake-up operations in the WUS 205, such as to continue sleeping, to change a periodicity of monitoring for the WUS 205, to perform a wake-up operation within a time window (e.g., to wake up fast or slow), to wake up for beam search, or the like. However, the network entity 105-a may not be able to indicate such additional information via the WUS 205, resulting in less efficient coordination between devices and an inefficient use of resources.

In some implementations, the network entity 105-a may transmit a WUS 205 that includes one or more sequences 210, where each sequence 210 may indicate a single bit of information. That is, the network entity 105-a may transmit one or more narrow band time domain sequences 210 (e.g., similar to OOK sequences that are based on a binary pseudorandom binary sequence (PRBS)), where such sequences 210 may have a distribution of '1' or '0'. Further, the network entity 105-a may determine a length of each sequence 210 based on a quantity of UEs 115 supported by, or in communication with, the network entity 105-a, or based on the processing gains of the UEs 115. In such examples, the network entity 105-a may determine the length of the sequences 210 based on a threshold (e.g., maximum) value between both the quantity of UEs 115 supported and the processing gains of each UE 115. In order to keep the same numerology for the sequences 210 in the wireless communications system 200, the network entity 105-a may align each symbol length, such that each sequence 210 (e.g., each bit) may have duration of a single OFDM symbol. As an illustrative example, for 120 kHz subcarrier spacing, the network entity 105 may transmit each sequence 210 in an OFDM symbol, where the OFDM symbol may have a throughput of 112 kilobits per second. Further, each sequence 210 may be transmitted with a relatively low peak-to-average power ratio (PAPR).

In order to indicate additional information (e.g., add additional bits of information) to the WUS 205, the network entity 105-a may use index modulation using FDM. TDM, or a combination thereof. In the example of TDM, the network entity 105-a may transmit a WUS 205-a with a quantity of sequences 210 (e.g., N OOK sequences: sequence 210-a, sequence 210-b, and sequence 210-c) via multiple time intervals of the same frequency carrier. In such examples, the UE 115-a may use a WUR without additional hardware being applied to the UE 115-a. As such, the total consumed power of receiving the WUS 205-a may be increased by the quantity of sequences 210 (e.g., N sequences 210).

In the example of FDM, the network entity 105-a may transmit a WUS 205-b with a quantity of sequences 210 (e.g., N OOK sequences: a sequence 210-d, a sequence 210-e, and a sequence 210-f) via multiple frequency carriers of the same time interval. In such examples, the UE 115-a may use one or more coherent WURs coupled with a controller to receive and analyze the sequences 210 (e.g., potential bits) on each carrier and receive the index modulated sequence. Further, in such examples (e.g., receiving each sequence 210 in separate frequency carriers), the UE 115-a may implement a coherent WUR that is capable of receiving each sequence 210 via multiple carriers as part of the WUS 205.

The UE 115-a may receive such WUSs 205 via FDM, TDM, or both based on a capability of the UE 115-a. For example, the UE 115-a, while operating in an awake mode, may transmit a capability message 215 (e.g., via L3 signaling), where the capability message 215 indicates a capability of the UE 115-a to receive an index modulated WUS 205 (e.g., receive multiple sequences 210 in the WUS 205). Further, the UE 115-a may indicate, via the capability message 215, a quantity of bits (e.g., a quantity of sequences 210) the UE 115-a is capable of receiving in the WUS 205 and whether the UE 115-a supports receiving the various sequences 210 via FDM, TDM, or both.

In response to receiving the capability message 215, the network entity 105-*a* may transmit control signaling 220 (e.g., such as L2, L3, RRC, or MAC-CE signaling, or a combination thereof) that includes a sequence configuration that indicates the type of multiplexing scheme (e.g., FDM, TDM) used for the WUS 205. The sequence configuration may further include a total quantity of bits (e.g., a total quantity of sequences 210 or N bits) associated with the WUS 205, multiple codewords (e.g., 2N codewords) associated with the sequences 210 of the WUS 205 and a mapping between the multiple codewords and one or more wake-up operations, or both.

If the network entity 105-*a* indicates that FDM is to be used for the sequences 210 of the WUS 205, then the network entity 105-*a* may also configure (e.g., indicate or allocate) one or more frequency carriers via the sequence configuration, such that the UE 115-*a* may monitor such frequency carriers and receive the sequences 210 of the WUS 205. Similarly, if the network entity 105-*a* indicates that TDM is to be used for the sequences 210 of the WUS 205, then the network entity 105-*a* may configure one or more time intervals (e.g., time slots, OFDM symbols, or the like) via the sequence configuration, such that the UE 115-*a* monitors the indicated time intervals and receive the sequences 210 of the WUS 205. In some examples, the network entity 105-*a* may signal, via the sequence configuration in the control signaling 220, information (e.g., length, PAPR, duration, or the like) regarding the sequences 210 of the WUS 205. Further, the network entity 105-*a* may indicate, via the control signaling 220, whether the sequences 210 of the WUS 205 are to be the same, or different, for each frequency carrier (e.g., for FDM) or each time interval repetition (e.g., for TDM).

Based on the received sequence configuration in the control signaling 220, the UE 115-*a* may, while operating in the sleep mode, receive the sequences 210 of the WUS 205, identify one or more wake-up operations to be performed based on the received sequences 210, and perform the identified one or more wake-up operations.

As an illustrative example, the UE 115-*a* may receive, while operating in an awake mode and via the control signaling 220, the sequence configuration indicating that the WUS 205-*a* may be transmitted using TDM. As such, the UE 115-*a* may also receive, via the sequence configuration, an indication of the quantity of sequences 210 (e.g., such as 3 bits) included in the WUS 205-*a*, a mapping between one or more codewords associated with the quantity of sequences 210 and one or more wake-up operations, an indication of one or more time intervals associated with each sequence 210 of the WUS 205-*a*, or a combination thereof.

The UE 115-*a*, while operating in a sleep mode, may receive the WUS 205-*a* that includes the sequence 210-*a*, the sequence 210-*b*, and the sequence 210-*c* in accordance with the sequence configuration. In some examples, the presence of the sequence 210-*a* and the sequence 210-*c* in the first and third time intervals may indicate a '1,' while the sequence 210-*b* (or an absence of a sequence 210) in the second time interval may indicate a '0' (e.g., sequence 210-*b* may correspond to no information being transmitted in the second time interval, or sequence 210-*b* may correspond to a sequence 210 different than the sequence 210-*a* and/or sequence 210-*c*). That is, the sequence 210-*a*, the sequence 210-*b*, and the sequence 210-*c* may indicate a codeword of '101.' In such examples, the UE 115-*a* may refer to the mapping between one or more codewords and one or more wake-up operations to identify the wake-up operation associated with the codeword '101.' Based on identifying the associated wake-up operation, the UE 115-*a* may perform, while operating in the sleep mode, the wake-up operation associated with the codeword '101' indicated via the sequences 210 of the WUS 205-*a*. It is to be understood that the WUS 205-*a* may include any quantity of sequences 210 transmitted in various time intervals, where each combination of sequences 210 (e.g., codewords) may represent various wake-up operations.

As another illustrative example, the UE 115-*a* may receive, while operating in an awake mode and via the control signaling 220, the sequence configuration indicating that the WUS 205-*a* may be transmitted using FDM. As such, the UE 115-*a* may also receive, via the sequence configuration, an indication of the quantity of sequences 210 (e.g., such as 3 bits) included in the WUS 205-*b*, a mapping between one or more codewords associated with the quantity of sequences 210 and one or more wake-up operations, an indication of one or more frequency carriers associated with each sequence 210 of the WUS 205-*b*, or a combination thereof.

As such, the UE 115-*a*, while operating in a sleep mode, may receive the WUS 205-*b* that includes the sequence 210-*d*, the sequence 210-*e*, and the sequence 210-*f* in accordance with the sequence configuration. In some examples, the presence of the sequence 210-*d* and the sequence 210-*f* in the first and third frequency carriers may indicate a '1,' while the sequence 210-*e* in the second frequency carrier (or the absence of a sequence 210) may indicate a '0' (e.g., sequence 210-*e* may correspond to no information being transmitted in the second frequency carrier, or sequence 210-*e* may correspond to a sequence different than the sequence 210-*d* and/or sequence 210-*f*). That is, the sequence 210-*d*, the sequence 210-*e*, and the sequence 210-*f* may indicate a codeword of '101.' In such examples, the UE 115-*a* may refer to the mapping between one or more codewords and one or more wake-up operations to identify the wake-up operation associated with the codeword '101.' Based on identifying the associated wake-up operation, the UE 115-*a* may perform, while operating in the sleep mode, the wake-up operation associated with the codeword '101' indicated via the sequences 210 of the WUS 205-*b*. It is to be understood that the WUS 205-*b* may include any quantity of sequences 210, where each combination of sequences 210 (e.g., codewords) may represent various wake-up operations.

Such wake-up operations may include an operation to continue operating in the sleep mode, an operation to update a periodicity associated with monitoring for the WUS 205, an operation to wake up for beam management, an operation to wake up at a first time period (e.g., to wake up in a first time interval), an operation to wake up within a time threshold (e.g., wake up slowly, wake up quickly, wake up at some predefined speed or rate), an operation to wake up using a low-power mode, or an operation to wake up using a high-power mode, or the like. It is to be understood that any additional operations may be indicated to the UE 115-*a* via the various sequences 210 of the WUS 205.

In some examples, the network entity 105-*a* may transmit the WUS 205 in a range extension mode using either FDM or TDM (e.g., in cases when a non-index modulation mode may be configured). In such examples, for either FDM or TDM, the network entity 105-*a* may transmit, via more than a single frequency carrier or a time interval repetition, the same sequence 210 on each frequency carrier or time interval repetition. In such examples, a controller of the UE 115-*a* may combine the outputs from all frequency carriers or time interval repetitions, such that the signal strength or processing gains of the UE 115-a may be increased by the additional repetitions. Such processing gains may be increased by $\log_{10}(N)$, where N may represent the quantity of repetitions of the sequence 210 associated with the WUS 205. Further, in the case of range extension using TDM, the UE 115-a may implement, or otherwise allocate, an extra memory buffer in order to store the repetitions of the sequence 210.

In some examples, the UE 115-a may receive, while operating in the awake mode and via the control signaling 220, the sequence configuration indicating that the WUS 205 is to be received via FDM. In such examples, the network entity 105-a may indicate, via the sequence configuration, that the quantity of sequences 210 in the WUS 205-b may be '1' and that a total quantity of frequency carriers is to be greater than '1.' That is, the network entity 105-a may indicate, via the sequence configuration, that each sequence 210 of the WUS 205-b is to be the same for all frequency carriers.

Additionally, or alternatively, the network entity 105-a may indicate, via the sequence configuration, the relevant sequence 210 per frequency carrier. For example, the network entity 105-a may indicate that the sequence 210-d of the WUS 205-b may be transmitted (e.g., a single sequence 210 is transmitted) via multiple frequency carriers (e.g., via more than a single frequency carrier).

In some examples, the UE 115-a may receive, while operating in the awake mode and via the control signaling 220, the sequence configuration indicating that the WUS 205 is to be received via TDM. In such examples, the network entity 105-a may indicate that the quantity of sequences 210 in the WUS 205-a may be '1' and that a total quantity of time intervals (e.g., repetitions) is to be greater than '1.' That is, the network entity 105-a may indicate that each sequence 210 of the WUS 205-a is to be the same for all repetitions (e.g., for all time intervals). Additionally, or alternatively, the network entity 105-a may indicate the relevant sequence 210 per time interval (e.g., per repetition). For example, the network entity 105-a may indicate, via the sequence configuration, that the sequence 210-a of the WUS 205-b may be transmitted (e.g., a single sequence 210 is transmitted) via multiple time intervals (e.g., via more than a single repetition). That is, the UE 115-a may determine whether a first sequence (e.g., the sequence 210-a) associated with the WUS 205 is to be repeated in each frequency carrier or time interval.

As such, in response to receiving the same sequence 210 via multiple frequency carriers or time intervals, the UE 115-a combine the correlated results from the multiple frequency carriers or time intervals to improve performance. For example, if the network entity 105-a indicates that the quantity of sequences 210 (e.g., N sequences 210) is less than the quantity of frequency carriers (e.g., for FDM) or the quantity of time intervals (e.g., repetitions for TDM) for the WUS 205, then the UE 115-a may use the repeated receptions of the same sequence 210 from the network entity 105-a to improve reliability metrics, quality metrics, range of communication, or other performance metrics.

Figure 3:
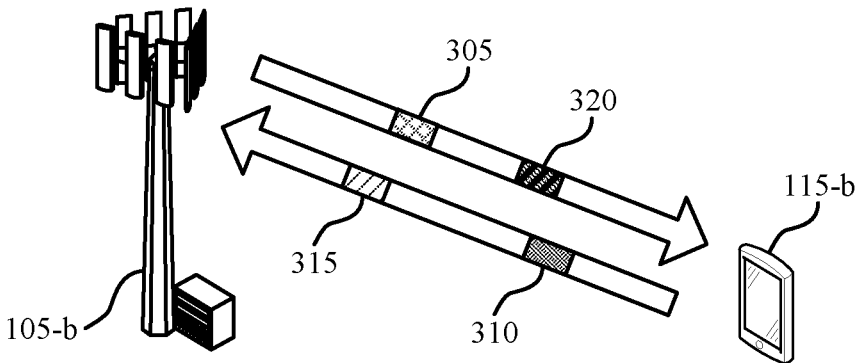
Figure 3:
Figure 3:
Figure 3:
Figure 3:

FIG. 3 shows an example of a wireless communications system 300 that supports WUS enhancements in accordance with one or more aspects of the present disclosure. The wireless communications system 300 may implement, or be implemented by, aspects of the wireless communications system 100 and the wireless communications system 200 as described herein. For example, the wireless communications system 300 may include a network entity 105-b and a UE 115-b, which may be examples of corresponding devices as described herein with reference to FIGS. 1 and 2. The wireless communications system 300 may implement one or more techniques to enable the UE 115-b to simultaneously receive multiple WUTs.

The UE 115-b may communicate with the network entity 105-b in an awake mode (e.g., such as an RRC active mode). For example, the UE 115-b may transmit one or more uplink messages to the network entity 105-b or receive one or more downlink messages from the network entity 105-b while operating in the awake mode. In some cases, when there may be a lack of signaling or data traffic between the UE 115-b and the network entity 105-b, the UE 115-b may enter a sleep mode (e.g., such as an RRC inactive mode) in order to conserve power. As such, while operating in the sleep mode, the UE 115-b may periodically wake up each DRX cycle and monitor for a potential WUS via a PDCCH.

In such cases, the UE 115-b may expend a relatively large amount of power performing the wake-up process (E.g., the wake-up process consumes relatively increased power and therefore contributes to increased power consumption at the UE 115-b). Thus, if the UE 115-b performs the wake-up process in response to a trigger, the UE 115-b may experience a reduction in power consumption. However, such triggering of the UE 115-b may not be feasible in the wireless communications system 300 due to existing WUS received via the PDCCH.

Thus, in order to reduce power consumption, the network entity 105-b may transmit a dedicated WUS, such that the UE 115-b, using a low-power WUR, may monitor for and receive the WUS. When the UE 115-b, using the low-power WUR, detects the dedicated WUS (e.g., which the network entity 105-b would transmit at a threshold time period before the main traffic), the UE 115-b may wake up the main radio and baseband chip of the UE 115-b to resume active communications.

The network entity 105-a may transmit the dedicated WUS with one or more distinguishing features to enable a low-power WUR of the UE 115-b to detect the dedicated WUS. For example, the network entity 105-a may transmit the dedicated WUS in the time domain and without a sparce spectrum, such that the UE 115-b may perform a single-stage wake-up. Further, the network entity 105-b may transmit the dedicated WUS via a narrow band time domain sequence (e.g., as an OOK sequence that is based on binary sequence), where the dedicated WUS may have a distribution of a '1' or a 'O' and have a relatively low PAPR. Further, the network entity 105-a may determine a length of the sequence based on the quantity of UEs 115 supported at the network entity 105-b and a required processing gain of the dedicated WUS. That is, the network entity 105-b may determine the length of the single sequence in the dedicated WUS based on a threshold (e.g., maximum) quantity between the quantity of UEs 115 supported at the network entity 105-b and the processing gain of the dedicated WUS. To keep the same numerology for the sequence in the wireless communications system 300, the network entity 105-b may align each symbol length, such that the sequence (e.g., bit) may have duration of single OFDM symbol. As an illustrative example, for a 120 kHz subcarrier spacing, the network entity 105-b may transmit the sequence of the WUS in an OFDM symbol, where the OFDM symbol may have a throughput of 112 kilobits per second. As such, the UE 115-b may implement a WUR in order to receive the dedicated WUS, where the WUR may be configured with a sensitivity to receive the WUS, reduce power consumption, and reduce interference rejection.

In some cases, the UE 115-*b* may experience challenges in beam tracking while operating in the sleep mode. For example, while operating in the sleep mode, one or more beam pairs, modules, or the like, may change for the UE 115-*b*. As such, when the UE 115-*b* resumes active operations, the UE 115-*b* may not have a beam pair to use for communications with the network entity 105-*b*, leading to beam failure and an increased in latency in the system. Thus, to reduce such beam tracking failures, the UE 115-*b* may periodically wake up (e.g., in accordance with a decimated periodicity of SSBs) and perform beam quality measurements using a single WUR, where the single WUR may be used to estimate the quality based on multiple WUTs 305.

For example, the UE 115-*b* may periodically wake up the WUR, monitor for a WUT using multiple receive beams, and evaluate the quality of the receive beams. If the evaluated quality is not above a quality threshold (e.g., a predefined threshold, which may be an example of a counter that reaches a predefined threshold), then the UE 115-*b* may perform a wake up procedure to wake up the main radio and baseband chip of the UE 115 and transmit a beam failure recovery request 310. Further, the UE 115-*b* may initiate an active beam search and recovery procedure to identify a beam pair to use for communications with the network entity 105-*b*.

To facilitate beam tracking at the UE 115-*b* while operating in the sleep mode, the network entity 105-*b* may allocate a quantity of repeated resources (e.g., repeated time and frequency resources) for the multiple WUTs 305 (e.g., N resources for N multiple WUTs 305), such that the UE 115-*b* may sweep each receive beam, receive each WUT of the multiple WUTs 305, and measure the quality. Further, the network entity 105-*b* may sweep the TCI states associated with each WUT of the multiple WUTs 305 to identify a transmission beam to use for communications with the UE 115-*b*. However, the allocation of repeated resources for the multiple WUTs 305 may reduce the capacity of the wireless communications system 300, resulting in reduced bandwidth, increased latency, an inefficient use of resources.

In some implementations, the UE 115-*b* may implement multiple (e.g., N) WURs in parallel, such that the UE 115-*b* may simultaneously receive multiple WUSs, multiple WUTs 305, or both via multiple receive beams (e.g., each associated with a respective WUR) and one or more TCI states. In such implementations, the multiple WURs may be ultra-low-power and low-area block (e.g., be relatively small as to not consume a relatively large amount of space of the UE 115-*b*), such that both cost and power consumption may not burden the implementation of WURs in the UE 115-*b*. Further, the UE 115-*b* may implement a hardware controller coupled with each WUR and with the main radio and baseband chip of the UE 115-*b*, where the hardware controller may coordinate between each WUR and be a coordinator and buffer between each WUR and the main radio and baseband chip of the UE 115-*b*. Such hardware connections and functionality may be further described herein with reference to FIG. 4.

In some examples, the UE 115-*b*, while operating in the awake mode, may transmit a capability message 315 indicating a quantity of WURs at the UE 115-*b*. That is, the UE 115-*b* may indicate, via the capability message 315, how many parallel receive beams the UE 115-*b* may process, where the quantity of receive beams the UE 115-*b* is based on the quantity of WURs at the UE 115-*b*. The UE 115-*b* may transmit the capability message 315 via L1 signaling, L2 signaling. L3 signaling, uplink control information (UCI), RRC signaling, MAC-CE signaling, or the like.

The network entity 105-*b* may use the quantity of WURs at the UE 115-*b* to allocate resources, TCI state configurations, or both for multiple WUSs, the multiple WUTs 305, or both. For example, based on the capability message 315, the network entity 105-*b* may transmit control signaling 320 including a WUS configuration, where the WUS configuration indicates a quantity of WUTs in the multiple WUTs 305 and an indication of respective TCI states associated with each of the multiple WUTs 305. In such examples, the UE 115-*b* may receive such control signaling 320 while operating in the awake mode. The control signaling 320 may further indicate one or more periodic resources associated with the multiple WUTs 305. The control signaling 320 may be an example of L1 signaling, L2 signaling, L3 signaling, DCI, RRC signaling, MAC-CE signaling, or the like.

As such, the UE 115-*b*, while operating in the sleep mode, may periodically wake up each of the WURs and receive the multiple WUTs 305 via various receive beams associated with each WUR. In such examples, the controller of the UE 115-*b* may estimate the qualities of the various receive beams. As such, if the quality of the receive beams is below the quality threshold, then the controller of the UE 115-*b* may trigger the main radio and baseband chip of the UE 115-*b* to wake up and transmit the beam failure recovery request 310. Alternatively, if the quality of the receive beams satisfies (e.g., is equal to or greater than) the quality threshold, then the controller of the UE 115-*b* may indicate to a main radio and baseband chip to continue operating in the sleep mode. As such, the UE 115-*b* may continue to periodically wake up the WURs of the UE 115-*b*, receive the multiple WUTs 305 via receive beams of the WURs, and estimate the quality of the receive beams.

In some examples, the network entity 105-*b* may transmit multiple WUSs based on the capability message 315. In such examples, the UE 115-*b* may periodically wake up the WURs and monitor for the multiple WUSs using one or more receive beams associated with each WUR. As such, using the parallel WURs, the UE 115-*b* may simultaneously receive the multiple WUSs and operate in accordance with the information indicated by the multiple WUSs (e.g., continue sleeping or wake up).

In this way, the UE 115-*b* has the ability to process one or more receive beams in parallel for beam tracking and wake-up stages. Further, the network entity 105-*b* may transmit the multiple WUTs 305 via relatively fewer resources, thereby reducing overhead and increasing channel capacity in the wireless communications system 300.

Figure 4:
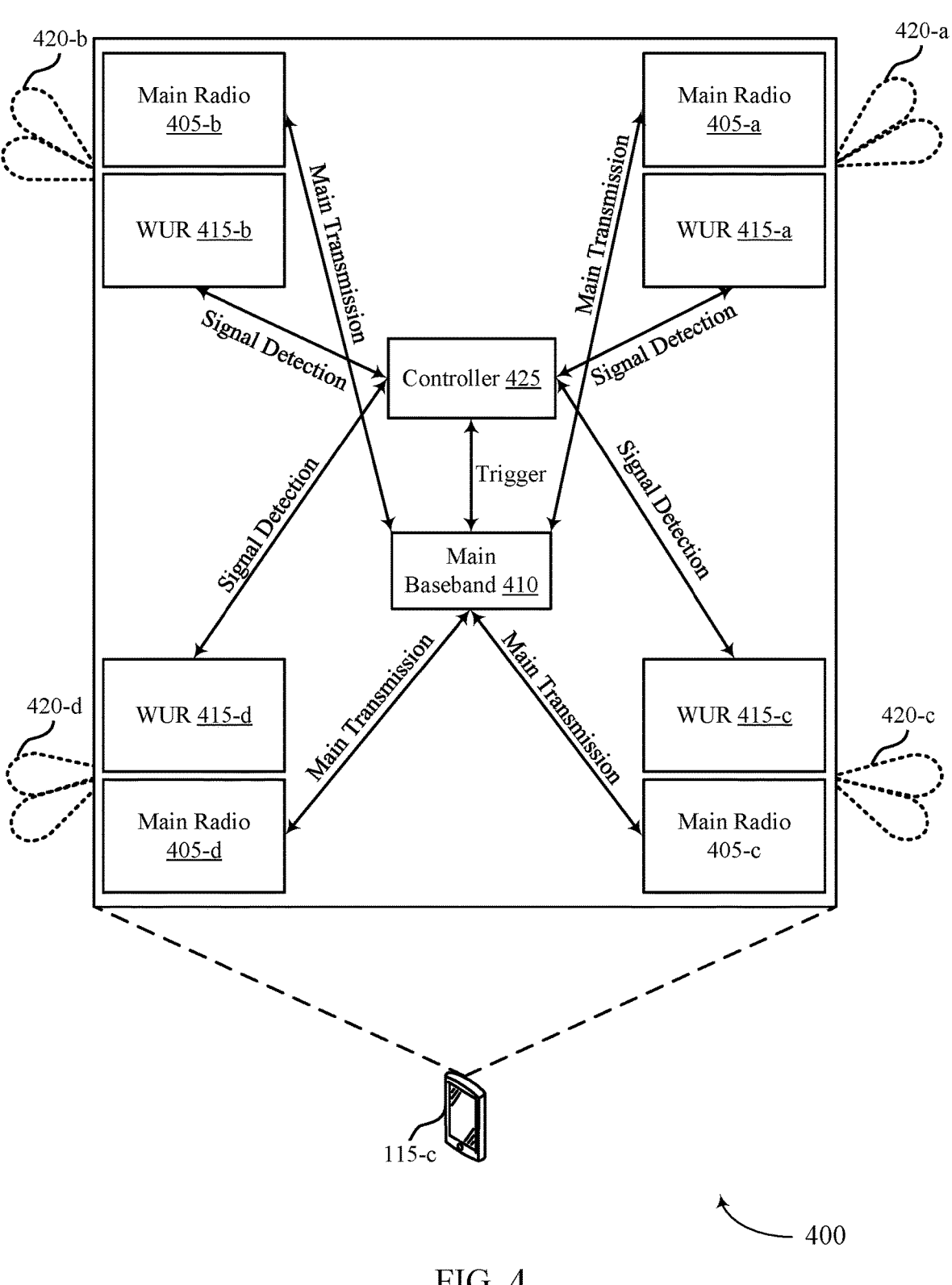
FIG. 4 shows an example of a hardware diagram that supports WUS enhancements in accordance with one or more aspects of the present disclosure.

FIG. 4 shows an example of a hardware diagram 400 that supports WUS enhancements in accordance with one or more aspects of the present disclosure. Aspects of the hardware diagram 400 may be implemented by aspects of the wireless communications system 100, the wireless communications system 200, and the wireless communications system 300 as described herein. For example, the hardware diagram 400 may include one or more hardware enhancements to a UE 115-*c*, such that the UE 115-*c* may receive multiple WUTs or multiple WUSs simultaneously, as described herein with reference to FIG. 3.

For example, the UE 115-*c* may implement multiple main radios 405 in various positions of the UE 115-*c*, such that each main radio 405 may cover one or more beam pointing directions. As an illustrative example, the UE 115-*c* may implement a main radio 405-*a*, a main radio 405-*b*, a main radio 405-*c*, and a main radio 405-*d*, where the combination of each main radio 405 may span various beam pointing directions.

In such examples, the UE 115-*c* may include a main baseband 410 coupled with each main radio 405. The main baseband 410 may receive digital data from one or more processors of the UE 115-*c* and convert the digital data into radio frequency signals. As such, each main radio 405 may receive one or more parameters of associated with the radio frequency signals from the main baseband 410 and transmit the main transmission via the radio frequency signals. Further, the main radios 405 may receive one or more transmissions and indicate such signals to the main baseband 410, where the main baseband 410 may convert such radio frequency signals into digital data.

The main baseband 410 may control the main radios 405 while the UE 115-*c* is operating in an awake mode. In some examples, however, the UE 115-*c* may operate in a sleep mode during periods when there may be a lack of signaling or data traffic between a network and the UE 115-*c*. As such, in accordance with the techniques described herein, the UE 115-*c* may implement multiple WURs 415 in parallel, such that the UE 115-*c*, while operating in a sleep mode, may simultaneously receive multiple WUTs or multiple WUSs via the WURs 415 and analyze various receive beams 420 (e.g., a receive beam 420-*a*, a receive beam 420-*b*, a receive beam 420-*c* and a receive beam 420-*d*) associated with each WUR 415. In such examples, the UE 115-*c* may implement a controller 425 coupled with each WUR 415, where the controller 425 may manage operations at each WUR 415.

For example, while operating in the sleep mode, the controller 425 may periodically wake up each WUR 415 to monitor for the reception of multiple WUSs, multiple WUTs, or both. As an illustrative example, the controller 425 may periodically wake up each WUR 415 to monitor for multiple WUSs according to a WUS configuration (e.g., as described herein with reference to FIG. 3). In such examples, in response to waking-up each WUR 415, the controller 425 may be in a holding state (e.g., on hold) until receiving a trigger (e.g., signal detection) from one or more WURs 415 that have detected one of the multiple WUSs.

In some examples, each WUR 415 may simultaneously detect a WUS of the multiple WUSs. For example, a WUR 415-*a* may detect a first WUS of the multiple WUSs, while a WUR 415-*b* may detect a second WUS of the multiple WUSs. Likewise, a WUR 415-*c* may detect a third WUS of the multiple WUSs, while a WUR 415-*d* may detect a fourth WUS of the multiple WUSs. In such examples, the WURs 415 may indicate to the controller 425 that a WUS has been detected.

Based on receiving the indication that the WUS has been detected, the controller 425 may trigger the main baseband 410 to wake up the main radios 405 and resume active communications. The main baseband 410 may begin to initiate communications via the main radio 405 with the relatively highest signal strength (e.g., use a best main radio 405-*a*), where the main baseband 410 may determine such main radio 405 in accordance with a physical indicator that is estimated based on received the WUS (e.g., based on correlation results). That is, the controller 425 may estimate, based on receiving the various multiple WUSs, a signal strength associated with each WUS. As such, based on such results, the main baseband 410 may determine to use a main radio 405 that is associated with a WUR 415 that received a WUS with a threshold measurement value (e.g., the highest measured WUS).

Such communication techniques may be relevant for multiple WUTs. As another illustrative example, the UE 115-*c* may operate in a sleep mode. As such, the controller 425 may periodically wake up each WUR 415-*b* to monitor for multiple WUTs. In response to detecting multiple WUTs, each WUR 415 may trigger the controller 425.

For example, the WUR 415-*a* may receive a first WUT of the multiple WUTs, while the WUR 415-*b* may receive a second WUT of the multiple WUTs. Likewise, the WUR 415-*c* may receive a third WUT of the multiple WUTs, while the WUR 415-*d* may receive a fourth WUT of the multiple WUTs. In such examples, each WUR 415 may transmit, to the controller 425, an indication of correlation results at the same time, such that the controller may monitor for the receive beam 420 or TCI state with the relatively highest quality metrics while the main baseband 410 is operating in the sleep mode. That is, in response to receiving the multiple WUTs, each WUR 415 may transmit an indication of the reception results (e.g., quality correlation results) to the controller 425. The controller 425 may use such reception result to determine whether to trigger the wake-up of the main baseband 410. For example, the WUR 415-*a* may receive, via the receive beam 420-*a*, a first WUT from the multiple WUTs, where the controller 425 may measure one or more quality metrics (e.g., such as received power or signal-to-noise ratio) of the receive beam 420-*a*. As such, if such quality metrics are below a predefined or pre-configured quality threshold, the controller 425 may trigger the main baseband 410 to wake up and perform a beam recovery procedure. Such techniques may be further described herein with reference to FIGS. 5A through 5D.

In this way, the UE 115-*c* may monitor for, and receive, multiple WUTs or multiple WUSs simultaneously using multiple parallel WURs 415, thereby reducing communication overhead and resulting in more efficient use of communication resources. Although illustrative examples may be described herein, it should be understood that a subset of the WURs 415 may be awoken or used to detect multiple WUTs or multiple WUSs. Further, although illustrated with four WURs 415, the UE 115-*c* may implement any quantity of WURs 415, and the examples described herein should not be considered limiting to the scope of the claims or the disclosure.

Figure 5A:
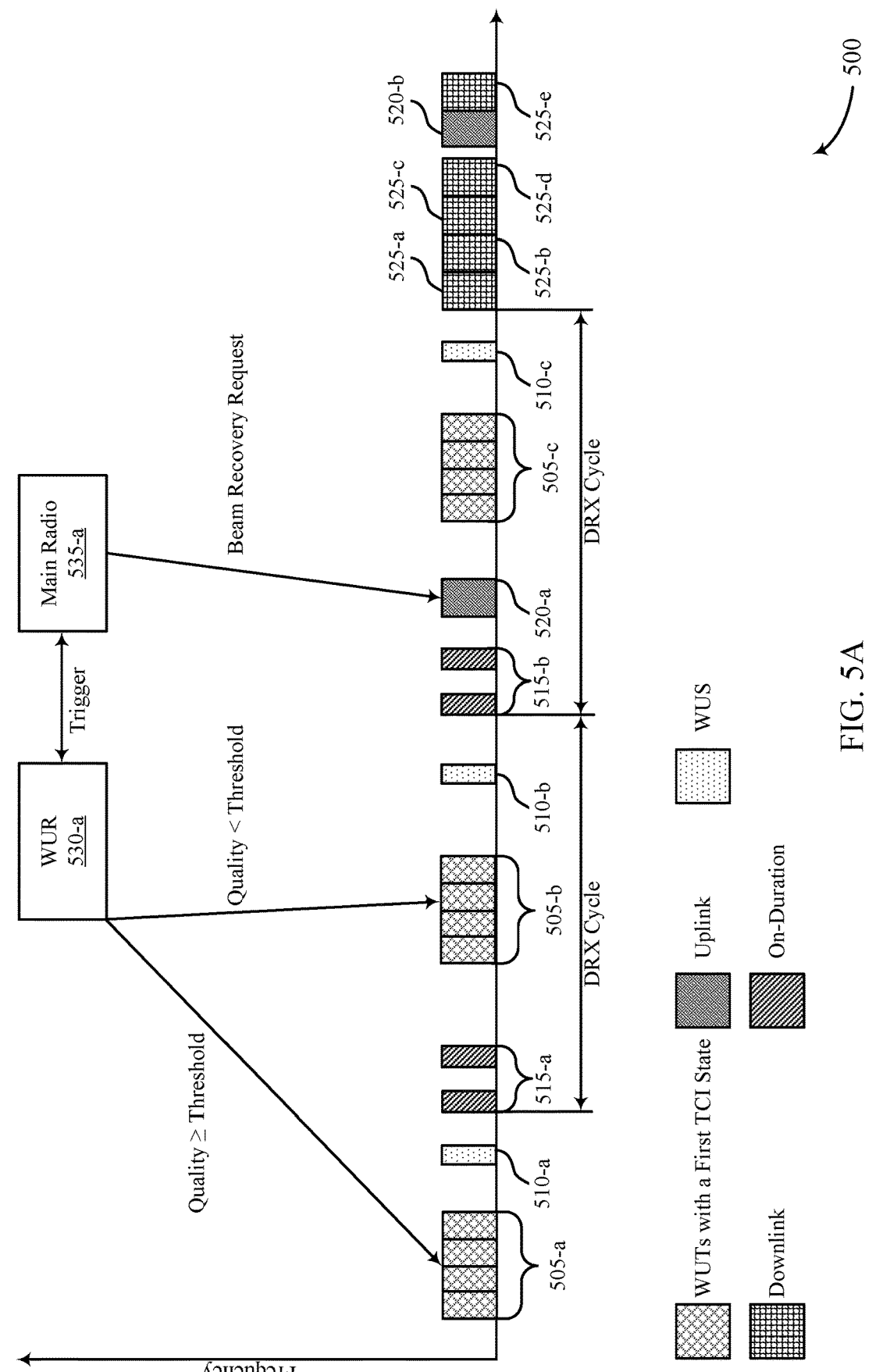
FIGS. 5A, 5B, 5C, and 5D shows examples of timing diagrams that support WUS enhancements in accordance with one or more aspects of the present disclosure.

FIGS. 5A through 5D show examples of timing diagrams 500, 501, 502, and 503 that support WUS enhancements in accordance with one or more aspects of the present disclosure. In FIG. 5A, the timing diagram 500 may be an example of a timing diagram for the reception of multiple WUTs 505 (e.g., multiple WUTs) via a single WUR 530-*a*, while the timing diagram 501, the timing diagram 502, and the timing diagram 503 may be examples of timing diagrams that support multiple WURs at the UE.

For example, the timing diagram 500 may be implemented by a UE 115 that includes a single WUR 530-*a*, which may be an example of a legacy UE 115. Further the timing diagram 500 may be implemented by a network entity 105, which may be an example of a network entities 105 as described herein with reference to FIGS. 1 through 4. In some cases of the FIG. 5A, in order to improve beam tracking for the UE 115 while operating in a sleep mode, the network entity 105 may transmit multiple WUTs 505, such that the UE 115 may perform quality measurements on each receive beam used to receive WUT of the multiple WUTs 505 and wake up the main radio 535-*a* for a beam recovery procedure if the quality measurements are below a preconfigured quality threshold.

For example, the network entity 105 may transmit, prior to the UE 115 waking up, a multiple WUTs 505-*a*, where each WUT may be associated with a first TCI state and be transmitted in respective resources (e.g., respective time intervals, respective frequency carriers, or a combination thereof). In some cases, the network entity 105 may also transmit a WUS 510-*a* to the UE 115, where the WUS 510-*a* may have a value of 0.

The UE 115 may periodically wake up the WUR 530-*a* once in a DRX cycle for an on-duration 515-*a*. As such, within the on-duration 515-*a*, the UE 115 may monitor for, and receive, each WUT of the multiple WUTs 505-*a* using the WUR 530-*a*. As such, the UE 115 may perform quality measurements on each receive beam used to receive each of the multiple WUTs 505-*a*. In some examples, the quality measurements of such WUTs may be greater than or equal to the quality threshold. In such examples, the UE 115 may resume operating in the sleep mode.

The network entity 105 may periodically transmit the multiple WUTs 505 and WUSs 510 in order to maintain communications while the UE 115 is operating in the sleep mode. For example, the network entity 105 may transmit a multiple WUTs 505-*b* and WUS 510-*b* in accordance with the periodicity. As such, the UE 115 may wake up the WUR 530-*a* in the next DRX for an on-duration 515-*b*. During the on-duration 515-*b*, the UE 115 may monitor for, and receive, the multiple WUTs 505-*b* and the WUS 510-*b*. Based on receiving the multiple WUTs 505-*b*, the UE 115 may perform quality measurements on each receive beam used to receive each of the multiple WUTs 505-*b*. In some examples, the quality measurements of such WUTs may be less than the quality threshold. In such examples, the UE 115 may trigger the main radio 535-*a* to wake up and transmit a beam recovery request in an uplink message 520-*a*. In some examples, the network entity 105-*a* may continue to periodically transmit a multiple WUTs 505-*c* and a WUS 510-*c* while processing the beam recovery request.

In response to transmitting the beam recovery request, the UE 115 may perform a beam failure recover procedure to identify a receive beam for communications and resume active communicates. For example, after performing the beam failure recovery procedure, the UE 115 may receive one or more downlink messages 525 (e.g., such as a downlink message 525-*a*, a downlink message 525-*b*, a downlink message 525-*c*, a downlink message 525-*d*, and a downlink message 525-*e*) or transmit one or more uplink messages 520, such as an uplink message 520-*b*.

However, transmitting multiple WUTs 505 (e.g., such as the multiple WUTs 505-*a*, the multiple WUTs 505-*c*, and the multiple WUTs 505-*c*) may lead to an inefficient use of resources and decreased channel capacity in the network. For example, in order to transmit such periodic multiple WUTs 505, the network entity 105 may allocate a quantity of repeated resources (e.g., time resources or slots) for the multiple WUTs 505, such that the UE 115 may use the WUR 530-*a* to receive each WUT of the multiple WUTs in the various time intervals. Such an allocation of resources may increase the signaling overhead and reduce channel capacity in the wireless communications system.

In accordance with the techniques described herein, the UE 115 may implement multiple WURs 530, such that the UE 115 may simultaneously receive (e.g., in the same time interval) each WUT of the multiple WUTs 505, thereby reducing the quantity of repeated resources allocated for beam management while the UE 115 is operating in the sleep mode. The UE 115 may implement the multiple WURs, and associated signaling techniques, as described herein with reference to FIGS. 3 and 4.

For example, the UE 115 may implement multiple WURs 530-*b*, such that the UE 115 may simultaneously receive one or more WUTs of the multiple WUTs 505. As such, the UE 115, while operating in the awake mode, may transmit a capability message (e.g., such as a capability message 315) indicating a quantity of WURs 530-*b* at the UE 115. In response to the capability message, the UE 115, while operating in the awake mode, may receive control signaling (e.g., such as control signaling 320) indicating a configuration for multiple WUTs 505, where the configuration for multiple WUTs 505 indicates a quantity of WUTs in the multiple WUTs 505 and an indication of respective TCI states associated with each of the multiple WUTs 505. Further, the configuration may indicate time and frequency resources associated with the multiple WUTs 505 and a periodicity of such multiple WUTs 505, such that the UE 115 may monitor, according to the configuration, the time and frequency resources to detect each WUT of the multiple WUTs 505.

Figure 5B:
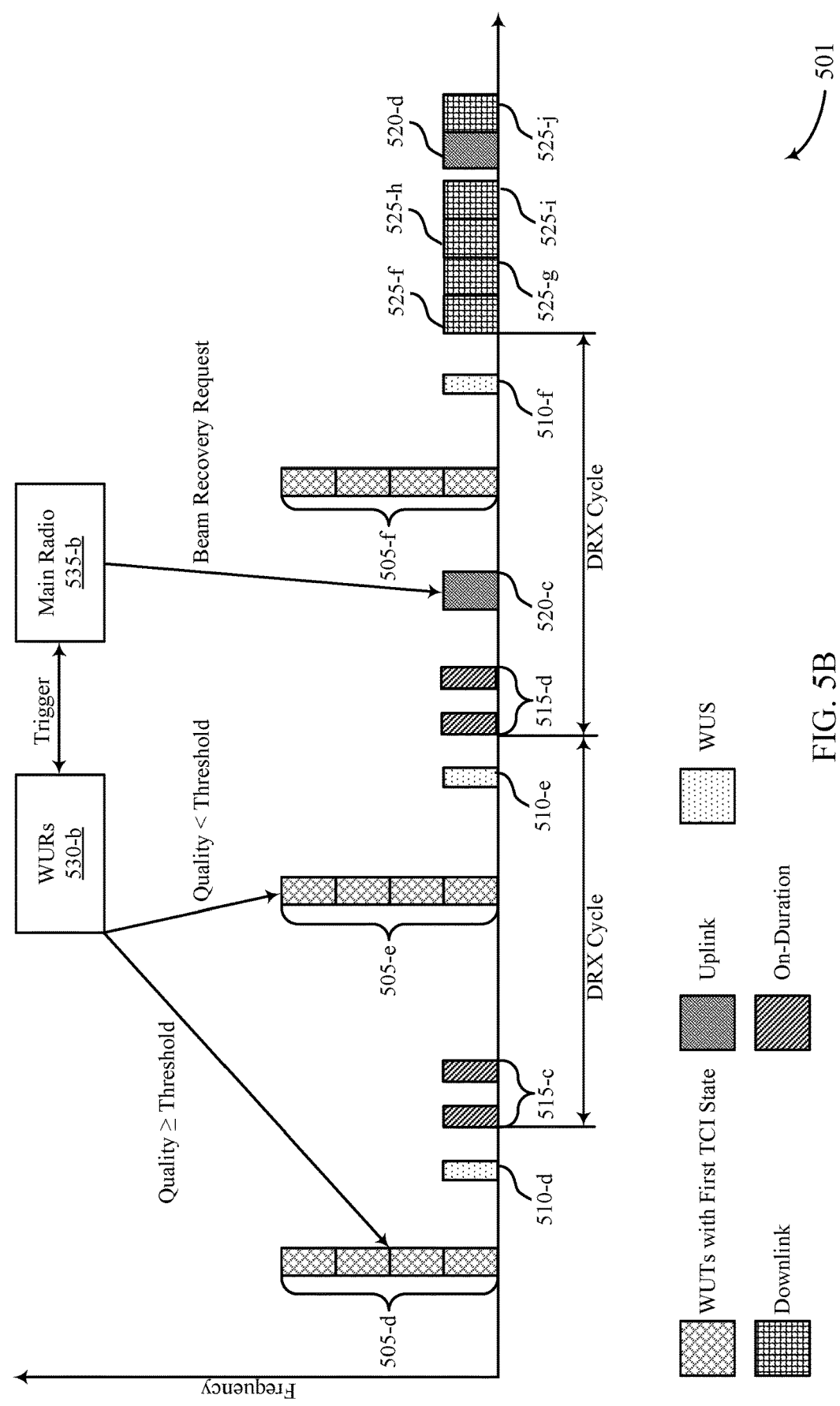
Figure 5C:
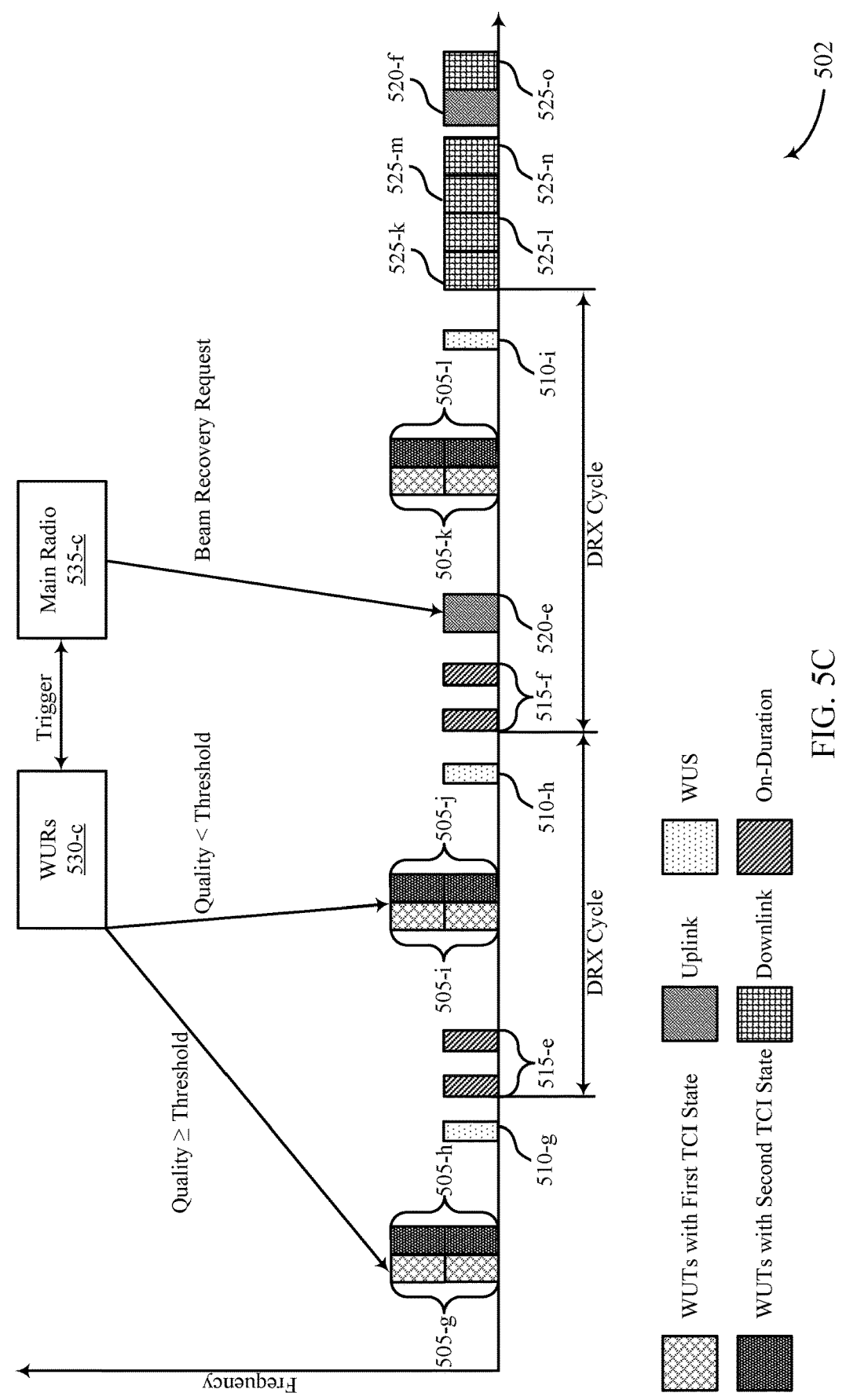
Figure 5D:
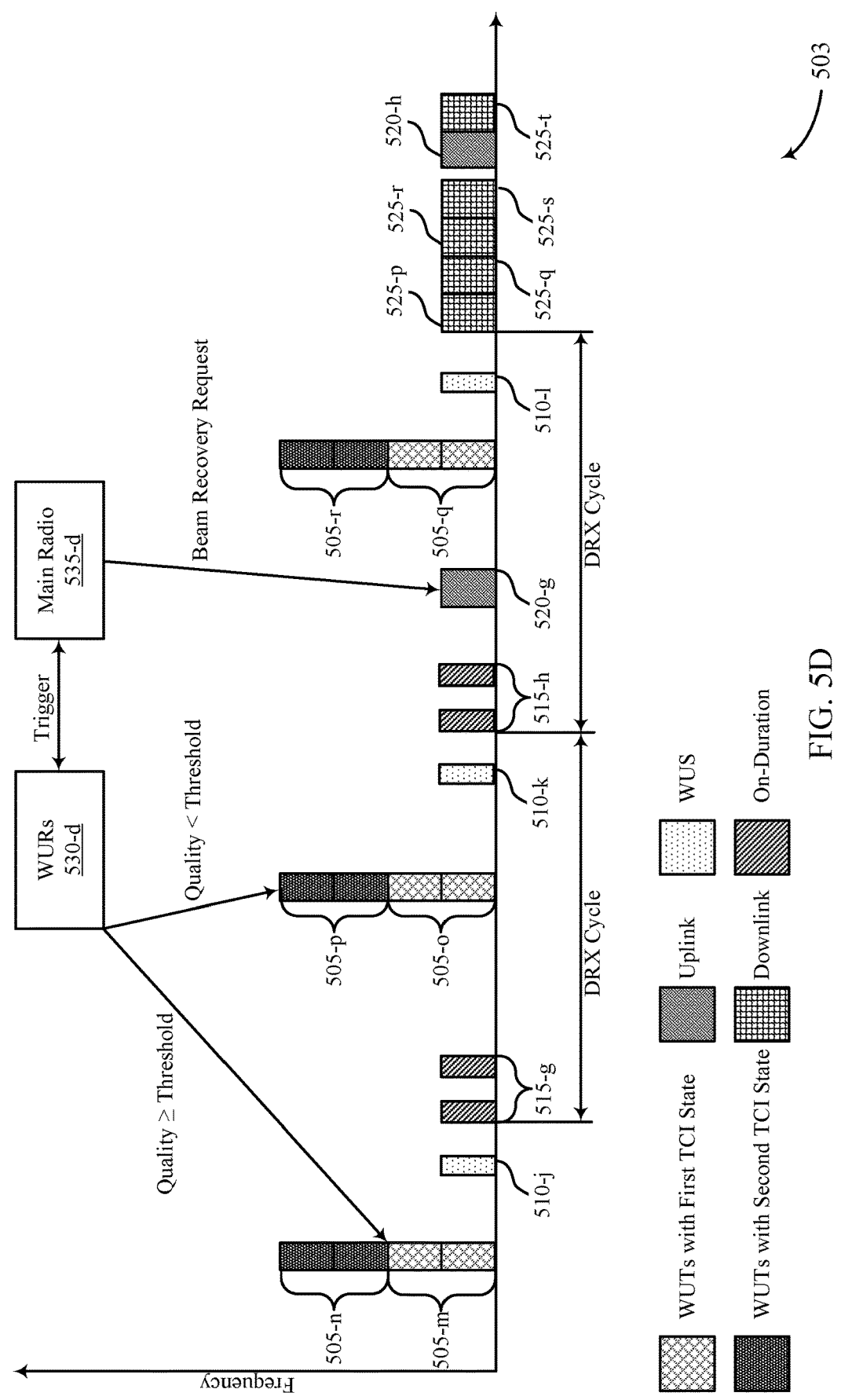

FIGS. 5B through 5D may be examples of timing diagrams 501, 502, and 503, respectively, that demonstrate various configurations of WUTs in the multiple WUTs 505. However, it is to be understood that the resource allocation for WUTs of the multiple WUTs 505 shown in FIGS. 5B through 5D are not exhaustive, and such WUTs of the multiple WUTs 505 may be allocated in various configurations. That is, a network entity 105 may transmit various WUTs of the multiple WUTs 505 according to various time and frequency resource allocations and various TCI states.

FIG. 5B In the example of FIG. 5B, the UE 115 may receive, via the configuration, an indication that each WUT of the periodic multiple WUTs 505 (e.g., multiple WUTs 505-*d*, multiple WUTs 505-*e*, and multiple WUTs 505-*f*) is to be transmitted in single TCI state and at the same time (e.g., in the same time interval). In such examples, the UE 115, while operating in the sleep mode, may wake up and use multiple WURs of the WURs 530-*b* to receive each WUT of the multiple WUTs 505. Further, in some examples, the UE 115 may receive, via one or more WURs of the WURs 530-*b*, WUS 510 in accordance with a periodicity of the WUSs 510 (e.g., such as a WUS 510-*d*, a WUS 510-*e*, and a WUS 510-*f*).

As an illustrative example, if the network entity 105 indicates, via the configuration, that the multiple WUTs 505 include four WUTs, then the UE 115 may periodically wake up four WURs out of the WURs 530-*b* and receive each WUT using four receive beams.

For example, the network entity 105 may transmit the WUTs of the multiple WUTs 505-*d* via the same time interval and with a first TCI state (e.g., same TCI state). In such examples, during a DRX cycle and in accordance with the configuration, the UE 115 may wake up the WURs 530-*b* in order to monitor the indicated time interval and various frequency carriers for the multiple WUTs 505-*d* during an on-duration 515-*c*. The UE 115 may detect, via respective WURs of the WURs 530-*b*, each WUT of the multiple WUTs 505-*d* and perform quality measurements of the receive beams used to receive such WUTs. In some examples, the UE 115 may determine that the quality measurements associated with each receive beam are greater than or equal to a quality threshold. As such, the UE 115 may continue to operate in the sleep mode.

Further, according to the periodicity of the multiple WUTs 505 indicated in the configuration, the network entity 105 may transmit the multiple WUTs 505-*e*. As such, during an on duration 515-*d* of the subsequent DRX cycle, the UE 115 may wake up one or more WURs of the WURs 530-*b* to monitor the occasions (e.g., time and frequency resources) of each WUT of the multiple WUTs 505-*e*. The UE 115 may detect, via respective WURs of the WURs 530-*b*, each WUT of the multiple WUTs 505-*e* and perform quality measurements of the receive beams used to receive such WUTs. In some examples, the UE 115 may determine that the quality measurements associated with each receive beam are less than a quality threshold. As such, a controller (e.g., such as the controller 425) of the UE 115 may trigger a main radio 535-*b* to wake up and transmit a beam recovery request via an uplink message 520-*c*. In some examples, the network entity 105 may continue to periodically transmit a multiple WUTs 505-*f* and a WUS 510-*f* while processing the beam recovery request.

In response to transmitting the beam recovery request, the UE 115 may perform a beam failure recover procedure to identify a receive beam for communications and resume active communicates. For example, after performing the beam failure recovery procedure, the UE 115 may receive one or more downlink messages 525 (e.g., such as a downlink message 525-*f*, a downlink message 525-*g*, a downlink message 525-*h*, a downlink message 525-*i*, and a downlink message 525-*j*) or transmit one or more uplink messages 520, such as an uplink message 520-*d*.

FIG. 5C In the example of FIG. 5C, the UE 115 may receive, via the configuration, an indication that a first portion of the periodic multiple WUTs 505 (e.g., multiple WUTs 505-*g*, multiple WUTs 505-*i*, and multiple WUTs 505-*k*) are to be transmitted with a first TCI state and in a first time interval, and an indication that a second portion of the periodic multiple WUTs 505 (e.g., multiple WUTs 505-*h*, multiple WUTs 505-*j*, and multiple WUTs 505-*l*) are to be transmitted with a second TCI state and in a second time interval that is subsequent to the first time interval. In such examples, the UE 115, while operating in the sleep mode, may wake up in the first time interval and use multiple WURs of the WURs 530-*c* to receive each WUT of the first portion of the multiple WUTs 505 and wake up one or more WURs of the WURs 530-*c* to receive each WUT of the second portion of the multiple WUTs 505. Further, in some examples, the UE 115 may receive, via one or more WURs of the WURs 530-*b*, WUS 510 in accordance with a periodicity of the WUSs 510 (e.g., such as a WUS 510-*g*, a WUS 510-*h*, and a WUS 510-*i*).

As an illustrative example, the network entity 105 may indicate, via the configuration, that the multiple WUTs 505-*g* (e.g., the first portion of the multiple WUTs 505) include two WUTs and are transmitted with a first TCI state and via (e.g., during) a first time interval. The configuration may further indicate that the multiple WUTs 505-*h* (e.g., the second portion of the multiple WUTs 505) include two WUTs and are transmitted with a second TCI state (e.g., double TCI state) and via a second time interval. In such examples, the UE 115 may periodically wake up, during an on-duration 515-*e* of a first DRX cycle, two WURs out of the WURs 530-*c* in the first time interval and receive each WUT of the multiple WUTs 505-*g* using two receive beams and wake up the same, or different, two WURs of the WURs 530-*c* in the second time interval to receive each WUT of the multiple WUTs 505-*h*.

In response to receiving each WUT of the multiple WUTs 505-*g* and the multiple WUTs 505-*h*, the UE 115 may perform quality measurements of the receive beams used to receive each WUT. In some examples, the UE 115 may determine that the quality measurements associated with each receive beam are greater than or equal to a quality threshold. As such, the UE 115 may continue to operate in the sleep mode.

Further, according to the periodicity of the multiple WUTs 505 indicated in the configuration, the network entity 105 may transmit the multiple WUTs 505-*i* via a first time interval and transmit the multiple WUTs 505-*j* via a second time interval. As such, during an on duration 515-*f* of the subsequent DRX cycle, the UE 115 may wake up one or more WURs of the WURs 530-*c* to monitor the occasions (e.g., time and frequency resources) of each WUT of the multiple WUTs 505-*i*. Likewise, the UE 115 may wake up one or more WURs of the WURs 530-*c* to monitor the occasions (e.g., time and frequency resources) of each WUT of the multiple WUTs 505-*j*.

The UE 115 may detect each WUT of the multiple WUTs 505-*i* and the multiple WUTs 505-*j* and perform quality measurements of the receive beams used to receive such WUTs. In some examples, the UE 115 may determine that the quality measurements associated with each receive beam are less than a quality threshold. As such, a controller (e.g., such as the controller 425) of the UE 115 may trigger a main radio 535-*c* to wake up and transmit a beam recovery request via an uplink message 520-*c*. In some examples, the network entity 105 may continue to periodically transmit the multiple WUTs 505-*k*, the multiple WUTs 505-*l*, a WUS 510-*f*, or combination thereof while processing the beam recovery request.

In response to transmitting the beam recovery request, the UE 115 may perform a beam failure recover procedure to identify a receive beam for communications and resume active communicates. For example, after performing the beam failure recovery procedure, the UE 115 may receive one or more downlink messages 525 (e.g., such as a downlink message 525-*k*, a downlink message 525-*l*, a downlink message 525-*m*, a downlink message 525-*n*, and a downlink message 525-*o*) or transmit one or more uplink messages 520, such as an uplink message 520-*f*.

FIG. 5D In the example of FIG. 5D, the UE 115 may receive, via the configuration, an indication that a first portion of the periodic multiple WUTs 505 (e.g., multiple WUTs 505-*m*, multiple WUTs 505-*o*, and multiple WUTs 505-*q*) are to be transmitted with a first TCI state and an indication that a second portion of the periodic multiple WUTs 505 (e.g., multiple WUTs 505-*n*, multiple WUTs 505-*p*, and multiple WUTs 505-*r*) are to be transmitted with a second TCI state. Further, the network entity 105 may indicate, via the configuration, that the first and second portions of the multiple WUTs 505 are to be transmitted in a first time interval (e.g., the same time interval). In such examples, the UE 115, while operating in the sleep mode, may wake up in the first time interval and use multiple WURs of the WURs 530-*d* to receive each WUT of the first and second portions of the multiple WUTs 505. Further, in some examples, the UE 115 may receive, via one or more WURs of the WURs 530-*c*. WUS 510 in accordance with a periodicity of the WUSs 510 (e.g., such as a WUS 510-*j*, a WUS 510-*k*, and a WUS 510-*l*).

As an illustrative example, the network entity 105 may indicate, via the configuration, that the multiple WUTs 505-*m* (e.g., the first portion of the multiple WUTs 505) includes two WUTs that are to be transmitted with a first TCI state and via a first time interval. The configuration may further indicate that the multiple WUTs 505-*n* (e.g., the second portion of the multiple WUTs 505) includes two WUTs that are to be transmitted with a second TCI state (e.g., double TCI state) and via the first time interval. In some examples, each of the TCI states may be distinguishable by respective OOK sequences, where such OOK sequences may be indicated to the UE 115 via the configuration.

In such examples, the UE 115 may periodically wake up, during an on-duration 515-*g* of a first DRX cycle, four WURs out of the WURs 530-d to monitor for the multiple WUTs 505-m and the multiple WUTs 505-n in the first time interval. That is, the UE 115 may use two receive beams (e.g., associated with two WURs of the WURs 530-d) to search for the multiple WUTs 505-m with the first TCI state, while the UE 115 may use two different receive beams (e.g., associated with two different WURs of the WURs 530-d) to search for the multiple WUTs 505-n with a second TCI state. In such examples, the UE 115 may monitor for, using four WURs of the WURs 530-d, each WUT of the multiple WUTs 505-m and the multiple WUTs 505-n with four receive beams at the same time.

In response to receiving each WUT of the multiple WUTs 505-m and the multiple WUTs 505-n, the UE 115 may perform quality measurements of the receive beams used to receive each WUT. In some examples, the UE 115 may determine that the quality measurements associated with each receive beam are greater than or equal to a quality threshold. As such, the UE 115 may continue to operate in the sleep mode.

Further, according to the periodicity of the multiple WUTs 505 indicated in the configuration, the network entity 105 may transmit the multiple WUTs 505-o with a first TCI state and the multiple WUTs 505-j with a second TCI state via (e.g., during) a first time interval. As such, during an on duration 515-h of the subsequent DRX cycle, the UE 115 may wake up one or more WURs of the WURs 530-d to monitor the occasions (e.g., time and frequency resources) of each WUT of the multiple WUTs 505-o and the multiple WUTs 505-p.

The UE 115 may detect each WUT of the multiple WUTs 505-o and the multiple WUTs 505-p and perform quality measurements of the receive beams used to receive such WUTs. In some examples, the UE 115 may determine that the quality measurements associated with each receive beam are less than a quality threshold. As such, a controller (e.g., such as the controller 425) of the UE 115 may trigger a main radio 535-d to wake up and transmit a beam recovery request via an uplink message 520-g. In some examples, the network entity 105 may continue to periodically transmit the multiple WUTs 505-q, the multiple WUTs 505-r, a WUS 510-l, or combination thereof while processing the beam recovery request.

In response to transmitting the beam recovery request, the UE 115 may perform a beam failure recover procedure to identify a receive beam for communications and resume active communicates. For example, after performing the beam failure recovery procedure, the UE 115 may receive one or more downlink messages 525 (e.g., such as a downlink message 525-p, a downlink message 525-q, a downlink message 525-r, a downlink message 525-s, and a downlink message 525-t) or transmit one or more uplink messages 520, such as an uplink message 520-h.

Figure 6:
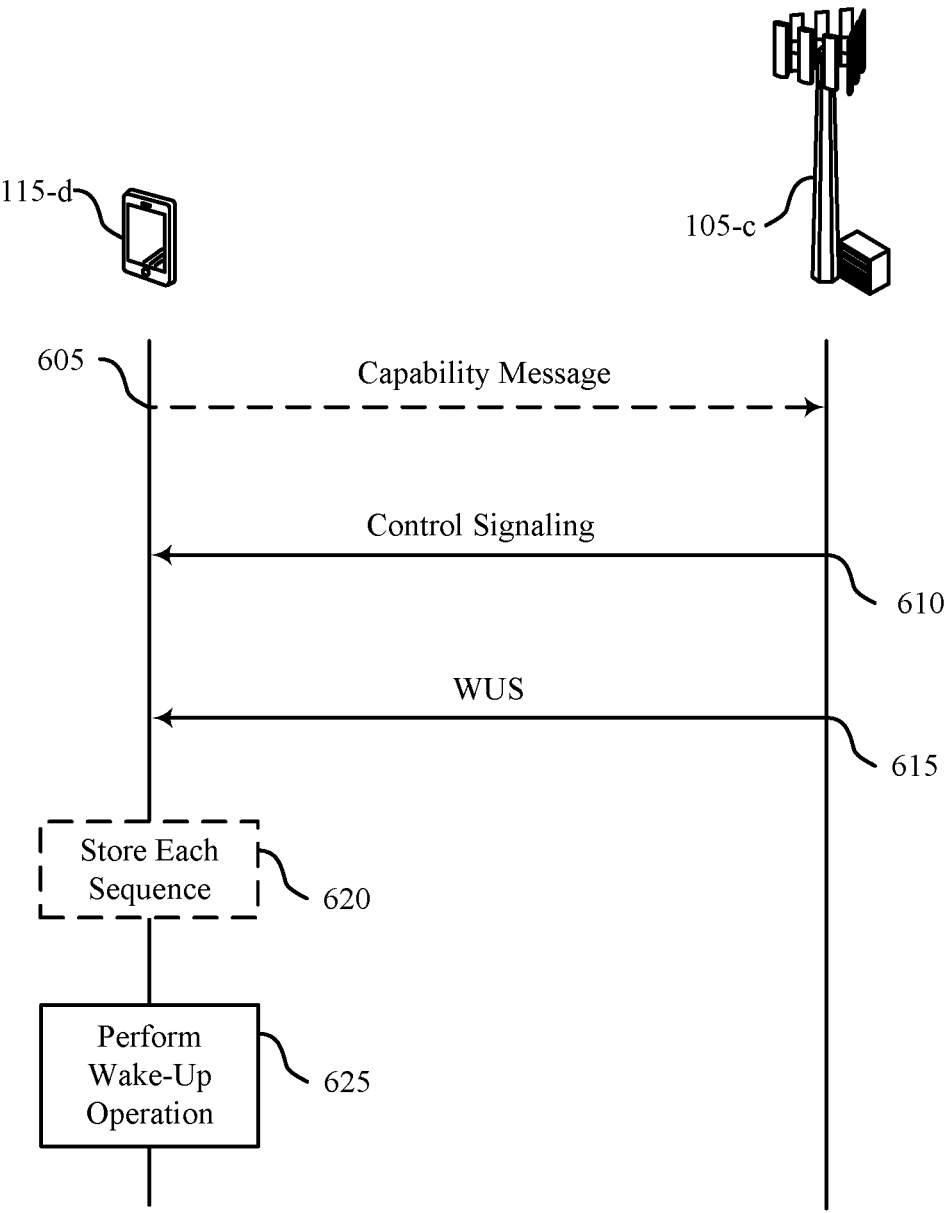
FIGS. 6 and 7 show examples of process flows that support WUS enhancements in accordance with one or more aspects of the present disclosure.

FIG. 6 shows an example of a process flow 600 that supports WUS enhancements in accordance with one or more aspects of the present disclosure. The process flow 600 may implement, or be implemented, by aspects of the wireless communications system 100, the wireless communications system 200, the wireless communications system 300, the hardware diagram 400, and the timing diagrams 500, 501, 502, and 503, as described herein with reference to FIGS. 1 through 5D. For example, the process flow 600 may include a UE 115-d and a network entity 105-c, which may be examples of corresponding devices described herein. In the following description of the process flow 600, the operations may be performed in a different order than the order shown. Specific operations also may be left out of the process flow 600, or other operations may be added to the process flow 600. Further, although some operations or signaling may be shown to occur at different times for discussion purposes, these operations may actually occur at the same time. The process flow 600 may implement techniques for transmitting multiple sequences via a single WUS in accordance with techniques described herein with reference to FIG. 2.

At 605, the UE 115-d may transmit, while operating in an awake mode, a message (e.g., such as a capability message 215) indicating a capability of the UE to receive multiple respective sequences (e.g., such as the sequences 210) using FDM (e.g., as demonstrated in WUS 205-b), a capability of the UE to receive the plurality of respective sequences using TDM (e.g., as demonstrated in WUS 205-a), a first quantity of sequences associated with the multiple of respective sequences supported at the UE, or a combination thereof.

At 610, the UE 115-d may receive, while operating in the awake mode, control signaling (e.g., such as control signaling 220) that includes a sequence configuration indicating a quantity of sequences associated with multiple respective sequences of a WUS (e.g., such as a WUS 205), where each sequence of multiple respective sequences is associated with a single bit of information. In some examples, the network entity 105-c may transmit the WUS configuration in response to receiving the capability message at 605.

In some examples, the sequence configuration may further indicate whether the multiple respective sequences are to be multiplexed in accordance with TDM or FDM. In some examples, the sequence configuration may include an indication of codewords associated with the multiple respective sequences and a mapping between the codewords and a multiple wake-up operations, where the mapping indicates an association between each of the wake-up operations and respective codewords.

In some examples, the UE 115 may receive, via the sequence configuration, an indication of multiple frequency carriers associated with each sequence of the multiple sequences. In the example of range extension, the sequence configuration may further indicate that each sequence of the multiple sequences is the same across each indicated frequency carrier. Alternatively, the sequence configuration may indicate that a first sequence associated with a first frequency carrier is different from a second sequence associated with a second frequency carrier.

In some examples, the UE 115 may receive, the sequence configuration, an indication multiple time intervals associated with each sequence of the multiple sequences. In the example of range extension, the sequence configuration may indicate that each sequence of the multiple sequences is the same across each indicated time interval. Alternatively, the sequence configuration may indicate that a first sequence associated with a first time interval is different from a second sequence associated with a time interval.

The UE 115-d may enter a sleep mode based on a lack of signaling or data traffic between the UE 115-d and the network entity 105-c. As such, at 615, the UE 115-d may receive, while operating in the sleep mode, the WUS that includes multiple respective sequences, where the multiple respective sequences indicate one or more operations of multiple wake-up operations. That is, the network entity 105-c may transmit the WUS in accordance with the multiplexing scheme and quantity of sequences indicated in the configuration of the control signaling at 610. In some examples, the network entity 105-c may transmit the WUS in TDM (e.g., such as the WUS 205-a). In some other examples, the network entity 105-c may transmit the WUS in FDM (e.g., such as the WUS 205-b). The network entity 105-c may determine a length of each sequence in the WUS based on a quantity of UEs 115 in communication with the network entity 105-c and on a processing gain associated with the UE 115-d.

At 620, in the example of the WUS being transmitted using range extension in TDM (e.g., each sequence is the same across each time interval), the UE 115-d may optionally store, in a memory buffer, each of the respective sequences transmitted via each of the time intervals.

At 625, the UE 115-d may perform, while operating in the sleep mode, the one or more operations identified from the multiple wake-up operations based on the respective sequences indicated in the WUS. The one or more wake-up operations may include an operation to continue operating in the sleep mode, an operation to update a periodicity associated with monitoring for the WUS, an operation to wake up the UE for beam management, an operation to wake up the UE at a first time period, an operation to wake up the UE within a time threshold, an operation to wake up the UE using a low-power mode, or an operation to wake up the UE using a high power mode.

As an illustrative example, the network entity 105-c may transmit the WUS that includes four sequences, where the four sequences correspond to the codeword '0110.' In such examples, the UE 115-d may identify the wake-up operation that corresponds to the codeword '0110' based on the mapping information received in the configuration of the control signaling at 610. In this way, the UE 115-d may receive additional bits of information via a WUS using index modulation, thereby improving coordination between the UE 115-d and the network entity 105-c.

Figure 7:
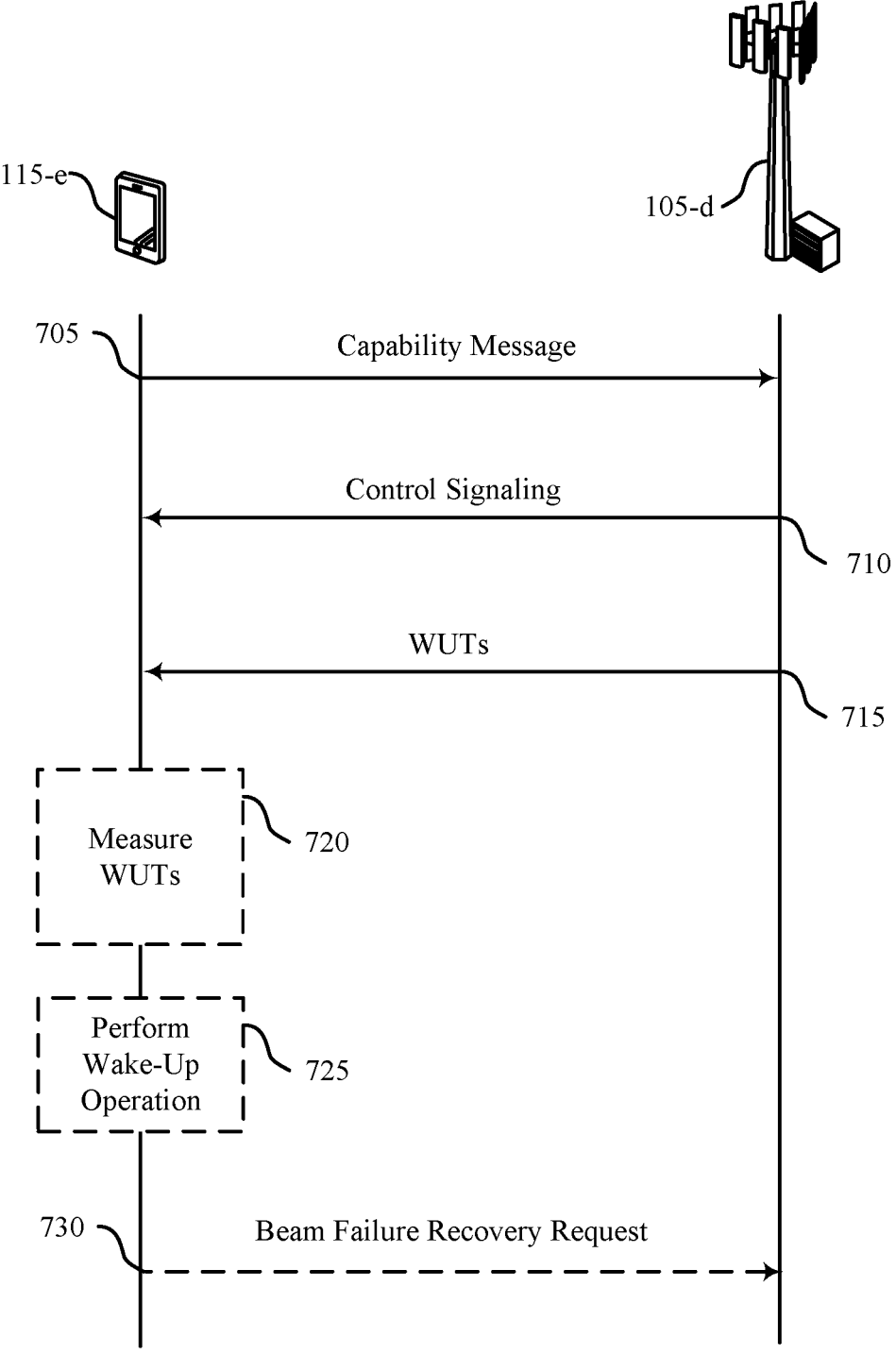

FIG. 7 shows an example of a process flow 700 that supports WUS enhancements in accordance with one or more aspects of the present disclosure. The process flow 700 may implement, or be implemented, by aspects of the wireless communications system 100, the wireless communications system 200, the wireless communications system 300, the hardware diagram 400, the timing diagrams 500, 501, 502, and 503, and the process flow 600 as described herein with reference to FIGS. 1 through 6. For example, the process flow 700 may include a UE 115-e and a network entity 105-d, which may be examples of corresponding devices described herein. In the following description of the process flow 700, the operations may be performed in a different order than the order shown. Specific operations also may be left out of the process flow 700, or other operations may be added to the process flow 700. Further, although some operations or signaling may be shown to occur at different times for discussion purposes, these operations may actually occur at the same time. The process flow 700 may implement hardware and signaling techniques for transmitting multiple WUTs in accordance with techniques described herein with reference to FIGS. 3 and 4 through 5D.

At 705, the UE 115-e may transmit, while operating in an awake mode, a capability message (e.g., such as a capability message 315) indicating a quantity of WURs (e.g., such as WURs 415 and WURs 530) for simultaneous reception at the UE 115-d.

At 710, the UE 115-e may receive, while operating in the awake mode, control signaling including a WUS configuration that is based on the quantity of WURs at the UE 115-e, where the WUS configuration indicates multiple WUSs (e.g., such as multiple WUSs, multiple WUTs 305, or multiple WUTs 505) associated with wake-up operations and respective TCI states for each WUS of the multiple WUSs.

At 715, the UE 115-e may receive, while operating in a sleep mode and via one or more receive beams associated with at least on WUR, the multiple WUSs in accordance with the respective TCI states. For example, the network entity 105-d may transmit each WUS of the multiple WUSs in accordance with various resources and TCI states as described herein with reference to FIGS. 5A through 5D.

In some examples, the multiple WUSs may be examples of WUSs. As such, in response to receiving the multiple WUSs, the UE 115-d may proceed to perform a wake-up operation to wake up the UE 115-e.

In some other examples, the multiple WUSs may be examples of multiple WUTs. As such, at 720, the UE 115-e may measure, while operating in the sleep mode, a quality of each receive beam used to receive each of the multiple WUTs based on receiving each WUT of the multiple WUTs.

At 725, the UE 115-e may perform a wake-up operation to wake up the UE 115-d based on the quality of at least one receive beam being less than a quality threshold. In response to waking up, at 730, the UE 115-e, while operating in the awake mode, a request for beam failure recovery based on the quality of at least one receive beam being less than the quality threshold.

Figure 8:
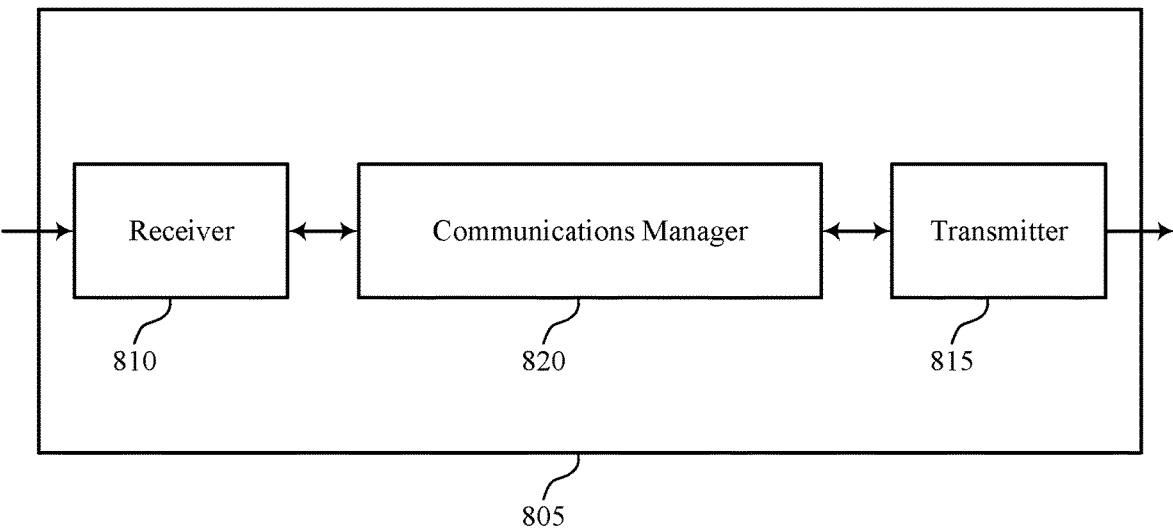
FIGS. 8 and 9 show block diagrams of devices that support WUS enhancements in accordance with one or more aspects of the present disclosure.
Figure 8:

FIG. 8 shows a block diagram 800 of a device 805 that supports WUS enhancements in accordance with one or more aspects of the present disclosure. The device 805 may be an example of aspects of a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to WUS enhancements). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to WUS enhancements). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of WUS enhancements as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include at least one processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 is capable of, configured to, or operable to support a means for receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The communications manager 820 is capable of, configured to, or operable to support a means for receiving, while operating in a sleep mode, the WUS including the set of multiple respective sequences in accordance with the sequence configuration. The communications manager 820 is capable of, configured to, or operable to support a means for performing, while operating in the sleep mode, the one or more operations indicated by the set of multiple respective sequences of the WUS.

Additionally, or alternatively, the communications manager 820 may support wireless communication at a UE in accordance with examples as disclosed herein. For example, the communications manager 820 is capable of, configured to, or operable to support a means for transmitting a capability message indicating a quantity of WURs supported by the UE for simultaneous reception of WUSs. The communications manager 820 is capable of, configured to, or operable to support a means for receiving a control message indicating a WUS configuration that is based on the quantity of WURs supported by the UE, the WUS configuration indicating a set of multiple WUSs associated with wake-up operations and respective TCI states for each WUS of the set of multiple WUSs. The communications manager 820 is capable of, configured to, or operable to support a means for receiving, while operating in a sleep mode and via one or more receive beams associated with at least one WUR of the UE, at least one WUS of the set of multiple WUSs in accordance with the respective TCI states.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for WUS enhancements, leading to more efficient utilization of communication resources and reduced power consumption at the UE.

Figure 9:
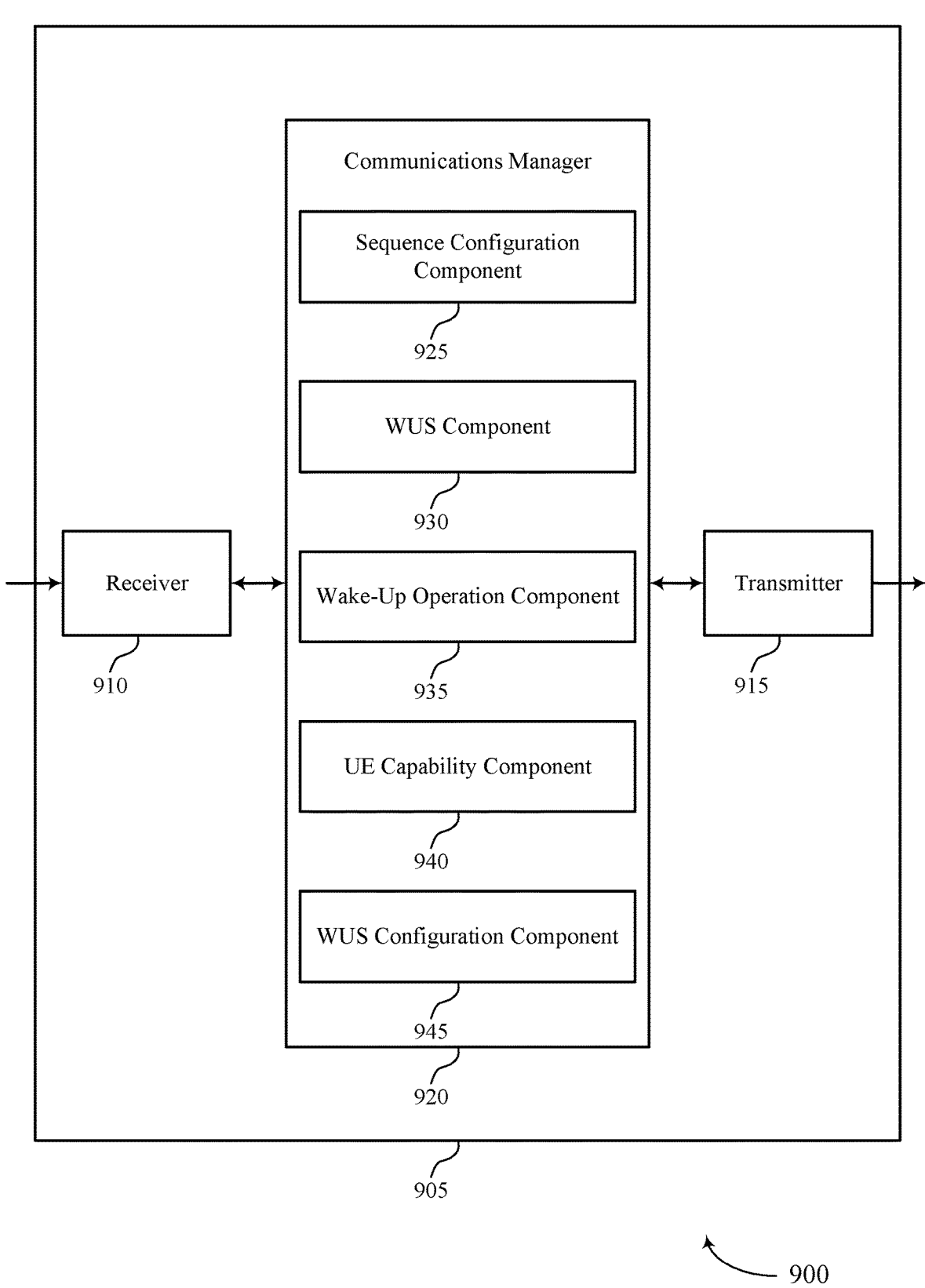

FIG. 9 shows a block diagram 900 of a device 905 that supports WUS enhancements in accordance with one or more aspects of the present disclosure. The device 905 may be an example of aspects of a device 805 or a UE 115 as described herein. The device 905 may include a receiver 910, a transmitter 915, and a communications manager 920. The device 905 may also include at least one processor. Each of these components may be in communication with one another (e.g., via one or more buses).

The receiver 910 may provide a means for receiving information such as packets, user data, control information, or any combination thereof associated with various information channels (e.g., control channels, data channels, information channels related to WUS enhancements). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to WUS enhancements). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of WUS enhancements as described herein. For example, the communications manager 920 may include a sequence configuration component 925, a WUS component 930, a wake-up operation component 935, a UE capability component 940, a WUS configuration component 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The sequence configuration component 925 is capable of, configured to, or operable to support a means for receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The WUS component 930 is capable of, configured to, or operable to support a means for receiving, while operating in a sleep mode, the WUS including the set of multiple respective sequences in accordance with the sequence configuration. The wake-up operation component 935 is capable of, configured to, or operable to support a means for performing, while operating in the sleep mode, the one or more operations indicated by the set of multiple respective sequences of the WUS.

Additionally, or alternatively, the communications manager 920 may support wireless communication at a UE in accordance with examples as disclosed herein. The UE capability component 940 is capable of, configured to, or operable to support a means for transmitting a capability message indicating a quantity of WURs supported by the UE for simultaneous reception of WUSs. The WUS configuration component 945 is capable of, configured to, or operable to support a means for receiving a control message indicating a WUS configuration that is based on the quantity of WURs supported by the UE, the WUS configuration indicating a set of multiple WUSs associated with wake-up operations and respective TCI states for each WUS of the set of multiple WUSs. The WUS component 930 is capable of, configured to, or operable to support a means for receiving, while operating in a sleep mode and via one or more receive beams associated with at least one WUR of the UE, at least one WUS of the set of multiple WUSs in accordance with the respective TCI states.

Figure 10:
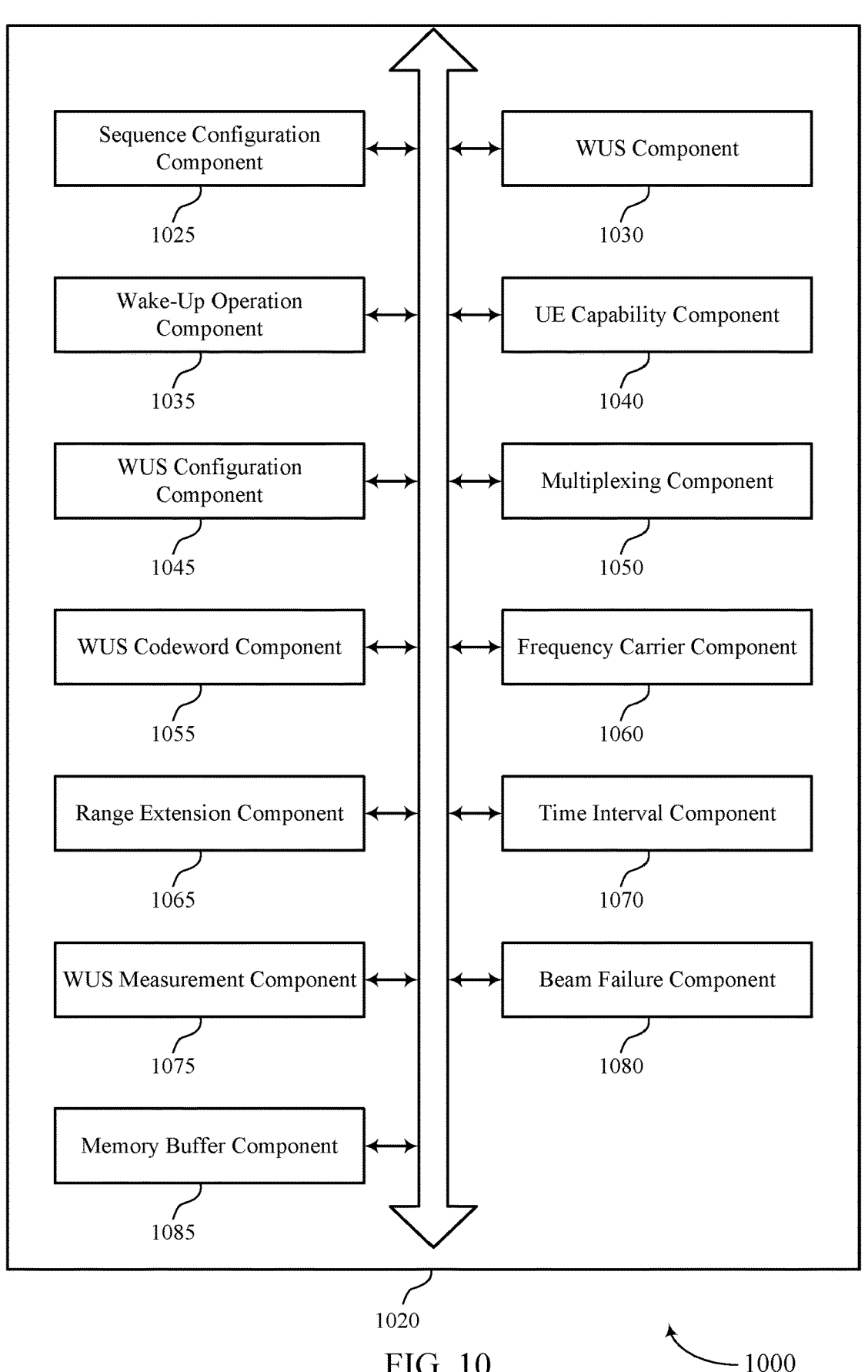
FIG. 10 shows a block diagram of a communications manager that supports WUS enhancements in accordance with one or more aspects of the present disclosure.

FIG. 10 shows a block diagram 1000 of a communications manager 1020 that supports WUS enhancements in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of WUS enhancements as described herein. For example, the communications manager 1020 may include a sequence configuration component 1025, a WUS component 1030, a wake-up operation component 1035, a UE capability component 1040, a WUS configuration component 1045, a multiplexing component 1050, a WUS codeword component 1055, a frequency carrier component 1060, a range extension component 1065, a time interval component 1070, a WUS measurement component 1075, a beam failure component 1080, a memory buffer component 1085, or any combination thereof. Each of these components may communicate, directly or indirectly, with one another (e.g., via one or more buses).

The communications manager 1020 may support wireless communication at a UE in accordance with examples as disclosed herein. The sequence configuration component 1025 is capable of, configured to, or operable to support a means for receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The WUS component 1030 is capable of, configured to, or operable to support a means for receiving, while operating in a sleep mode, the WUS including the set of multiple respective sequences in accordance with the sequence configuration. The wake-up operation component 1035 is capable of, configured to, or operable to support a means for performing, while operating in the sleep mode, the one or more operations indicated by the set of multiple respective sequences of the WUS.

In some examples, the UE capability component 1040 is capable of, configured to, or operable to support a means for transmitting a capability message indicating whether the UE supports the WUS including the set of multiple respective sequences, where receiving the control message indicating the sequence configuration is based on the capability message.

In some examples, the capability message indicates a capability of the UE to receive the WUS including the set of multiple respective sequences using FDM, a capability of the UE to receive the WUS including the set of multiple respective sequences using TDM, a quantity of bits supported by the UE for receiving the WUS including the set of multiple respective sequences, or a combination thereof.

In some examples, the multiplexing component 1050 is capable of, configured to, or operable to support a means for receiving, via the sequence configuration, an indication that the set of multiple respective sequences are to be multiplexed in accordance with TDM or FDM, where the wake up signal is received in accordance with the TDM or the FDM.

In some examples, the sequence configuration component 1025 is capable of, configured to, or operable to support a means for receiving, via the sequence configuration, an indication of a quantity of bits associated with the set of multiple respective sequences, where the one or more operations are indicated by the set of multiple respective sequences based on the quantity of bits.

In some examples, the WUS codeword component 1055 is capable of, configured to, or operable to support a means for receiving, via the sequence configuration, an indication of a set of multiple codewords associated with the set of multiple respective sequences and a mapping between the set of multiple codewords and the set of multiple operations, the mapping indicating an association between each of the set of multiple operations and respective codewords of the set of multiple codewords.

In some examples, the sequence configuration component 1025 is capable of, configured to, or operable to support a means for receiving, via the sequence configuration, an indication of a set of multiple frequency carriers associated with the WUS including the set of multiple respective sequences, where each sequence of the set of multiple respective sequences is received via a respective frequency carrier of the set of multiple frequency carriers. In some examples, the frequency carrier component 1060 is capable of, configured to, or operable to support a means for monitoring, while in the sleep mode, the set of multiple frequency carriers for the WUS, where receiving the WUS is based on monitoring the set of multiple frequency carriers.

In some examples, the sequence configuration further indicates that a first sequence of the set of multiple respective sequences is different from a second sequence of the set of multiple respective sequences, the first sequence being associated with a first frequency carrier of the set of multiple frequency carriers and the second sequence being associated with a second frequency carrier different from the first frequency carrier.

In some examples, the range extension component 1065 is capable of, configured to, or operable to support a means for determining whether a first sequence associated with the WUS is to be repeated in each frequency carrier of a set of multiple frequency carriers, where receiving the WUS including the set of multiple respective sequences includes receiving the first sequence across each frequency carrier of the set of multiple frequency carriers based on a determination that the first sequence is to be repeated in each frequency carrier. In some examples, the wake-up operation component 1035 is capable of, configured to, or operable to support a means for waking from the sleep mode based on an aggregation of the first sequence received across each frequency carrier.

In some examples, the sequence configuration further indicates that the first sequence includes a same bit across the set of multiple frequency carriers and that a quantity of frequency carriers of the set of multiple frequency carriers is greater than one. In some examples, determining whether the first sequence associated with the WUS is to be repeated in each frequency carrier of the set of multiple frequency carriers is based on the sequence configuration.

In some examples, the sequence configuration component 1025 is capable of, configured to, or operable to support a means for receiving, via the sequence configuration, an indication of a set of multiple time intervals associated with the set of multiple respective sequences, each sequence of the set of multiple respective sequences being received via a respective time interval of the set of multiple time intervals. In some examples, the time interval component 1070 is capable of, configured to, or operable to support a means for monitoring, while in the sleep mode, the set of multiple time intervals for the WUS, where receiving the WUS is based on monitoring the set of multiple time intervals.

In some examples, the sequence configuration further indicates that a first sequence of the set of multiple respective sequences is different from a second sequence of the set of multiple respective sequences, the first sequence being associated with a first time interval of the set of multiple time intervals and the second sequence being associated with a second time interval different from the first time interval.

In some examples, the range extension component 1065 is capable of, configured to, or operable to support a means for determining whether a first sequence associated with the WUS is to be repeated in each time interval of a set of multiple time intervals, where receiving the WUS including the set of multiple respective sequences includes receiving the first sequence via each time interval of the set of multiple time intervals based on a determination that the first sequence is to be repeated in each time interval. In some examples, the wake-up operation component 1035 is capable of, configured to, or operable to support a means for waking from the sleep mode based on an aggregation of the first sequence received via each time interval.

In some examples, the sequence configuration further indicates that the first sequence includes a same bit in each of the set of multiple time intervals and that a quantity of time intervals of the set of multiple time intervals is greater than one. In some examples, determining whether the first sequence associated with the WUS is to be repeated in each time interval of the set of multiple time intervals is based on the sequence configuration.

In some examples, the memory buffer component 1085 is capable of, configured to, or operable to support a means for storing, in a memory buffer of the UE, each repetition of the first sequence in each of the set of multiple time intervals, where the aggregation of the first sequence is based on storing each of the set of multiple respective sequences in the memory buffer of the UE.

In some examples, a length of each sequence of the set of multiple respective sequences is based on a quantity of UEs in communication with a network entity and a processing gain associated with the UE.

In some examples, the set of multiple operations includes at least an operation to continue operating in the sleep mode, an operation to update a periodicity associated with monitoring for the WUS, an operation to wake up for beam management, an operation to wake up at a first time period, an operation to wake up within a time threshold, an operation to wake up using a power mode associated with a threshold power.

Additionally, or alternatively, the communications manager 1020 may support wireless communication at a UE in accordance with examples as disclosed herein. The UE capability component 1040 is capable of, configured to, or operable to support a means for transmitting a capability message indicating a quantity of WURs supported by the UE for simultaneous reception of WUSs. The WUS configuration component 1045 is capable of, configured to, or operable to support a means for receiving a control message indicating a WUS configuration that is based on the quantity of WURs supported by the UE, the WUS configuration indicating a set of multiple WUSs associated with wake-up operations and respective TCI states for each WUS of the set of multiple WUSs. In some examples, the WUS component 1030 is capable of, configured to, or operable to support a means for receiving, while operating in a sleep mode and via one or more receive beams associated with at least one WUR of the UE, at least one WUS of the set of multiple WUSs in accordance with the respective TCI states.

In some examples, the WUS measurement component 1075 is capable of, configured to, or operable to support a means for measuring, while operating in the sleep mode, a quality of the at least one WUS based on receiving the at least one WUS, where each of the set of multiple WUSs includes a WUT. In some examples, the wake-up operation component 1035 is capable of, configured to, or operable to support a means for performing a wake-up operation to wake up the UE based on a quality associated with the at least one WUS satisfying a quality threshold. In some examples, the beam failure component 1080 is capable of, configured to, or operable to support a means for transmitting a request for beam failure recovery based on the quality associated with the at least one WUS satisfying the quality of threshold.

In some examples, the wake-up operation component 1035 is capable of, configured to, or operable to support a means for performing a wake-up operation to wake up the UE based on receiving the at least one WUS of the set of multiple WUSs.

In some examples, each WUS of the set of multiple WUSs is received via respective WURs of the UE in a same time interval. In some examples, each WUS of the set of multiple WUSs is associated with a same TCI state.

In some examples, a first set of the set of multiple WUSs is received via a first set of WURs of the UE in a first time interval and a second set of the set of multiple WUSs is received via a second set of WURs of the UE in a second time interval different from the first time interval, the first set of the set of multiple WUSs being associated with a first TCI state and the second set of the set of multiple WUSs being associated with a second TCI state.

In some examples, each WUS of the set of multiple WUSs are received via respective WURs of the UE in a first time interval, a first set of the set of multiple WUSs being associated with a first TCI state and a second set of the set of multiple WUSs being associated with a second TCI state.

Figure 11:
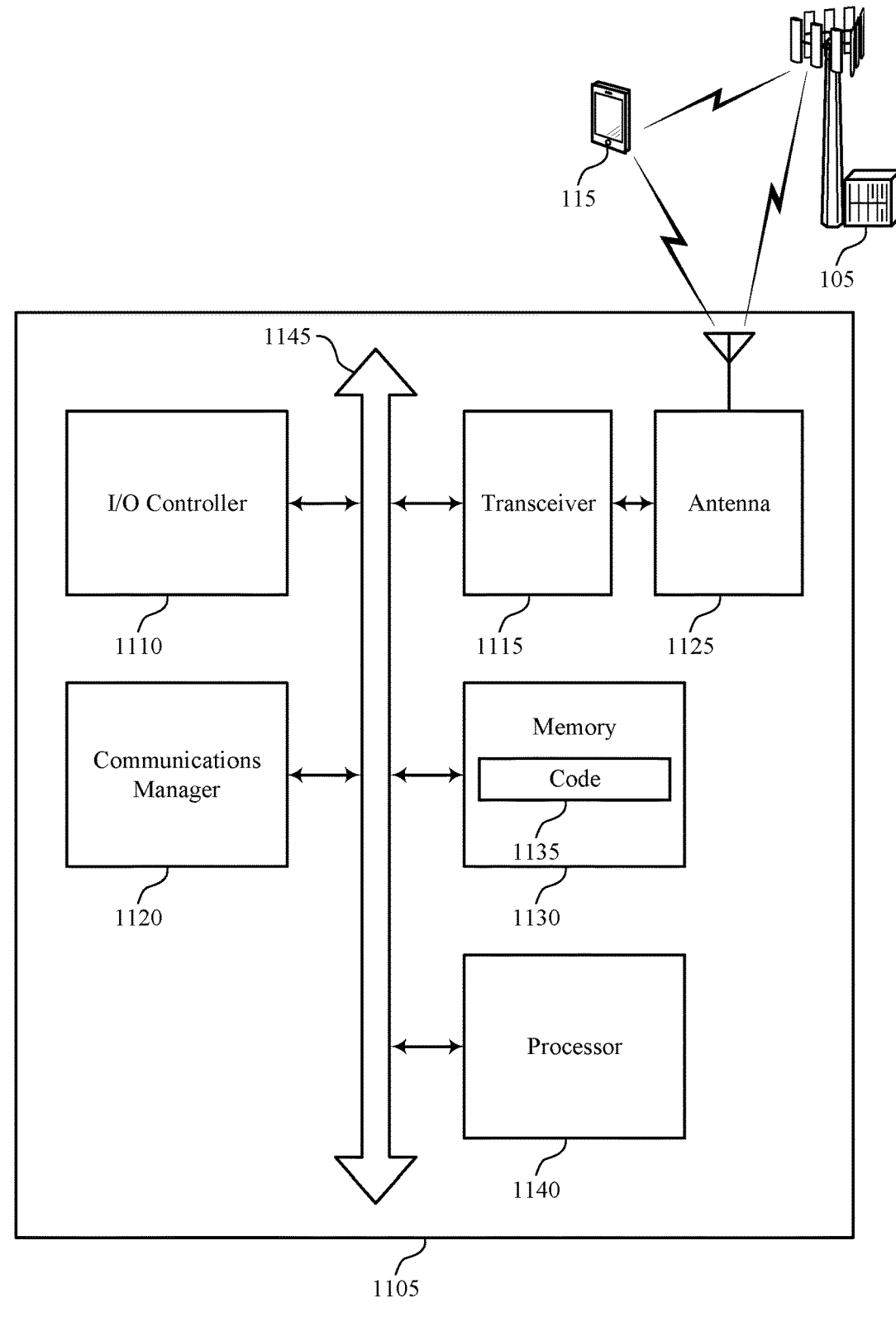
FIG. 11 shows a diagram of a system including a device that supports WUS enhancements in accordance with one or more aspects of the present disclosure.

FIG. 11 shows a diagram of a system 1100 including a device 1105 that supports WUS enhancements in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting WUS enhancements). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 is capable of, configured to, or operable to support a means for receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The communications manager 1120 is capable of, configured to, or operable to support a means for receiving, while operating in a sleep mode, the WUS including the set of multiple respective sequences in accordance with the sequence configuration. The communications manager 1120 is capable of, configured to, or operable to support a means for performing, while operating in the sleep mode, the one or more operations indicated by the set of multiple respective sequences of the WUS.

Additionally, or alternatively, the communications manager 1120 may support wireless communication at a UE in accordance with examples as disclosed herein. For example, the communications manager 1120 is capable of, configured to, or operable to support a means for transmitting a capability message indicating a quantity of WURs supported by the UE for simultaneous reception of WUSs. The communications manager 1120 is capable of, configured to, or operable to support a means for receiving a control message indicating a WUS configuration that is based on the quantity of WURs supported by the UE, the WUS configuration indicating a set of multiple WUSs associated with wake-up operations and respective TCI states for each WUS of the set of multiple WUSs. The communications manager 1120 is capable of, configured to, or operable to support a means for receiving, while operating in a sleep mode and via one or more receive beams associated with at least one WUR of the UE, at least one WUS of the set of multiple WUSs in accordance with the respective TCI states.

By including or configuring the communications manager 1120 in accordance with examples as described herein, the device 1105 may support techniques for WUS enhancements, leading to more efficient utilization of communication resources and reduced power consumption at the UE.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of WUS enhancements as described herein, or the processor 1140 and the memory 1130 may be otherwise configured to perform or support such operations.

Figure 12:
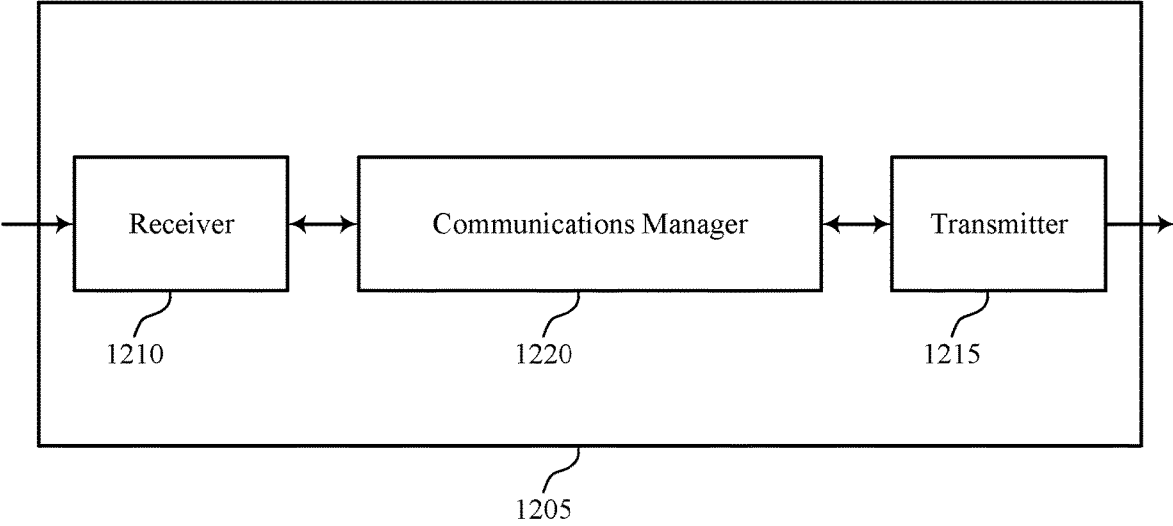
FIGS. 12 and 13 show block diagrams of devices that support WUS enhancements in accordance with one or more aspects of the present disclosure.

FIG. 12 shows a block diagram 1200 of a device 1205 that supports WUS enhancements in accordance with one or more aspects of the present disclosure. The device 1205 may be an example of aspects of a network entity 105 as described herein.

The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of WUS enhancements as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry).

The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 is capable of, configured to, or operable to support a means for transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The communications manager 1220 is capable of, configured to, or operable to support a means for transmitting the WUS including the set of multiple respective sequences in accordance with the sequence configuration.

Additionally, or alternatively, the communications manager 1220 may support wireless communication at network entity in accordance with examples as disclosed herein. For example, the communications manager 1220 is capable of, configured to, or operable to support a means for receiving a capability message indicating a quantity of WURs supported by a UE for simultaneous reception of WUSs. The communications manager 1220 is capable of, configured to, or operable to support a means for transmitting a control message indicating a WUS configuration that is based on the quantity of WURs supported by the UE, the WUS configuration indicating a set of multiple WUSs associated with wake-up operations and respective TCI states for each WUS of the set of multiple WUSs. The communications manager 1220 is capable of, configured to, or operable to support a means for transmitting the set of multiple WUSs in accordance with the respective TCI states.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for WUS enhancements, leading to more efficient utilization of communication resources and reduced power consumption at the UE.

Figure 13:
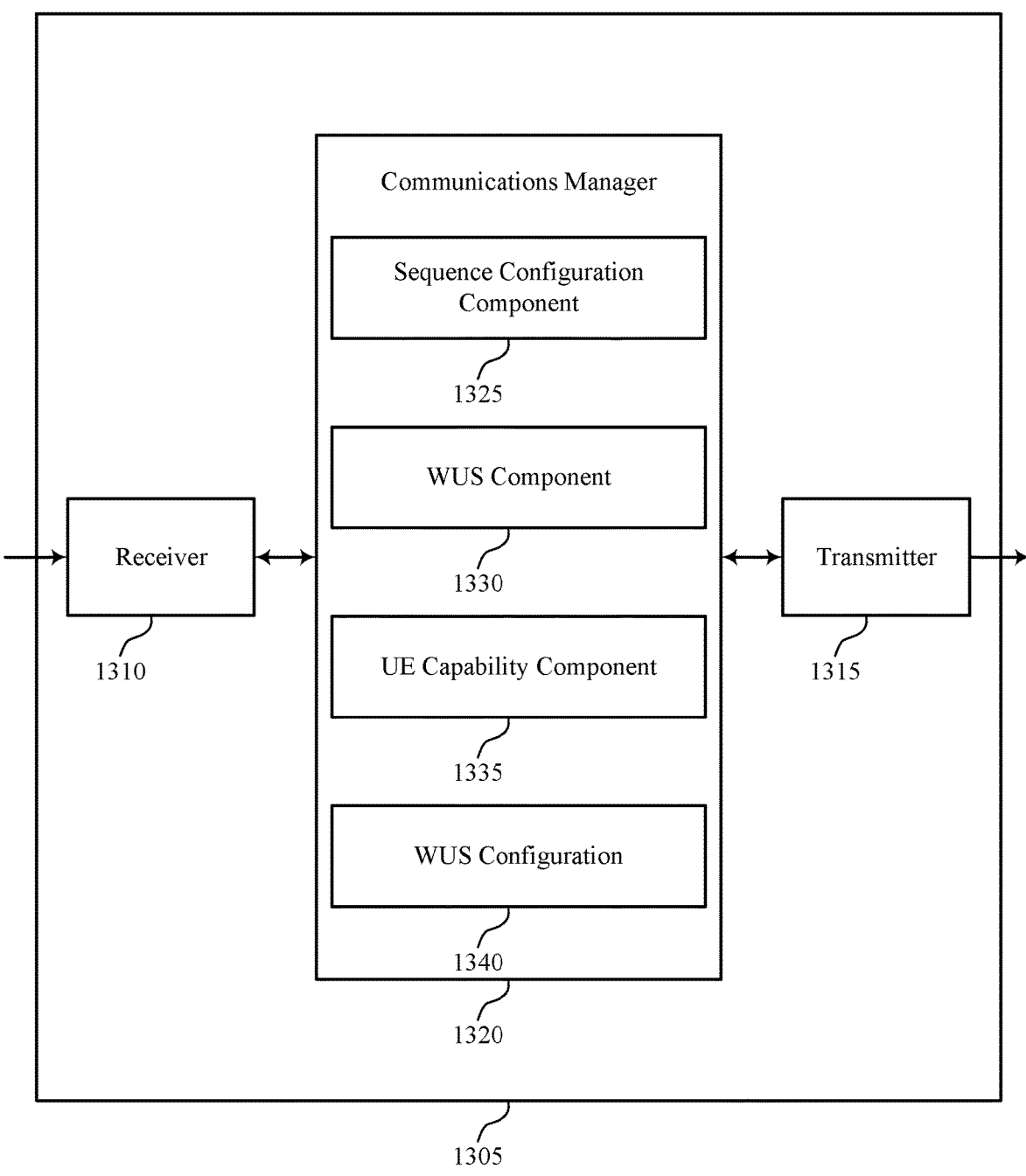

FIG. 13 shows a block diagram 1300 of a device 1305 that supports WUS enhancements in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include at least one processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of WUS enhancements as described herein. For example, the communications manager 1320 may include a sequence configuration component 1325, a WUS component 1330, a UE capability component 1335, a WUS configuration 1340, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The sequence configuration component 1325 is capable of, configured to, or operable to support a means for transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The WUS component 1330 is capable of, configured to, or operable to support a means for transmitting the WUS including the set of multiple respective sequences in accordance with the sequence configuration.

Additionally, or alternatively, the communications manager 1320 may support wireless communication at network entity in accordance with examples as disclosed herein. The UE capability component 1335 is capable of, configured to, or operable to support a means for receiving a capability message indicating a quantity of WURs supported by a UE for simultaneous reception of WUSs. The WUS configuration 1340 is capable of, configured to, or operable to support a means for transmitting a control message indicating a WUS configuration that is based on the quantity of WURs supported by the UE, the WUS configuration indicating a set of multiple WUSs associated with wake-up operations and respective TCI states for each WUS of the set of multiple WUSs. The WUS component 1330 is capable of, configured to, or operable to support a means for transmitting the set of multiple WUSs in accordance with the respective TCI states.

Figure 14:
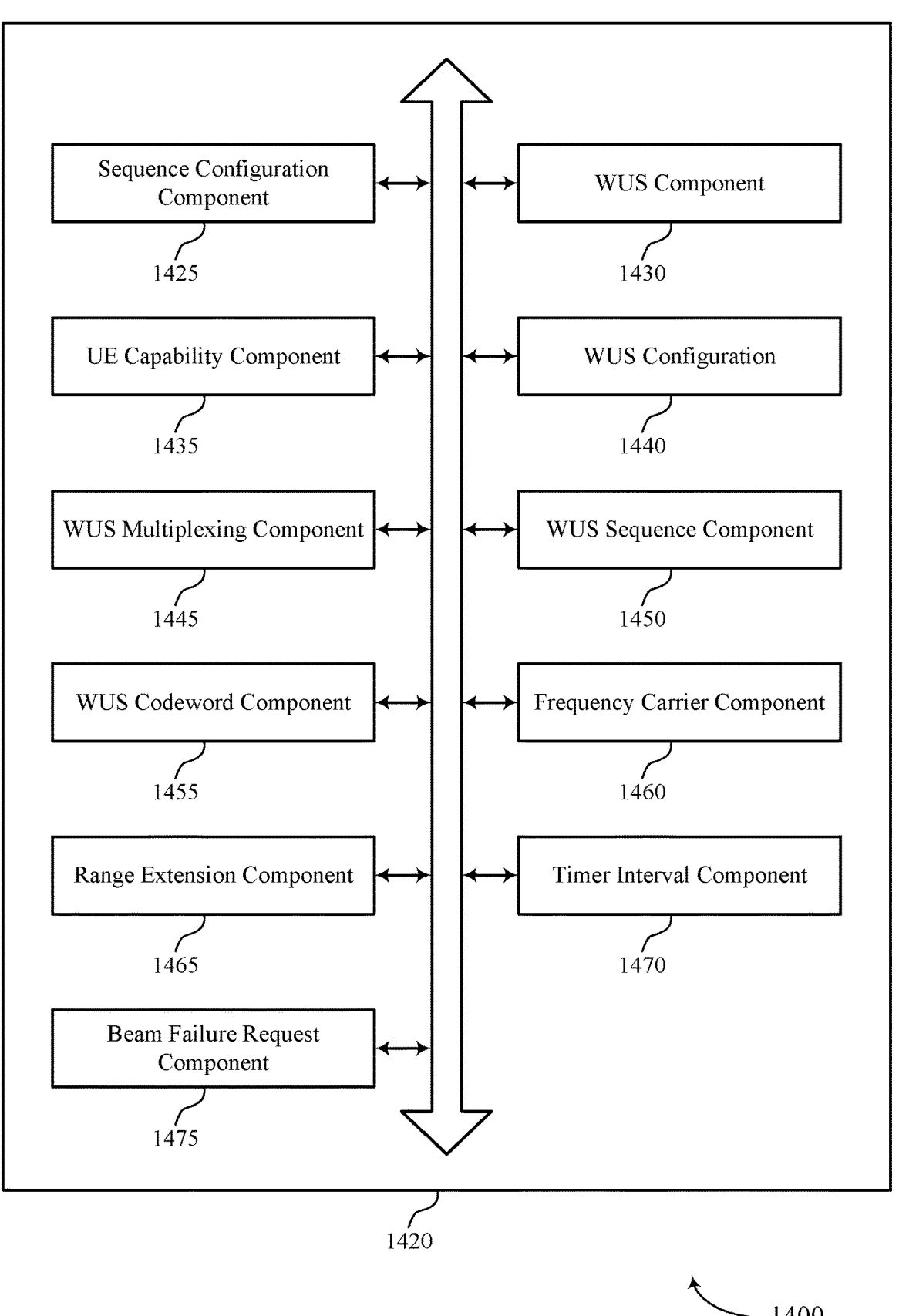
FIG. 14 shows a block diagram of a communications manager that supports WUS enhancements in accordance with one or more aspects of the present disclosure.

FIG. 14 shows a block diagram 1400 of a communications manager 1420 that supports WUS enhancements in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of WUS enhancements as described herein. For example, the communications manager 1420 may include a sequence configuration component 1425, a WUS component 1430, a UE capability component 1435, a WUS configuration 1440, a WUS multiplexing component 1445, a WUS sequence component 1450, a WUS codeword component 1455, a frequency carrier component 1460, a range extension component 1465, a timer interval component 1470, a beam failure request component 1475, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The sequence configuration component 1425 is capable of, configured to, or operable to support a means for transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The WUS component 1430 is capable of, configured to, or operable to support a means for transmitting the WUS including the set of multiple respective sequences in accordance with the sequence configuration.

In some examples, the UE capability component 1435 is capable of, configured to, or operable to support a means for receiving, from a UE, a capability message indicating whether the UE supports the WUS including the set of multiple respective sequences, where transmitting the control message indicating the sequence configuration is based on the capability message.

In some examples, the capability message indicates a capability of the UE to receive the WUS including the set of multiple respective sequences using FDM, a capability of the UE to receive the WUS including the set of multiple respective sequences using TDM, a quantity of bits supported by the UE for receiving the WUS including set of multiple respective sequences, or a combination thereof.

In some examples, the WUS multiplexing component 1445 is capable of, configured to, or operable to support a means for transmitting, via the sequence configuration, an indication that the set of multiple respective sequences are to be multiplexed in accordance with TDM or FDM, where the wake up signal is transmitted in accordance with the TDM or the FDM.

In some examples, the WUS sequence component 1450 is capable of, configured to, or operable to support a means for transmitting, via the sequence configuration, an indication of a quantity of bits associated with the set of multiple respective sequences, where the one or more operations are indicated by the set of multiple respective sequences based on the quantity of bits.

In some examples, the WUS codeword component 1455 is capable of, configured to, or operable to support a means for transmitting, via the sequence configuration, an indication of a set of multiple codewords associated with the set of multiple respective sequences and a mapping between the set of multiple codewords and the set of multiple operations, the mapping indicating an association between each of the set of multiple operations and respective codewords of the set of multiple codewords.

In some examples, the frequency carrier component 1460 is capable of, configured to, or operable to support a means for transmitting, via the sequence configuration, an indication of a set of multiple frequency carriers associated with the WUS including the set of multiple respective sequences, where each sequence of the set of multiple respective sequences is transmitted via a respective frequency carrier of the set of multiple frequency carriers.

In some examples, the sequence configuration further indicates that a first sequence of the set of multiple respective sequences is different from a second sequence of the set of multiple respective sequences, the first sequence being associated with a first frequency carrier of the set of multiple frequency carriers and the second sequence being associated with a second frequency carrier different from the first frequency carrier.

In some examples, the range extension component 1465 is capable of, configured to, or operable to support a means for transmitting, via the sequence configuration, an indication that a first sequence associated with the WUS is to be repeated in each frequency carrier of a set of multiple frequency carriers, where transmitting the WUS including the set of multiple respective sequences includes transmitting the first sequence via each frequency carrier of the set of multiple frequency carriers in accordance with the sequence configuration.

In some examples, the sequence configuration further indicates that the first sequence includes a same bit across the set of multiple frequency carriers and that a quantity of frequency carriers of a set of multiple frequency carriers is greater than one.

In some examples, the timer interval component 1470 is capable of, configured to, or operable to support a means for transmitting, via the sequence configuration, an indication of a set of multiple time intervals associated with the set of multiple respective sequences, each sequence of the set of multiple respective sequences being transmitted via a respective time interval of the set of multiple time intervals.

In some examples, the sequence configuration further indicates that a first sequence of the set of multiple respective sequences is different from a second sequence of the set of multiple respective sequences, the first sequence being associated with a first time interval of the set of multiple time intervals and the second sequence being associated with a second time interval different from the first time interval.

In some examples, the range extension component 1465 is capable of, configured to, or operable to support a means for transmitting, via the sequence configuration, an indication that a first sequence associated with the WUS is to be repeated in each time interval of a set of multiple time intervals, where transmitting the WUS including the set of multiple respective sequences includes transmitting the first sequence via each time interval of the set of multiple time intervals in accordance with the sequence configuration.

In some examples, the sequence configuration further indicates that the first sequence includes a same bit across the set of multiple time intervals and that a quantity of time intervals of a set of multiple time intervals is greater than one.

In some examples, a length of each of the set of multiple respective sequences is based on a quantity of UEs in communication with the network entity and a processing gain associated with a UE.

In some examples, the set of multiple operations includes at least an operation to continue operating in a sleep mode, an operation to update a periodicity associated with monitoring for the WUS, an operation to wake up for beam management, an operation to wake up at a first time period, an operation to wake up within a time threshold, an operation to wake up using a power mode associated with a threshold power.

Additionally, or alternatively, the communications manager 1420 may support wireless communication at network entity in accordance with examples as disclosed herein. The UE capability component 1435 is capable of, configured to, or operable to support a means for receiving a capability message indicating a quantity of WURs supported by a UE for simultaneous reception of WUSs. The WUS configuration 1440 is capable of, configured to, or operable to support a means for transmitting a control message indicating a WUS configuration that is based on the quantity of WURs supported by the UE, the WUS configuration indicating a set of multiple WUSs associated with wake-up operations and respective TCI states for each WUS of the set of multiple WUSs. In some examples, the WUS component 1430 is capable of, configured to, or operable to support a means for transmitting the set of multiple WUSs in accordance with the respective TCI states.

In some examples, the beam failure request component 1475 is capable of, configured to, or operable to support a means for receiving a request for beam failure recovery from the UE based on a measured quality associated with at least one WUS satisfying a quality threshold, where each of the set of multiple WUSs includes a WUT.

In some examples, each of the set of multiple WUSs are transmitted in a first time interval, each of the set of multiple WUSs associated with a same TCI state.

In some examples, a first set of the set of multiple WUSs is transmitted in a first time interval and a second set of the set of multiple WUSs is transmitted in a second time interval different from the first time interval, the first set of the set of multiple WUSs being associated with a first TCI state and the second set of the set of multiple WUSs being associated with a second TCI state.

In some examples, each of the set of multiple WUSs are transmitted in a first time interval, a first set of the set of multiple WUSs being associated with a first TCI state and a second set of the set of multiple WUSs being associated with a second TCI state.

Figure 15:
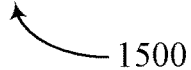
FIG. 15 shows a diagram of a system including a device that supports WUS enhancements in accordance with one or more aspects of the present disclosure.

FIG. 15 shows a diagram of a system 1500 including a device 1505 that supports WUS enhancements in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting WUS enhancements). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 is capable of, configured to, or operable to support a means for transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The communications manager 1520 is capable of, configured to, or operable to support a means for transmitting the WUS including the set of multiple respective sequences in accordance with the sequence configuration.

Additionally, or alternatively, the communications manager 1520 may support wireless communication at network entity in accordance with examples as disclosed herein. For example, the communications manager 1520 is capable of, configured to, or operable to support a means for receiving a capability message indicating a quantity of WURs supported by a UE for simultaneous reception of WUSs. The communications manager 1520 is capable of, configured to, or operable to support a means for transmitting a control message indicating a WUS configuration that is based on the quantity of WURs supported by the UE, the WUS configuration indicating a set of multiple WUSs associated with wake-up operations and respective TCI states for each WUS of the set of multiple WUSs. The communications manager 1520 is capable of, configured to, or operable to support a means for transmitting the set of multiple WUSs in accordance with the respective TCI states.

By including or configuring the communications manager 1520 in accordance with examples as described herein, the device 1505 may support techniques for WUS enhancements, leading to more efficient utilization of communication resources and reduced power consumption at the UE.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of WUS enhancements as described herein, or the processor 1535 and the memory 1525 may be otherwise configured to perform or support such operations.

FIG. 16 shows a flowchart illustrating a method 1600 that supports WUS enhancements in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The operations of 1605 may be performed in accordance with examples as disclosed herein. In some examples, aspects of the operations of 1605 may be performed by a sequence configuration component 1025 as described with reference to FIG. 10.

At 1610, the method may include receiving, while operating in a sleep mode, the WUS including the set of multiple respective sequences in accordance with the sequence configuration. The operations of 1610 may be performed in accordance with examples as disclosed herein. In some examples, aspects of the operations of 1610 may be performed by a WUS component 1030 as described with reference to FIG. 10.

At 1615, the method may include performing, while operating in the sleep mode, the one or more operations indicated by the set of multiple respective sequences of the WUS. The operations of 1615 may be performed in accordance with examples as disclosed herein. In some examples, aspects of the operations of 1615 may be performed by a wake-up operation component 1035 as described with reference to FIG. 10.

FIG. 17 shows a flowchart illustrating a method 1700 that supports WUS enhancements in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1705, the method may include transmitting a capability message indicating whether the UE supports a WUS including a set of multiple respective sequences. The operations of 1705 may be performed in accordance with examples as disclosed herein. In some examples, aspects of the operations of 1705 may be performed by a UE capability component 1040 as described with reference to FIG. 10.

At 1710, the method may include receiving a control message indicating a sequence configuration for the WUS that includes the set of multiple respective sequences, each sequence of the set of multiple respective sequences being associated with a single bit of information, where the set of multiple respective sequences indicates one or more operations of a set of multiple operations based on the sequence configuration, and where receiving the control message indicating the sequence configuration is based on the capability message. The operations of 1710 may be performed in accordance with examples as disclosed herein. In some examples, aspects of the operations of 1710 may be performed by a sequence configuration component 1025 as described with reference to FIG. 10.

At 1715, the method may include receiving, while operating in a sleep mode, the WUS including the set of multiple respective sequences in accordance with the sequence configuration. The operations of 1715 may be performed in accordance with examples as disclosed herein. In some examples, aspects of the operations of 1715 may be performed by a WUS component 1030 as described with reference to FIG. 10.

At 1720, the method may include performing, while operating in the sleep mode, the one or more operations indicated by the set of multiple respective sequences of the WUS. The operations of 1720 may be performed in accordance with examples as disclosed herein. In some examples, aspects of the operations of 1720 may be performed by a wake-up operation component 1035 as described with reference to FIG. 10.

FIG. 18 shows a flowchart illustrating a method 1800 that supports WUS enhancements in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1805, the method may include transmitting a capability message indicating a quantity of WURs supported by the UE for simultaneous reception of WUSs. The operations of 1805 may be performed in accordance with examples as disclosed herein. In some examples, aspects of the operations of 1805 may be performed by a UE capability component 1040 as described with reference to FIG. 10.

At 1810, the method may include receiving a control message indicating a WUS configuration that is based on the quantity of WURs supported by the UE, the WUS configuration indicating a set of multiple WUSs associated with wake-up operations and respective TCI states for each WUS of the set of multiple WUSs. The operations of 1810 may be performed in accordance with examples as disclosed herein. In some examples, aspects of the operations of 1810 may be performed by a WUS configuration component 1045 as described with reference to FIG. 10.

At 1815, the method may include receiving, while operating in a sleep mode and via one or more receive beams associated with at least one WUR of the UE, at least one WUS of the set of multiple WUSs in accordance with the respective TCI states. The operations of 1815 may be performed in accordance with examples as disclosed herein. In some examples, aspects of the operations of 1815 may be performed by a WUS component 1030 as described with reference to FIG. 10.

FIG. 19 shows a flowchart illustrating a method 1900 that supports WUS enhancements in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1905, the method may include transmitting a capability message indicating a quantity of WURs supported by the UE for simultaneous reception of WUSs. The operations of 1905 may be performed in accordance with examples as disclosed herein. In some examples, aspects of the operations of 1905 may be performed by a UE capability component 1040 as described with reference to FIG. 10.

At 1910, the method may include receiving a control message indicating a WUS configuration that is based on the quantity of WURs supported by the UE, the WUS configuration indicating a set of multiple WUSs associated with wake-up operations and respective TCI states for each WUS of the set of multiple WUSs. The operations of 1910 may be performed in accordance with examples as disclosed herein. In some examples, aspects of the operations of 1910 may be performed by a WUS configuration component 1045 as described with reference to FIG. 10.

At 1915, the method may include receiving, while operating in a sleep mode and via one or more receive beams associated with at least one WUR of the UE, at least one WUS of the set of multiple WUSs in accordance with the respective TCI states. The operations of 1915 may be performed in accordance with examples as disclosed herein. In some examples, aspects of the operations of 1915 may be performed by a WUS component 1030 as described with reference to FIG. 10.

At 1920, the method may include performing a wake-up operation to wake up the UE based on receiving the at least one WUS of the set of multiple WUSs. The operations of 1920 may be performed in accordance with examples as disclosed herein. In some examples, aspects of the operations of 1920 may be performed by a wake-up operation component 1035 as described with reference to FIG. 10.

FIG. 20 shows a flowchart illustrating a method 2000 that supports WUS enhancements in accordance with aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 2005, the method may include transmitting a control message indicating a sequence configuration for a WUS that includes a set of multiple respective sequences, each sequence of the set of multiple respective sequences being associated with a single bit of information, where the set of multiple respective sequences indicates one or more operations of a set of multiple operations based on the sequence configuration. The operations of 2005 may be performed in accordance with examples as disclosed herein. In some examples, aspects of the operations of 2005 may be performed by a sequence configuration component 1425 as described with reference to FIG. 14.

At 2010, the method may include transmitting the WUS including the set of multiple respective sequences in accordance with the sequence configuration. The operations of 2010 may be performed in accordance with examples as disclosed herein. In some examples, aspects of the operations of 2010 may be performed by a WUS component 1430 as described with reference to FIG. 14.

FIG. 21 shows a flowchart illustrating a method 2100 that supports WUS enhancements in accordance with aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 2105, the method may include receiving, from a UE, a capability message indicating whether the UE supports a WUS including a set of multiple respective sequences. The operations of 2105 may be performed in accordance with examples as disclosed herein. In some examples, aspects of the operations of 2105 may be performed by a UE capability component 1435 as described with reference to FIG. 14.

At 2110, the method may include transmitting a control message indicating a sequence configuration for the WUS that includes the set of multiple respective sequences, each sequence of the set of multiple respective sequences being associated with a single bit of information, where the set of multiple respective sequences indicates one or more operations of a set of multiple operations based on the sequence configuration, and where transmitting the control message indicating the sequence configuration is based on the capability message. The operations of 2110 may be performed in accordance with examples as disclosed herein. In some examples, aspects of the operations of 2110 may be performed by a sequence configuration component 1425 as described with reference to FIG. 14.

At 2115, the method may include transmitting the WUS including the set of multiple respective sequences in accordance with the sequence configuration. The operations of 2115 may be performed in accordance with examples as disclosed herein. In some examples, aspects of the operations of 2115 may be performed by a WUS component 1430 as described with reference to FIG. 14.

FIG. 22 shows a flowchart illustrating a method 2200 that supports WUS enhancements in accordance with aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 2205, the method may include receiving a capability message indicating a quantity of WURs supported by a UE for simultaneous reception of WUSs. The operations of 2205 may be performed in accordance with examples as disclosed herein.

In some examples, aspects of the operations of 2205 may be performed by a UE capability component 1435 as described with reference to FIG. 14.

At 2210, the method may include transmitting a control message indicating a WUS configuration that is based on the quantity of WURs supported by the UE, the WUS configuration indicating a set of multiple WUSs associated with wake-up operations and respective TCI states for each WUS of the set of multiple WUSs. The operations of 2210 may be performed in accordance with examples as disclosed herein. In some examples, aspects of the operations of 2210 may be performed by a WUS configuration 1440 as described with reference to FIG. 14.

At 2215, the method may include transmitting the set of multiple WUSs in accordance with the respective TCI states. The operations of 2215 may be performed in accordance with examples as disclosed herein. In some examples, aspects of the operations of 2215 may be performed by a WUS component 1430 as described with reference to FIG. 14.

FIG. 23 shows a flowchart illustrating a method 2300 that supports WUS enhancements in accordance with aspects of the present disclosure. The operations of the method 2300 may be implemented by a network entity or its components as described herein. For example, the operations of the method 2300 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 2305, the method may include receiving a capability message indicating a quantity of WURs supported by a UE for simultaneous reception of WUSs. The operations of 2305 may be performed in accordance with examples as disclosed herein. In some examples, aspects of the operations of 2305 may be performed by a UE capability component 1435 as described with reference to FIG. 14.

At 2310, the method may include transmitting a control message indicating a WUS configuration that is based on the quantity of WURs supported by the UE, the WUS configuration indicating a set of multiple WUSs associated with wake-up operations and respective TCI states for each WUS of the set of multiple WUSs. The operations of 2310 may be performed in accordance with examples as disclosed herein. In some examples, aspects of the operations of 2310 may be performed by a WUS configuration 1440 as described with reference to FIG. 14.

At 2315, the method may include transmitting the set of multiple WUSs in accordance with the respective TCI states, where each of the set of multiple WUSs includes a WUT. The operations of 2315 may be performed in accordance with examples as disclosed herein. In some examples, aspects of the operations of 2315 may be performed by a WUS component 1430 as described with reference to FIG. 14.

At 2320, the method may include receiving a request for beam failure recovery from the UE based on a measured quality associated with at least one WUS satisfying a quality threshold. The operations of 2320 may be performed in accordance with examples as disclosed herein. In some examples, aspects of the operations of 2320 may be performed by a beam failure request component 1475 as described with reference to FIG. 14.

The following provides an overview of aspects of the present disclosure:

Aspect 1: A method for wireless communication at a UE, comprising: receiving a control message indicating a sequence configuration for a WUS that comprises a plurality of respective sequences, each sequence of the plurality of respective sequences being associated with a single bit of information, wherein the plurality of respective sequences indicates one or more operations of a plurality of operations based at least in part on the sequence configuration; receiving, while operating in a sleep mode, the WUS comprising the plurality of respective sequences in accordance with the sequence configuration; and performing, while operating in the sleep mode, the one or more operations indicated by the plurality of respective sequences of the WUS.

Aspect 2: The method of aspect 1, further comprising: transmitting a capability message indicating whether the UE supports the WUS comprising the plurality of respective sequences, wherein receiving the control message indicating the sequence configuration is based at least in part on the capability message.

Aspect 3: The method of aspect 2, wherein the capability message indicates a capability of the UE to receive the WUS comprising the plurality of respective sequences using FDM, a capability of the UE to receive the WUS comprising the plurality of respective sequences using TDM, a quantity of bits supported by the UE for receiving the WUS comprising the plurality of respective sequences, or a combination thereof.

Aspect 4: The method of any of aspects 1 through 3, further comprising: receiving, via the sequence configuration, an indication that the plurality of respective sequences are to be multiplexed in accordance with TDM or FDM, wherein the wake up signal is received in accordance with the TDM or the FDM.

Aspect 5: The method of any of aspects 1 through 4, further comprising: receiving, via the sequence configuration, an indication of a quantity of bits associated with the plurality of respective sequences, wherein the one or more operations are indicated by the plurality of respective sequences based at least in part on the quantity of bits.

Aspect 6: The method of any of aspects 1 through 5, further comprising: receiving, via the sequence configuration, an indication of a plurality of codewords associated with the plurality of respective sequences and a mapping between the plurality of codewords and the plurality of operations, the mapping indicating an association between each of the plurality of operations and respective codewords of the plurality of codewords.

Aspect 7: The method of any of aspects 1 through 6, further comprising: receiving, via the sequence configuration, an indication of a plurality of frequency carriers associated with the WUS comprising the plurality of respective sequences, wherein each sequence of the plurality of respective sequences is received via a respective frequency carrier of the plurality of frequency carriers; and monitoring, while in the sleep mode, the plurality of frequency carriers for the WUS, wherein receiving the WUS is based at least in part on monitoring the plurality of frequency carriers.

Aspect 8: The method of aspect 7, wherein the sequence configuration further indicates that a first sequence of the plurality of respective sequences is different from a second sequence of the plurality of respective sequences, the first sequence being associated with a first frequency carrier of the plurality of frequency carriers and the second sequence being associated with a second frequency carrier different from the first frequency carrier.

Aspect 9: The method of any of aspects 1 through 8, further comprising: determining whether a first sequence associated with the WUS is to be repeated in each frequency carrier of a plurality of frequency carriers, wherein receiving the WUS comprising the plurality of respective sequences comprises receiving the first sequence across each frequency carrier of the plurality of frequency carriers based at least in part on a determination that the first sequence is to be repeated in each frequency carrier; and waking from the sleep mode based at least in part on an aggregation of the first sequence received across each frequency carrier.

Aspect 10: The method of aspect 9, wherein the sequence configuration further indicates that the first sequence comprises a same bit across the plurality of frequency carriers and that a quantity of frequency carriers of the plurality of frequency carriers is greater than one, determining whether the first sequence associated with the WUS is to be repeated in each frequency carrier of the plurality of frequency carriers is based at least in part on the sequence configuration.

Aspect 11: The method of any of aspects 1 through 10, further comprising: receiving, via the sequence configuration, an indication of a plurality of time intervals associated with the plurality of respective sequences, each sequence of the plurality of respective sequences being received via a respective time interval of the plurality of time intervals; and monitoring, while in the sleep mode, the plurality of time intervals for the WUS, wherein receiving the WUS is based at least in part on monitoring the plurality of time intervals.

Aspect 12: The method of aspect 11, wherein the sequence configuration further indicates that a first sequence of the plurality of respective sequences is different from a second sequence of the plurality of respective sequences, the first sequence being associated with a first time interval of the plurality of time intervals and the second sequence being associated with a second time interval different from the first time interval.

Aspect 13: The method of any of aspects 1 through 12, further comprising: determining whether a first sequence associated with the WUS is to be repeated in each time interval of a plurality of time intervals, wherein receiving the WUS comprising the plurality of respective sequences comprises receiving the first sequence via each time interval of the plurality of time intervals based at least in part on a determination that the first sequence is to be repeated in each time interval; and waking from the sleep mode based at least in part on an aggregation of the first sequence received via each time interval.

Aspect 14: The method of aspect 13, wherein the sequence configuration further indicates that the first sequence comprises a same bit in each of the plurality of time intervals and that a quantity of time intervals of the plurality of time intervals is greater than one, determining whether the first sequence associated with the WUS is to be repeated in each time interval of the plurality of time intervals is based at least in part on the sequence configuration.

Aspect 15: The method of any of aspects 13 through 14, further comprising: storing, in a memory buffer of the UE, each repetition of the first sequence in each of the plurality of time intervals, wherein the aggregation of the first sequence is based at least in part on storing each of the plurality of respective sequences in the memory buffer of the UE.

Aspect 16: The method of aspect 1, wherein a length of each sequence of the plurality of respective sequences is based at least in part on a quantity of UEs in communication with a network entity and a processing gain associated with the UE.

Aspect 17: The method of any of aspects 1 through 16, wherein the plurality of operations comprises at least an operation to continue operating in the sleep mode, an operation to update a periodicity associated with monitoring for the WUS, an operation to wake up for beam management, an operation to wake up at a first time period, an operation to wake up within a time threshold, an operation to wake up using a power mode associated with a threshold power.

Aspect 18: A method for wireless communication at a UE, comprising: transmitting a capability message indicating a quantity of WURs supported by the UE for simultaneous reception of WUSs; receiving a control message indicating a WUS configuration that is based at least in part on the quantity of WURs supported by the UE, the WUS configuration indicating a plurality of WUSs associated with wake-up operations and respective TCI states for each WUS of the plurality of WUSs; and receiving, while operating in a sleep mode and via one or more receive beams associated with at least one WUR of the UE, at least one WUS of the plurality of WUSs in accordance with the respective TCI states.

Aspect 19: The method of aspect 18, further comprising: measuring, while operating in the sleep mode, a quality of the at least one WUS based at least in part on receiving the at least one WUS, wherein each of the plurality of WUSs comprises a WUT; performing a wake-up operation to wake-up the UE based at least in part on a quality associated with the at least one WUS satisfying a quality threshold; and transmitting a request for beam failure recovery based at least in part on the quality associated with the at least one WUS satisfying the quality of threshold.

Aspect 20: The method of any of aspects 18 through 19, further comprising: performing a wake-up operation to wake-up the UE based at least in part on receiving the at least one WUS of the plurality of WUSs.

Aspect 21: The method of any of aspects 18 through 20, wherein each WUS of the plurality of WUSs is received via respective WURs of the UE in a same time interval, each WUS of the plurality of WUSs is associated with a same TCI state.

Aspect 22: The method of any of aspects 18 through 21, wherein a first set of the plurality of WUSs is received via a first set of WURs of the UE in a first time interval and a second set of the plurality of WUSs is received via a second set of WURs of the UE in a second time interval different from the first time interval, the first set of the plurality of WUSs being associated with a first TCI state and the second set of the plurality of WUSs being associated with a second TCI state.

Aspect 23: The method of any of aspects 18 through 22, wherein each WUS of the plurality of WUSs are received via respective WURs of the UE in a first time interval, a first set of the plurality of WUSs being associated with a first TCI state and a second set of the plurality of WUSs being associated with a second TCI state.

Aspect 24: A method for wireless communication at a network entity, comprising: transmitting a control message indicating a sequence configuration for a WUS that comprises a plurality of respective sequences, each sequence of the plurality of respective sequences being associated with a single bit of information, wherein the plurality of respective sequences indicates one or more operations of a plurality of operations based at least in part on the sequence configuration; and transmitting the WUS comprising the plurality of respective sequences in accordance with the sequence configuration.

Aspect 25: The method of aspect 24, further comprising: receiving, from a UE, a capability message indicating whether the UE supports the WUS comprising the plurality of respective sequences, wherein transmitting the control message indicating the sequence configuration is based at least in part on the capability message.

Aspect 26: The method of aspect 25, wherein the capability message indicates a capability of the UE to receive the WUS comprising the plurality of respective sequences using FDM, a capability of the UE to receive the WUS comprising the plurality of respective sequences using TDM, a quantity of bits supported by the UE for receiving the WUS comprising plurality of respective sequences, or a combination thereof.

Aspect 27: The method of any of aspects 24 through 26, further comprising: transmitting, via the sequence configuration, an indication that the plurality of respective sequences are to be multiplexed in accordance with TDM or FDM, wherein the wake up signal is transmitted in accordance with the TDM or the FDM.

Aspect 28: The method of any of aspects 24 through 27, further comprising: transmitting, via the sequence configuration, an indication of a quantity of bits associated with the plurality of respective sequences, wherein the one or more operations are indicated by the plurality of respective sequences based at least in part on the quantity of bits.

Aspect 29: The method of any of aspects 24 through 28, further comprising: transmitting, via the sequence configuration, an indication of a plurality of codewords associated with the plurality of respective sequences and a mapping between the plurality of codewords and the plurality of operations, the mapping indicating an association between each of the plurality of operations and respective codewords of the plurality of codewords.

Aspect 30: The method of any of aspects 24 through 29, further comprising: transmitting, via the sequence configuration, an indication of a plurality of frequency carriers associated with the WUS comprising the plurality of respective sequences, wherein each sequence of the plurality of respective sequences is transmitted via a respective frequency carrier of the plurality of frequency carriers.

Aspect 31: The method of aspect 30, wherein the sequence configuration further indicates that a first sequence of the plurality of respective sequences is different from a second sequence of the plurality of respective sequences, the first sequence being associated with a first frequency carrier of the plurality of frequency carriers and the second sequence being associated with a second frequency carrier different from the first frequency carrier.

Aspect 32: The method of any of aspects 24 through 31, further comprising: transmitting, via the sequence configuration, an indication that a first sequence associated with the WUS is to be repeated in each frequency carrier of a plurality of frequency carriers, wherein transmitting the WUS comprising the plurality of respective sequences comprises transmitting the first sequence via each frequency carrier of the plurality of frequency carriers in accordance with the sequence configuration.

Aspect 33: The method of aspect 32, wherein the sequence configuration further indicates that the first sequence comprises a same bit across the plurality of frequency carriers and that a quantity of frequency carriers of a plurality of frequency carriers is greater than one.

Aspect 34: The method of any of aspects 24 through 33, further comprising: transmitting, via the sequence configuration, an indication of a plurality of time intervals associated with the plurality of respective sequences, each sequence of the plurality of respective sequences being transmitted via a respective time interval of the plurality of time intervals.

Aspect 35: The method of aspect 34, wherein the sequence configuration further indicates that a first sequence of the plurality of respective sequences is different from a second sequence of the plurality of respective sequences, the first sequence being associated with a first time interval of the plurality of time intervals and the second sequence being associated with a second time interval different from the first time interval.

Aspect 36: The method of any of aspects 24 through 35, further comprising: transmitting, via the sequence configuration, an indication that a first sequence associated with the WUS is to be repeated in each time interval of a plurality of time intervals, wherein transmitting the WUS comprising the plurality of respective sequences comprises transmitting the first sequence via each time interval of the plurality of time intervals in accordance with the sequence configuration.

Aspect 37: The method of aspect 36, wherein the sequence configuration further indicates that the first sequence comprises a same bit across the plurality of time intervals and that a quantity of time intervals of a plurality of time intervals is greater than one.

Aspect 38: The method of any of aspects 24 through 37, wherein a length of each of the plurality of respective sequences is based at least in part on a quantity of UEs in communication with the network entity and a processing gain associated with a UE.

Aspect 39: The method of any of aspects 24 through 38, wherein the plurality of operations comprises at least an operation to continue operating in a sleep mode, an operation to update a periodicity associated with monitoring for the WUS, an operation to wake up for beam management, an operation to wake up at a first time period, an operation to wake up within a time threshold, an operation to wake up using a power mode associated with a threshold power.

Aspect 40: A method for wireless communication at network entity, comprising: receiving a capability message indicating a quantity of WURs supported by a UE for simultaneous reception of WUSs; transmitting a control message indicating a WUS configuration that is based at least in part on the quantity of WURs supported by the UE, the WUS configuration indicating a plurality of WUSs associated with wake-up operations and respective TCI states for each WUS of the plurality of WUSs; and transmitting the plurality of WUSs in accordance with the respective TCI states.

Aspect 41: The method of aspect 40, further comprising: receiving a request for beam failure recovery from the UE based at least in part on a measured quality associated with at least one WUS satisfying a quality threshold, wherein each of the plurality of WUSs comprises a WUT.

Aspect 42: The method of any of aspects 40 through 41, wherein each of the plurality of WUSs are transmitted in a first time interval, each of the plurality of WUSs associated with a same TCI state.

Aspect 43: The method of any of aspects 40 through 42, wherein a first set of the plurality of WUSs is transmitted in a first time interval and a second set of the plurality of WUSs is transmitted in a second time interval different from the first time interval, the first set of the plurality of WUSs being associated with a first TCI state and the second set of the plurality of WUSs being associated with a second TCI state.

Aspect 44: The method of any of aspects 40 through 43, wherein each of the plurality of WUSs are transmitted in a first time interval, a first set of the plurality of WUSs being associated with a first TCI state and a second set of the plurality of WUSs being associated with a second TCI state.

Aspect 45: An apparatus for wireless communication at a UE, comprising at least one processor; at least one memory coupled with the at least one processor; and instructions stored in the at least one memory and executable by the at least one processor to cause the apparatus to perform a method of any of aspects 1 through 17.

Aspect 46: An apparatus for wireless communication at a UE, comprising at least one means for performing a method of any of aspects 1 through 17.

Aspect 47: A non-transitory computer-readable medium storing code for wireless communication at a UE, the code comprising instructions executable by at least one processor to perform a method of any of aspects 1 through 17.

Aspect 48: An apparatus for wireless communication at a UE, comprising at least one processor; at least one memory coupled with the at least one processor; and instructions stored in the at least one memory and executable by the at least one processor to cause the apparatus to perform a method of any of aspects 18 through 23.

Aspect 49: An apparatus for wireless communication at a UE, comprising at least one means for performing a method of any of aspects 18 through 23.

Aspect 50: A non-transitory computer-readable medium storing code for wireless communication at a UE, the code comprising instructions executable by at least one processor to perform a method of any of aspects 18 through 23.

Aspect 51: An apparatus for wireless communication at a network entity, comprising at least one processor; at least one memory coupled with the at least one processor; and instructions stored in the at least one memory and executable by the at least one processor to cause the apparatus to perform a method of any of aspects 24 through 39.

Aspect 52: An apparatus for wireless communication at a network entity, comprising at least one means for performing a method of any of aspects 24 through 39.

Aspect 53: A non-transitory computer-readable medium storing code for wireless communication at a network entity, the code comprising instructions executable by at least one processor to perform a method of any of aspects 24 through 39.

Aspect 54: An apparatus for wireless communication at network entity, comprising at least one processor; at least one memory coupled with the at least one processor; and instructions stored in the at least one memory and executable by the at least one processor to cause the apparatus to perform a method of any of aspects 40 through 44.

Aspect 55: An apparatus for wireless communication at network entity, comprising at least one means for performing a method of any of aspects 40 through 44.

Aspect 56: A non-transitory computer-readable medium storing code for wireless communication at network entity, the code comprising instructions executable by at least one processor to perform a method of any of aspects 40 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor;
    at least one memory coupled with the at least one processor; and
    instructions stored in the at least one memory and executable by the at least one processor to cause the apparatus to:
        receive a control message indicating a sequence configuration for a wake-up signal that comprises a plurality of respective sequences, each sequence of the plurality of respective sequences being associated with a single bit of information, wherein the plurality of respective sequences indicates one or more operations of a plurality of operations based at least in part on the sequence configuration;

receive, while operating in a sleep mode, the wake-up signal comprising the plurality of respective sequences in accordance with the sequence configuration; and
        perform, while operating in the sleep mode, the one or more operations indicated by the plurality of respective sequences of the wake-up signal.

2. The apparatus of claim 1, wherein the instructions are further executable by the at least one processor to cause the apparatus to:
    transmit a capability message indicating whether the UE supports the wake-up signal comprising the plurality of respective sequences, wherein receiving the control message indicating the sequence configuration is based at least in part on the capability message.

3. The apparatus of claim 2, wherein the capability message indicates a capability of the UE to receive the wake-up signal comprising the plurality of respective sequences using frequency division multiplexing, a capability of the UE to receive the wake-up signal comprising the plurality of respective sequences using time division multiplexing, a quantity of bits supported by the UE for receiving the wake-up signal comprising the plurality of respective sequences, or a combination thereof.

4. The apparatus of claim 1, wherein the instructions are further executable by the at least one processor to cause the apparatus to:
    receive, via the sequence configuration, an indication that the plurality of respective sequences are to be multiplexed in accordance with time division multiplexing or frequency division multiplexing, wherein the wake-up signal is received in accordance with the time division multiplexing or the frequency division multiplexing.

5. The apparatus of claim 1, wherein the instructions are further executable by the at least one processor to cause the apparatus to:
    receive, via the sequence configuration, an indication of a quantity of bits associated with the plurality of respective sequences, wherein the one or more operations are indicated by the plurality of respective sequences based at least in part on the quantity of bits.

6. The apparatus of claim 1, wherein the instructions are further executable by the at least one processor to cause the apparatus to:
    receive, via the sequence configuration, an indication of a plurality of codewords associated with the plurality of respective sequences and a mapping between the plurality of codewords and the plurality of operations, the mapping indicating an association between each of the plurality of operations and respective codewords of the plurality of codewords.

7. The apparatus of claim 1, wherein the instructions are further executable by the at least one processor to cause the apparatus to:
    receive, via the sequence configuration, an indication of a plurality of frequency carriers associated with the wake-up signal comprising the plurality of respective sequences, wherein each sequence of the plurality of respective sequences is received via a respective frequency carrier of the plurality of frequency carriers; and
    monitor, while in the sleep mode, the plurality of frequency carriers for the wake-up signal, wherein receiving the wake-up signal is based at least in part on monitoring the plurality of frequency carriers.

8. The apparatus of claim 7, wherein the sequence configuration further indicates that a first sequence of the plurality of respective sequences is different from a second sequence of the plurality of respective sequences, the first sequence being associated with a first frequency carrier of the plurality of frequency carriers and the second sequence being associated with a second frequency carrier different from the first frequency carrier.

9. The apparatus of claim 1, wherein the instructions are further executable by the at least one processor to cause the apparatus to:

determine whether a first sequence associated with the wake-up signal is to be repeated in each frequency carrier of a plurality of frequency carriers, wherein receiving the wake-up signal comprising the plurality of respective sequences comprises receiving the first sequence across each frequency carrier of the plurality of frequency carriers based at least in part on a determination that the first sequence is to be repeated in each frequency carrier; and wake from the sleep mode based at least in part on an aggregation of the first sequence received across each frequency carrier.

10. The apparatus of claim 9, wherein:

the sequence configuration further indicates that the first sequence comprises a same bit across the plurality of frequency carriers and that a quantity of frequency carriers of the plurality of frequency carriers is greater than one, and determining whether the first sequence associated with the wake-up signal is to be repeated in each frequency carrier of the plurality of frequency carriers is based at least in part on the sequence configuration.

11. The apparatus of claim 1, wherein the instructions are further executable by the at least one processor to cause the apparatus to:

receive, via the sequence configuration, an indication of a plurality of time intervals associated with the plurality of respective sequences, each sequence of the plurality of respective sequences being received via a respective time interval of the plurality of time intervals; and monitor, while in the sleep mode, the plurality of time intervals for the wake-up signal, wherein receiving the wake-up signal is based at least in part on monitoring the plurality of time intervals.

12. The apparatus of claim 11, wherein the sequence configuration further indicates that a first sequence of the plurality of respective sequences is different from a second sequence of the plurality of respective sequences, the first sequence being associated with a first time interval of the plurality of time intervals and the second sequence being associated with a second time interval different from the first time interval.

13. The apparatus of claim 1, wherein the instructions are further executable by the at least one processor to cause the apparatus to:

determine whether a first sequence associated with the wake-up signal is to be repeated in each time interval of a plurality of time intervals, wherein receiving the wake-up signal comprising the plurality of respective sequences comprises receiving the first sequence via each time interval of the plurality of time intervals based at least in part on a determination that the first sequence is to be repeated in each time interval; and wake from the sleep mode based at least in part on an aggregation of the first sequence received via each time interval.

14. The apparatus of claim 13, wherein:

the sequence configuration further indicates that the first sequence comprises a same bit in each of the plurality of time intervals and that a quantity of time intervals of the plurality of time intervals is greater than one, and determining whether the first sequence associated with the wake-up signal is to be repeated in each time interval of the plurality of time intervals is based at least in part on the sequence configuration.

15. The apparatus of claim 13, wherein the instructions are further executable by the at least one processor to cause the apparatus to:

store, in a memory buffer of the UE, each repetition of the first sequence in each of the plurality of time intervals, wherein the aggregation of the first sequence is based at least in part on storing each of the plurality of respective sequences in the memory buffer of the UE.

16. The apparatus of claim 1, wherein a length of each sequence of the plurality of respective sequences is based at least in part on a quantity of UEs in communication with a network entity and a processing gain associated with the UE.

17. The apparatus of claim 1, wherein the plurality of operations comprises at least an operation to continue operating in the sleep mode, an operation to update a periodicity associated with monitoring for the wake-up signal, an operation to wake up for beam management, an operation to wake up at a first time period, an operation to wake up within a time threshold, an operation to wake up using a power mode associated with a threshold power.

18. A method for wireless communication at a user equipment (UE), comprising:

transmitting a capability message indicating a quantity of wake-up receivers supported by the UE for simultaneous reception of wake-up signals;

receiving a control message indicating a wake-up signal configuration that is based at least in part on the quantity of wake-up receivers supported by the UE, the wake-up signal configuration indicating a plurality of wake-up signals associated with wake-up operations and respective transmission configuration indicator states for each wake-up signal of the plurality of wake-up signals; and receiving, while operating in a sleep mode and via one or more receive beams associated with at least one wake-up receiver of the UE, at least one wake-up signal of the plurality of wake-up signals in accordance with the respective transmission configuration indicator states.

19. The method of claim 18, further comprising:

measuring, while operating in the sleep mode, a quality of the at least one wake-up signal based at least in part on receiving the at least one wake-up signal, wherein each of the plurality of wake-up signals comprises a wake-up signal for beam tracking;

performing a wake-up operation to wake-up the UE based at least in part on a quality associated with the at least one wake-up signal satisfying a quality threshold; and transmitting a request for beam failure recovery based at least in part on the quality associated with the at least one wake-up signal satisfying the quality of threshold.

20. The method of claim 18, further comprising:

performing a wake-up operation to wake-up the UE based at least in part on receiving the at least one wake-up signal of the plurality of wake-up signals.

21. The method of claim 18, wherein:

each wake-up signal of the plurality of wake-up signals is received via respective wake-up receivers of the UE in a same time interval, and each wake-up signal of the plurality of wake-up signals is associated with a same transmission configuration indicator state.

22. The method of claim 18, wherein a first set of the plurality of wake-up signals is received via a first set of wake-up receivers of the UE in a first time interval and a second set of the plurality of wake-up signals is received via a second set of wake-up receivers of the UE in a second time interval different from the first time interval, the first set of the plurality of wake-up signals being associated with a first transmission configuration indicator state and the second set of the plurality of wake-up signals being associated with a second transmission configuration indicator state.

23. The method of claim 18, wherein each wake-up signal of the plurality of wake-up signals are received via respective wake-up receivers of the UE in a first time interval, a first set of the plurality of wake-up signals being associated with a first transmission configuration indicator state and a second set of the plurality of wake-up signals being associated with a second transmission configuration indicator state.

24. An apparatus for wireless communication at a network entity, comprising:

at least one processor;

at least one memory coupled with the at least one processor; and instructions stored in the at least one memory and executable by the at least one processor to cause the apparatus to:

transmit a control message indicating a sequence configuration for a wake-up signal that comprises a plurality of respective sequences, each sequence of the plurality of respective sequences being associated with a single bit of information, wherein the plurality of respective sequences indicates one or more operations of a plurality of operations based at least in part on the sequence configuration; and transmit the wake-up signal comprising the plurality of respective sequences in accordance with the sequence configuration.

25. The apparatus of claim 24, wherein the instructions are further executable by the at least one processor to cause the apparatus to:

receive, from a user equipment (UE), a capability message indicating whether the UE supports the wake-up signal comprising the plurality of respective sequences, wherein transmitting the control message indicating the sequence configuration is based at least in part on the capability message.

26. The apparatus of claim 25, wherein the capability message indicates a capability of the UE to receive the wake-up signal comprising the plurality of respective sequences using frequency division multiplexing, a capability of the UE to receive the wake-up signal comprising the plurality of respective sequences using time division multiplexing, a quantity of bits supported by the UE for receiving the wake-up signal comprising plurality of respective sequences, or a combination thereof.

27. The apparatus of claim 24, wherein the instructions are further executable by the at least one processor to cause the apparatus to:

transmit, via the sequence configuration, an indication that the plurality of respective sequences are to be multiplexed in accordance with time division multiplexing or frequency division multiplexing, wherein the wake-up signal is transmitted in accordance with the time division multiplexing or the frequency division multiplexing.

28. A method for wireless communication at a network entity, comprising:

receiving a capability message indicating a quantity of wake-up receivers supported by a user equipment (UE) for simultaneous reception of wake-up signals;

transmitting a control message indicating a wake-up signal configuration that is based at least in part on the quantity of wake-up receivers supported by the UE, the wake-up signal configuration indicating a plurality of wake-up signals associated with wake-up operations and respective transmission configuration indicator states for each wake-up signal of the plurality of wake-up signals; and transmitting the plurality of wake-up signals in accordance with the respective transmission configuration indicator states.

29. The method of claim 28, further comprising:

receiving a request for beam failure recovery from the UE based at least in part on a measured quality associated with at least one wake-up signal satisfying a quality threshold, wherein each of the plurality of wake-up signals comprises a wake-up signal for beam tracking.

30. The method of claim 28, wherein each of the plurality of wake-up signals are transmitted in a first time interval, each of the plurality of wake-up signals associated with a same transmission configuration indicator state.

* * * * *